(12) United States Patent
Furukawa et al.

(10) Patent No.: US 10,931,876 B2
(45) Date of Patent: Feb. 23, 2021

(54) BLUR CORRECTION DEVICE AND IMAGING DEVICE

(71) Applicant: SONY CORPORATION, Tokyo (JP)

(72) Inventors: Masahide Furukawa, Tokyo (JP);
Yoshinori Sugiyama, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/615,930

(22) PCT Filed: Apr. 13, 2018

(86) PCT No.: PCT/JP2018/015617
§ 371 (c)(1),
(2) Date: Nov. 22, 2019

(87) PCT Pub. No.: WO2018/221039
PCT Pub. Date: Dec. 6, 2018

(65) Prior Publication Data
US 2020/0084382 A1    Mar. 12, 2020

(30) Foreign Application Priority Data

May 30, 2017 (JP) .............................. JP2017-106383

(51) Int. Cl.
*H04N 5/232* (2006.01)
*G02B 27/64* (2006.01)
(Continued)

(52) U.S. Cl.
CPC ....... *H04N 5/23287* (2013.01); *G02B 27/646* (2013.01); *G03B 5/04* (2013.01);
(Continued)

(58) Field of Classification Search
CPC ............. H04N 5/23287; H04N 5/2253; H04N 5/2254; G02B 27/646; G03B 5/04;
(Continued)

(56) References Cited

U.S. PATENT DOCUMENTS

2005/0276588 A1    12/2005   Tsutsumi
2009/0009657 A1*   1/2009    Kawai ................ H04N 5/23248
                                                        348/373
(Continued)

FOREIGN PATENT DOCUMENTS

CN       1707301 A     12/2005
CN     101334571 A     12/2008
(Continued)

OTHER PUBLICATIONS

International Search Report and Written Opinion of PCT Application No. PCT/JP2018/015617, dated Jul. 17, 2018, 09 pages of ISRWO.

*Primary Examiner* — Alexander Gee
(74) *Attorney, Agent, or Firm* — Chip Law Group

(57) ABSTRACT

To reduce the weight of the movable body while simplifying the structure. Included are: a first movable body that is movable in a first movement direction with respect to a base body; a second movable body that is positioned on an opposite side of the first movable body from the base body and movable in a second movement direction different from the first movement direction with respect to the first movable body; and a first drive body and a second drive body that each apply driving force to the second movable body, in which the first movable body and the second movable body are integrally moved in the first movement direction with respect to the base body by the driving force of at least one of the first drive body or the second drive body, and the second movable body is moved in the second movement direction with respect to the first movable body by the driving force of at least one of the first drive body or the second drive body.

19 Claims, 44 Drawing Sheets

(51) Int. Cl.
*G03B 5/04* (2006.01)
*H04N 5/225* (2006.01)
*B60R 11/04* (2006.01)
*B60R 11/00* (2006.01)
*G03B 5/00* (2006.01)

(52) U.S. Cl.
CPC ......... *H04N 5/2253* (2013.01); *H04N 5/2254* (2013.01); *B60R 11/04* (2013.01); *B60R 2011/004* (2013.01); *G03B 2205/0015* (2013.01); *G03B 2205/0061* (2013.01)

(58) Field of Classification Search
CPC .... G03B 2205/0015; G03B 2205/0061; B60R 11/04; B60R 2011/004
See application file for complete search history.

(56) References Cited

U.S. PATENT DOCUMENTS

| | | | | |
|---|---|---|---|---|
| 2009/0237792 | A1* | 9/2009 | Owashi | G02B 7/102 359/554 |
| 2010/0226632 | A1* | 9/2010 | Nakayama | H04N 5/23248 396/55 |
| 2011/0267692 | A1* | 11/2011 | Watanabe | H04N 5/23248 359/557 |
| 2012/0269499 | A1 | 10/2012 | Owashi | |

FOREIGN PATENT DOCUMENTS

| | | |
|---|---|---|
| EP | 2009493 A2 | 12/2008 |
| JP | 2005-352033 A | 12/2005 |
| JP | 2008-078852 A | 4/2008 |
| JP | 2009-011098 A | 1/2009 |
| JP | 2010-072625 A | 4/2010 |

* cited by examiner

FIG. 12
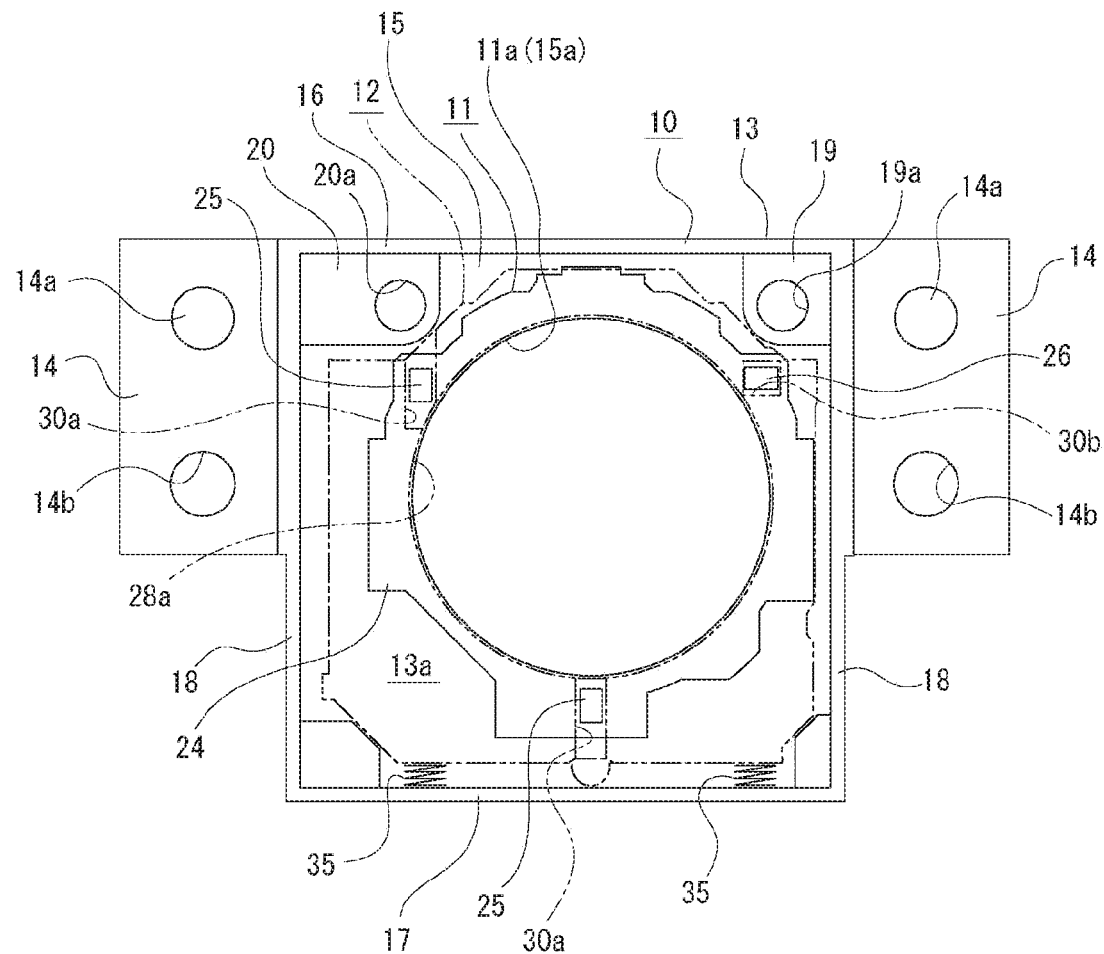
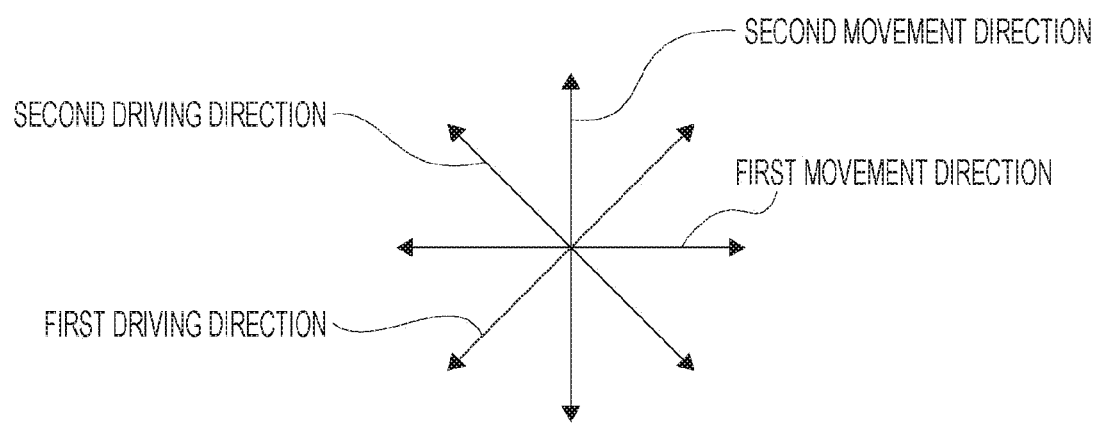

FIG. 42
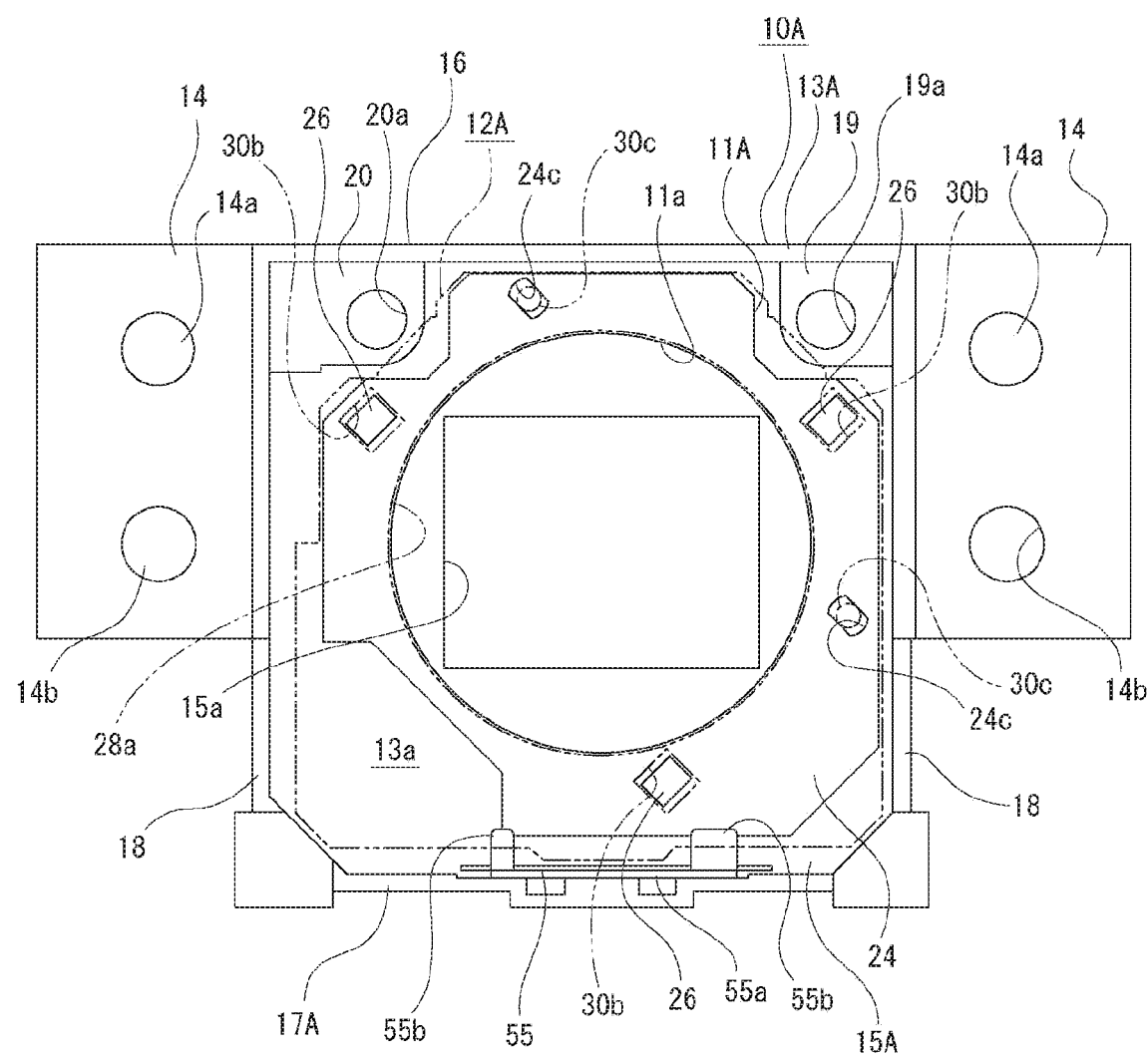
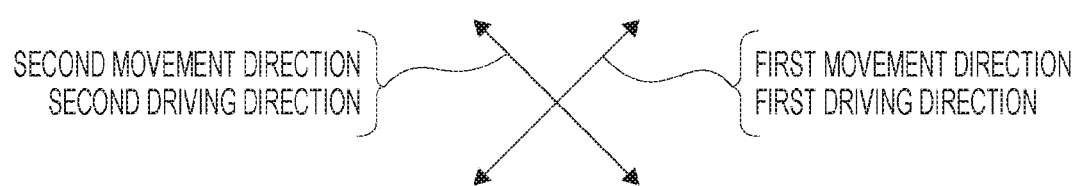

BLUR CORRECTION DEVICE AND IMAGING DEVICE

CROSS REFERENCE TO RELATED APPLICATIONS

This application is a U.S. National Phase of International Patent Application No. PCT/JP2018/015617 filed on Apr. 13, 2018, which claims priority benefit of Japanese Patent Application No. JP 2017-106383 filed in the Japan Patent Office on May 30, 2017. Each of the above-referenced applications is hereby incorporated herein by reference in its entirety.

TECHNICAL FIELD

The present technology relates to a technical field of a blur correction device including a first movable body moved in a first movement direction and a second movable body moved in a second movement direction, and an imaging device including the blur correction device.

CITATION LIST

Patent Document

Patent Document 1: Japanese Patent Application Laid-Open No. 2008-78852

BACKGROUND ART

In imaging devices such as a video camera, a still camera, and various devices in which a camera unit is incorporated, there is one provided with a blur correction device that performs image blur correction by moving a lens or an imaging element in a direction orthogonal to the optical axis direction for example (see, for example, Patent Document 1).

A blur correction device described in Patent Document 1 includes a movable body that holds a lens or an imaging element, and a movement mechanism that moves the movable body in a first movement direction and a second movement direction orthogonal to each other. The movement mechanism includes a first moving body, a second moving body, a third moving body, a first actuator, and a second actuator, and the first moving body, the second moving body, and the third moving body are in contact with respective positions of the movable body in movable states.

The first moving body is moved in the second movement direction by the first actuator, and when the first moving body is moved in the second movement direction, the movable body is moved in the second movement direction. At this time, the second moving body and the third moving body are slid by the movable body, and the movable body is moved in the second movement direction while being held on a plane orthogonal to the optical axis.

Furthermore, the second moving body is moved in the first movement direction by the second actuator, and when the second moving body is moved in the first movement direction, the movable body is moved in the first movement direction. At this time, the first moving body and the third moving body are slid by the movable body, and the movable body is moved in the first movement direction while being held on the plane orthogonal to the optical axis.

SUMMARY OF THE INVENTION

Problems to be Solved by the Invention

By the way, the blur correction device described in Patent Document 1 is configured to apply a plurality of driving forces in different directions to one movable body, and the movement mechanism is not attached to the movable body, so that the weight of the movable body can be reduced, but three moving bodies are included, and the number of parts is large, which may hinder the simplification of the structure.

Thus, it is desirable that the structure is simplified even in the blur correction device configured to apply the plurality of driving forces in different directions to one movable body.

It is therefore an object of a blur correction device and imaging device of the present technology to reduce the weight of the movable body while simplifying the structure.

Solutions to Problems

First, a blur correction device according to the present technology includes: a first movable body that is movable in a first movement direction with respect to a base body; a second movable body that is positioned on an opposite side of the first movable body from the base body and movable in a second movement direction different from the first movement direction with respect to the first movable body; and a first drive body and a second drive body that each apply driving force to the second movable body, in which the first movable body and the second movable body are integrally moved in the first movement direction with respect to the base body by driving force of at least one of the first drive body or the second drive body, and the second movable body is moved in the second movement direction with respect to the first movable body by driving force of at least one of the first drive body or the second drive body.

As a result, the driving force is applied to the second movable body by each of the first drive body and the second drive body, and the second movable body is moved in the first movement direction or the second movement direction by the driving force of at least one of the first drive body or the second drive body.

Second, in the blur correction device according to the present technology described above, it is desirable that the first movable body and the second movable body are positioned side by side in an optical axis direction, the first movement direction is made to be orthogonal to the optical axis direction, and the second movement direction is made to be orthogonal to both the optical axis direction and the first movement direction.

As a result, the first movement direction in which the first movable body is moved and the second movement direction in which the second movable body is moved are directions orthogonal to each other and both orthogonal to the optical axis.

Third, in the blur correction device according to the present technology described above, it is desirable that driving force is applied in a first driving direction from the first drive body to the second movable body, driving force is applied in a second driving direction from the second drive body to the second movable body, and the first driving direction and the second driving direction are both made to be orthogonal to the optical axis direction and are orthogonal to each other.

As a result, the first driving direction and the second driving direction are directions orthogonal to each other and both orthogonal to the optical axis.

Fourth, in the blur correction device according to the present technology described above, it is desirable that a first driving force transmission portion is provided to the first drive body, a second driving force transmission portion is provided to the second drive body, a first operated surface and a second operated surface are formed on the second movable body, the first operated surface is pressed against the first driving force transmission portion in a slidable state, the second operated surface is pressed against the second driving force transmission portion in a slidable state, and at least one of a position of the first driving force transmission portion with respect to the first operated surface or a position of the second driving force transmission portion with respect to the second operated surface is changed and the second movable body is moved with respect to the base body.

As a result, the driving force of the first drive body is transmitted to the first operated surface, the driving force of the second drive body is transmitted to the second operated surface, and the second movable body is moved.

Fifth, in the blur correction device according to the present technology described above, it is desirable that a biasing unit is provided, the biasing unit performing biasing in a direction in which the first operated surface is pressed against the first driving force transmission portion and the second operated surface is pressed against the second driving force transmission portion.

As a result, the first operated surface is pressed against the first driving force transmission portion and the second operated surface is pressed against the second driving force transmission portion by the biasing unit.

Sixth, in the blur correction device according to the present technology described above, it is desirable that the first movable body and the second movable body are biased in a direction toward the base body by the biasing unit.

As a result, it is not necessary to separately provide the biasing unit that performs biasing so that the first operated surface and the second operated surface are respectively pressed against the first driving force transmission portion and the second driving force transmission portion, and the biasing unit that biases the first movable body and the second movable body in the direction toward the base body.

Seventh, in the blur correction device according to the present technology described above, it is desirable that the first operated surface and the second operated surface are both inclined with respect to the first movement direction and the second movement direction.

As a result, the driving force of the first drive body is transmitted to the first operated surface made to be an inclined surface, the driving force of the second drive body is transmitted to the second operated surface made to be an inclined surface, and the second movable body is moved.

Eighth, in the blur correction device according to the present technology described above, it is desirable that inclination angles of the first operated surface and the second operated surface with respect to the first movement direction and the second movement direction are made equal to each other.

As a result, the driving force of the first drive body is transmitted to the first operated surface made to be the inclined surface, the driving force of the second drive body is transmitted to the second operated surface inclined at the same inclination angle as that of the first operated surface, and the second movable body is moved, so that it is possible to make an amount of movement in the first movement direction and an amount of movement in the second movement direction of the second movable body by the same driving force of the first drive body and the second drive body the same as each other.

Ninth, in the blur correction device according to the present technology described above, it is desirable that a plurality of the first driving force transmission portions and a plurality of the second driving force transmission portions are each provided.

As a result, the first operated surface is pressed against the plurality of first driving force transmission portions, and the second operated surface is pressed against the plurality of second driving force transmission portions.

Tenth, in the blur correction device according to the present technology described above, it is desirable that the first movement direction is made to be different from the first driving direction, and the second movement direction is made to be different from the second driving direction.

As a result, the driving force of both the driving force of the first drive body and the driving force of the second drive body is transmitted, and the second movable body is moved, so that the second movable body is moved in the first movement direction or the second movement direction depending on the magnitude of the driving force of the first drive body and the second drive body.

Eleventh, in the blur correction device according to the present technology described above, it is desirable that the first drive body includes a first actuator and a first slider operated by the first actuator, the second drive body includes a second actuator and a second slider operated by the second actuator, and the second movable body is made to be slidable by the first slider and the second slider.

As a result, the driving force of the first drive body and the driving force of the second drive body are respectively transmitted from the first slider and the second slider to the second movable body.

Twelfth, in the blur correction device according to the present technology described above, it is desirable that the first movement direction and the second movement direction are made to be directions orthogonal to each other, and the first slider and the second slider are operated in a direction orthogonal to both the first movement direction and the second movement direction.

As a result, the first slider and the second slider are operated in the direction orthogonal to the movement directions of the first movable body and the second movable body, so that an arrangement space of the first slider and the second slider is reduced in a plane including the movement directions of the first movable body and the second movable body.

Thirteenth, in the blur correction device according to the present technology described above, it is desirable that the first actuator and the second actuator are attached to the base body.

As a result, a dedicated member is not necessary for attaching the first actuator and the second actuator.

Fourteenth, in the blur correction device according to the present technology described above, it is desirable that the base body is provided with an arrangement unit of a substantially rectangular shape in which the first movable body and the second movable body are arranged, and the first drive body and the second drive body are respectively attached to corners of the arrangement unit outside the first movable body and the second movable body.

As a result, the first drive body and the second drive body are arranged in a portion near the outer periphery in the arrangement unit.

Fifteenth, in the blur correction device according to the present technology described above, it is desirable that an outer shape of the first movable body is made smaller than an outer shape of the second movable body.

As a result, it is possible to arrange the first movable body and the second movable body in a state where the first movable body does not protrude outward from the second movable body.

Sixteenth, in the blur correction device according to the present technology described above, it is desirable that the base body is formed with an arrangement space in which the first movable body, the second movable body, the first drive body, and the second drive body are arranged.

As a result, the first movable body, the second movable body, the first drive body, and the second drive body are arranged in the same space formed in the base body.

Seventeenth, in the blur correction device according to the present technology described above, it is desirable that a first guide that guides the first movable body in the first movement direction, and a second guide that guides the second movable body in the second movement direction are provided.

As a result, the first movable body is guided by the first guide with respect to the base body, and the second movable body is guided by the second guide with respect to the first movable body.

Eighteenth, in the blur correction device according to the present technology described above, it is desirable that the first guide is integrally formed with the base body, and the second guide is integrally formed with the first movable body.

As a result, the first guide and the second guide do not have to be formed as separate members from the base body and the first movable body.

Nineteenth, in the blur correction device according to the present technology described above, it is desirable that a first rolling member is arranged between the base body and the first movable body, the first rolling member being rolled when the first movable body is moved in the first movement direction, and a second rolling member is arranged between the first movable body and the second movable body, the second rolling member being rolled when the second movable body is moved in the second movement direction.

As a result, the first rolling member is rolled when the first movable body is moved in the first movement direction, and the second rolling member is rolled when the second movable body is moved in the second movement direction.

Twentieth, an imaging device according to the present technology includes a lens unit including at least one lens, an imaging element that performs photoelectric conversion on an optical image captured through the lens, and a blur correction device that corrects an image blur of the optical image, the blur correction device including: a first movable body that is movable in a first movement direction with respect to a base body; a second movable body that is positioned on an opposite side of the first movable body from the base body and movable in a second movement direction different from the first movement direction with respect to the first movable body; and a first drive body and a second drive body that each apply driving force to the second movable body, in which the first movable body and the second movable body are integrally moved in the first movement direction with respect to the base body by driving force of at least one of the first drive body or the second drive body, and the second movable body is moved in the second movement direction with respect to the first movable body by driving force of at least one of the first drive body or the second drive body.

As a result, in the blur correction device, the driving force is applied to the second movable body by each of the first drive body and the second drive body, and the second movable body is moved in the first movement direction or the second movement direction by the driving force of at least one of the first drive body or the second drive body.

Effects of the Invention

In the blur correction device and the imaging device of the present technology, the driving force is applied to the second movable body by each of the first drive body and the second drive body, and the second movable body is moved in the first movement direction or the second movement direction by the driving force of at least one of the first drive body or the second drive body, so that the weight of the movable body can be reduced while the structure is simplified.

Note that, the advantageous effects described in the specification are merely examples, and the advantageous effects of the present technology are not limited to them and may include other effects.

BRIEF DESCRIPTION OF DRAWINGS

FIG. 6 is a perspective view illustrating a base body and the like.

FIG. 7 is a perspective view illustrating a first movable body and the like.

FIG. 10 is a perspective view illustrating a second movable body and the like.

FIG. 12 is a front view illustrating a state in which the first movable body is supported by the base body and the second movable body is supported by the first movable body.

FIG. 36 is a perspective view illustrating a base body and the like.

FIG. 37 is a perspective view illustrating a first movable body and the like.

FIG. 40 is a perspective view illustrating a second movable body and the like.

FIG. 42 is a front view illustrating a state in which the first movable body is supported by the base body and the second movable body is supported by the first movable body.

MODE FOR CARRYING OUT THE INVENTION

Hereinafter, embodiments will be described of a blur correction device and an imaging device of the present technology with reference to the attached drawings. The embodiments described below apply the imaging device of the present technology to an interchangeable lens, and apply the blur correction device of the present technology to a blur correction device provided in the interchangeable lens.

Note that, application ranges of the imaging device and the blur correction device of the present technology is not limited to the interchangeable lens and the blur correction device provided in the interchangeable lens, respectively. The imaging device and the blur correction device of the present technology can be widely applied to, for example, imaging devices incorporated in various devices such as still cameras, video cameras, personal computers, and portable terminals, or blur correction devices provided in these imaging devices.

In the following description, it is assumed that front, back, upward, downward, left, and right directions are indicated by directions viewed from an image-capturing person in a state where an interchangeable lens is mounted on a device main body of a camera. Thus, the subject side is forward, and the image-capturing person side is backward.

Note that, the front, back, upward, downward, right, and left directions indicated below are for convenience of description, and these directions are not limitations about implementation of the present technology.

Furthermore, meaning of a lens described below includes both a lens constituted by a single lens and a lens constituted as a lens group by a plurality of lenses.

<Overall Configuration of Imaging Device>

Figure 1:
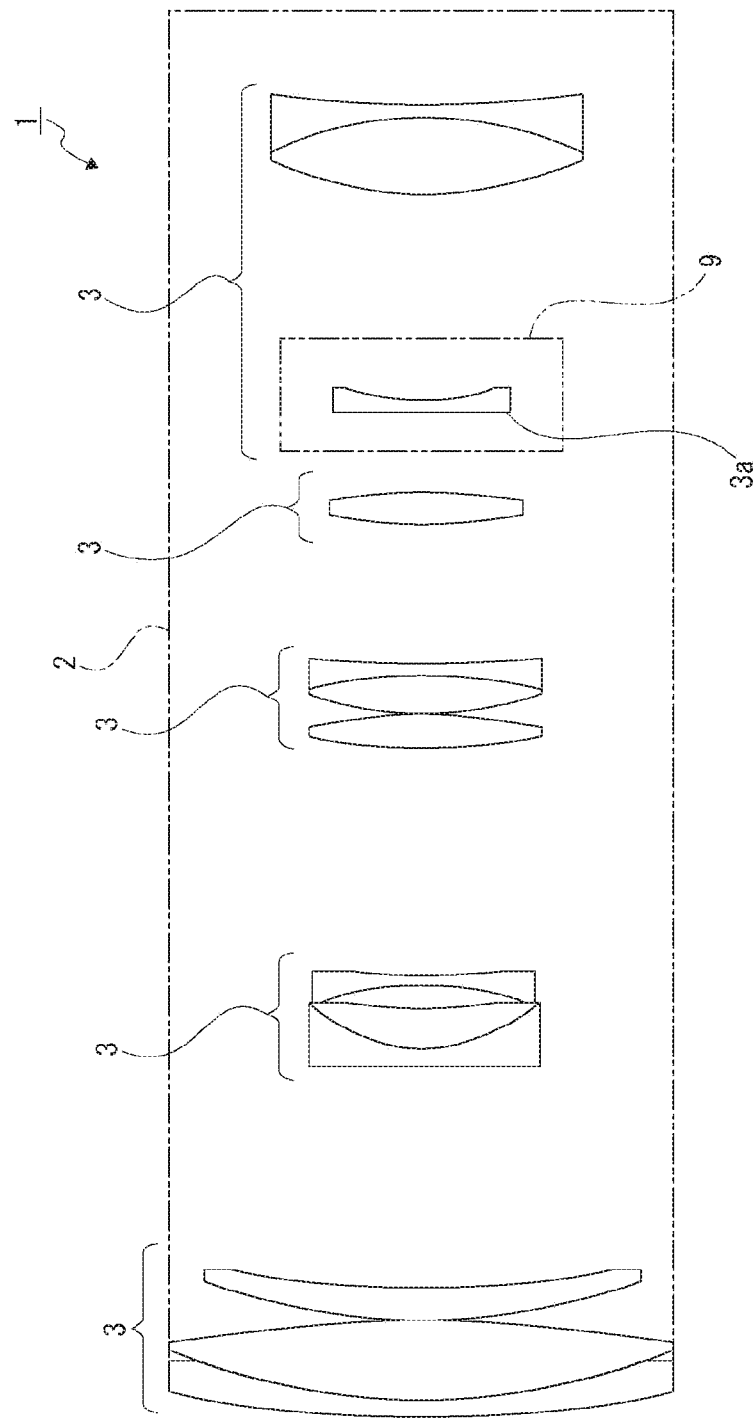
FIG. 1 illustrates a blur correction device and an imaging device of the present technology together with FIGS. 2 to 58, and this figure is a conceptual diagram of the imaging device.

An imaging device (interchangeable lens) 1 includes a lens barrel 2 and necessary units arranged inside the lens barrel 2 (see FIG. 1). At least one lens group 3, 3, ... is arranged inside the lens barrel 2 to be movable in the optical axis direction or in a fixed state. The lens group 3 includes a single or a plurality of lenses. Inside the lens barrel 2, other optical elements (not illustrated) are also arranged other than the lens groups 3, 3, ... , such as an aperture stop.

One of the lens groups 3, 3, ... or part of the lens group 3 is provided as a shift lens group 3a that is moved in a direction orthogonal to the optical axis. Note that, the lens group 3 may include a plurality of sub-lens groups including a single or a plurality of lenses, for example, a front group and a rear group, and in this case, the sub-lens group may be provided as the shift lens group 3a.

The imaging device 1 that is an interchangeable lens is made to be detachable to a device main body (not illustrated) of a still camera, and is used by being attached to the device main body. The device main body is provided with an operation unit such as a power button and a zoom knob, a display unit on which a screen is displayed, and the like.

Note that, in the present technology, the imaging device may be configured as a whole by mounting the imaging device 1 on the device main body, or only the device main body of a type in which the interchangeable lens is not used may be configured as the imaging device. However, in a case where only the device main body of the type in which the interchangeable lens is not used is configured as the imaging device, the lens groups 3, 3, ... are arranged in the device main body.

Figure 2:
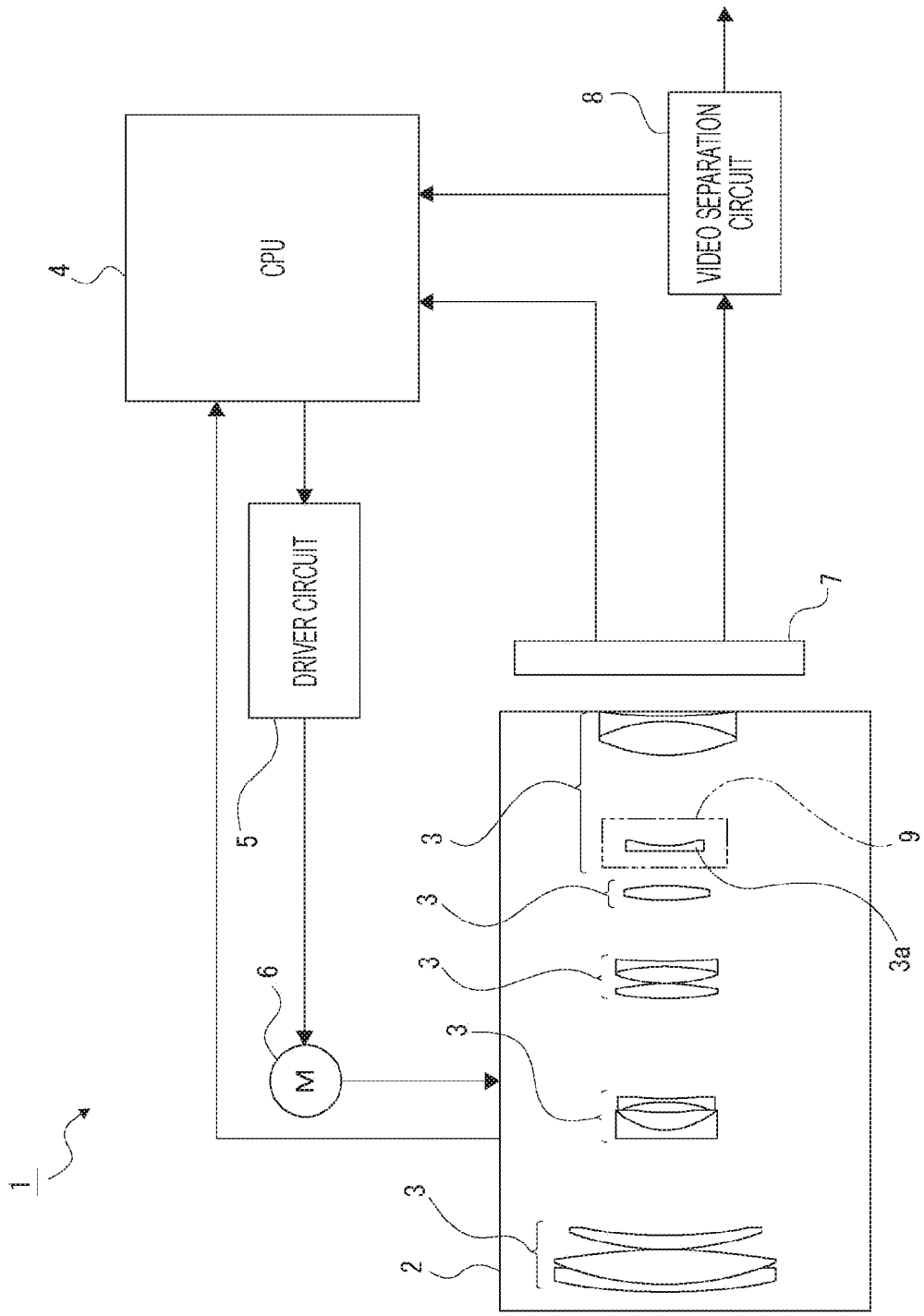
FIG. 2 is a block diagram illustrating a configuration example of the imaging device.

The imaging device 1 includes a central processing unit (CPU) 4, a driver circuit 5, a drive motor 6, an imaging element 7, and a video separation circuit 8 (see FIG. 2).

Note that, the CPU 4, the driver circuit 5, the drive motor 6, the imaging element 7, and the video separation circuit 8 are provided in the device main body in a case where the imaging device is configured as a whole by mounting the imaging device 1 on the device main body or in a case where only the device main body of the type in which the interchangeable lens is not used is configured as the imaging device.

The CPU 4 comprehensively controls the entire imaging device 1 and sends an image captured by the lens groups 3, 3, ... and photoelectrically converted by the imaging element 7, to the video separation circuit 8.

The CPU 4 executes various types of processing on the basis of input of an operation signal from the outside such as focusing operation. For example, in a case where a focusing operation signal is input, focusing processing is performed to operate the drive motor 6 via the driver circuit 5 in accordance with the input focusing operation signal. The lens group 3 provided as a focus lens group is moved in the optical axis direction by the focusing processing. At this time, the CPU 4 feeds back positional information of the focus lens group, and stores reference information when the focus lens group is moved next via the drive motor 6. Furthermore, for example, in a case where a zooming operation signal is input, the CPU 4 performs zooming processing to operate the drive motor 6 via the driver circuit 5 in accordance with the input zooming operation signal.

Furthermore, the CPU 4 sends a drive signal to the driver circuit 5 on the basis of a signal output from a position detecting unit described later for performing blur correction. The driver circuit 5 operates a first actuator and a second actuator described later on the basis of the input drive signal. The blur correction is performed by the operation of the first actuator and the second actuator.

As the imaging element 7, for example, a photoelectric conversion element is used, such as charge coupled device (CCD) or complementary metal oxide semiconductor (CMOS).

The video separation circuit 8 sends a video signal to a video processing circuit (not illustrated). The video processing circuit converts the input video signal into each signal format suitable for subsequent processing, and performs processing of each of video display processing on the display unit, recording processing on a recording medium, data transfer processing via a communication interface, or the like.

A blur correction device 9 that moves the shift lens group 3a is arranged inside the lens barrel 2 (see FIGS. 1 and 2). Thus, the blur correction is performed by moving the shift lens group 3a in the direction orthogonal to the optical axis.

Note that, in the above, an example has been described in which the blur correction is performed by moving the shift lens group 3a in the direction orthogonal to the optical axis by the blur correction device 9; however, a configuration may be made in which the shift lens group 3a is not moved in the direction orthogonal to the optical axis, and the imaging element 7 is moved by the blur correction device 9. In this case, the blur correction is performed by moving the imaging element 7 in the direction orthogonal to the optical axis.

<Configuration of Blur Correction Device According to First Embodiment>

Hereinafter, a configuration will be described of the blur correction device 9 according to the first embodiment (see FIGS. 3 to 16).

Figure 3:
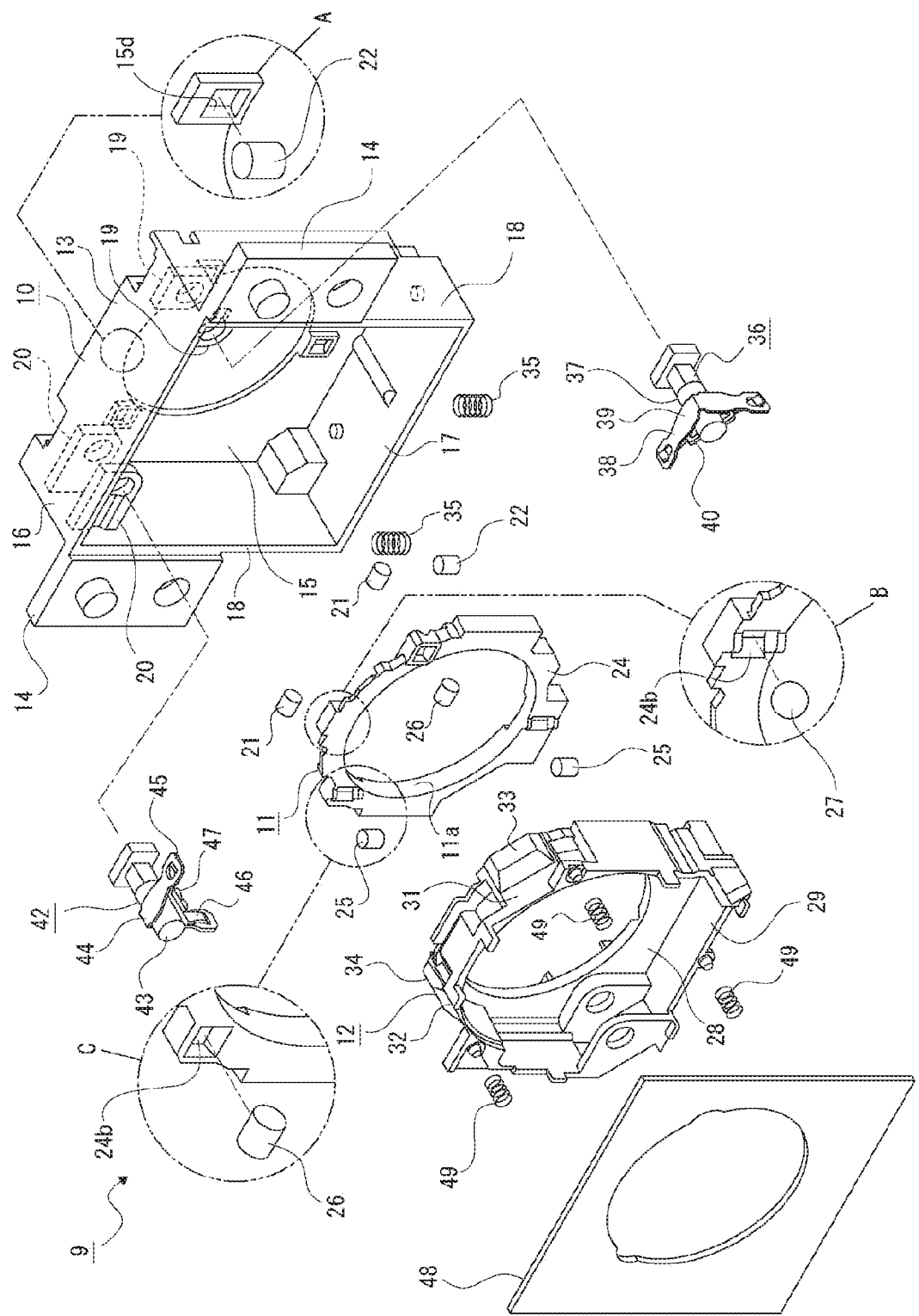
FIG. 3 illustrates a blur correction device according to a first embodiment together with FIGS. 4 to 32, and this figure is an exploded perspective view of the blur correction device.
Figure 4:
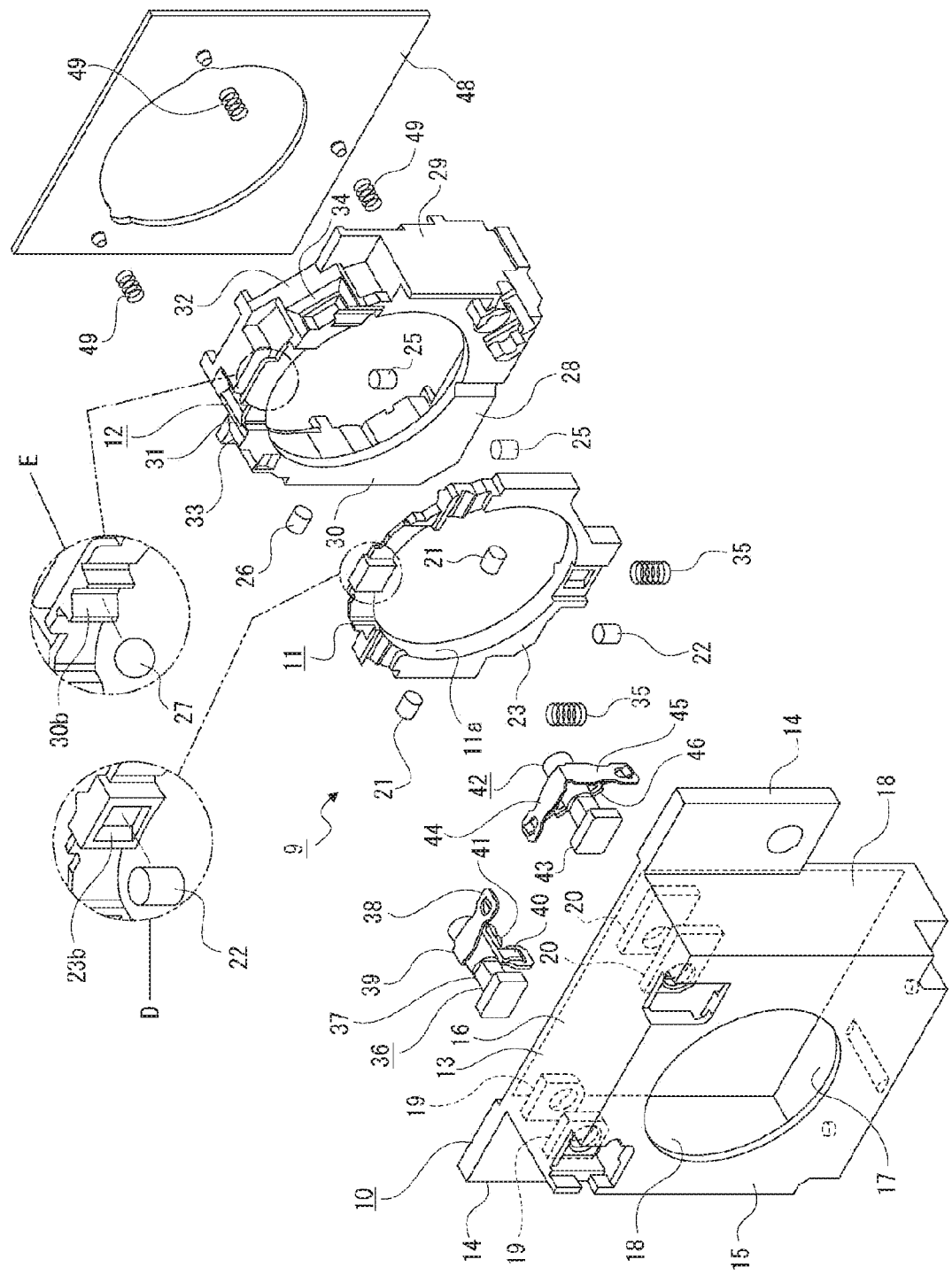
FIG. 4 is an exploded perspective view of the blur correction device as viewed from a direction different from that in FIG. 3.
Figure 5:
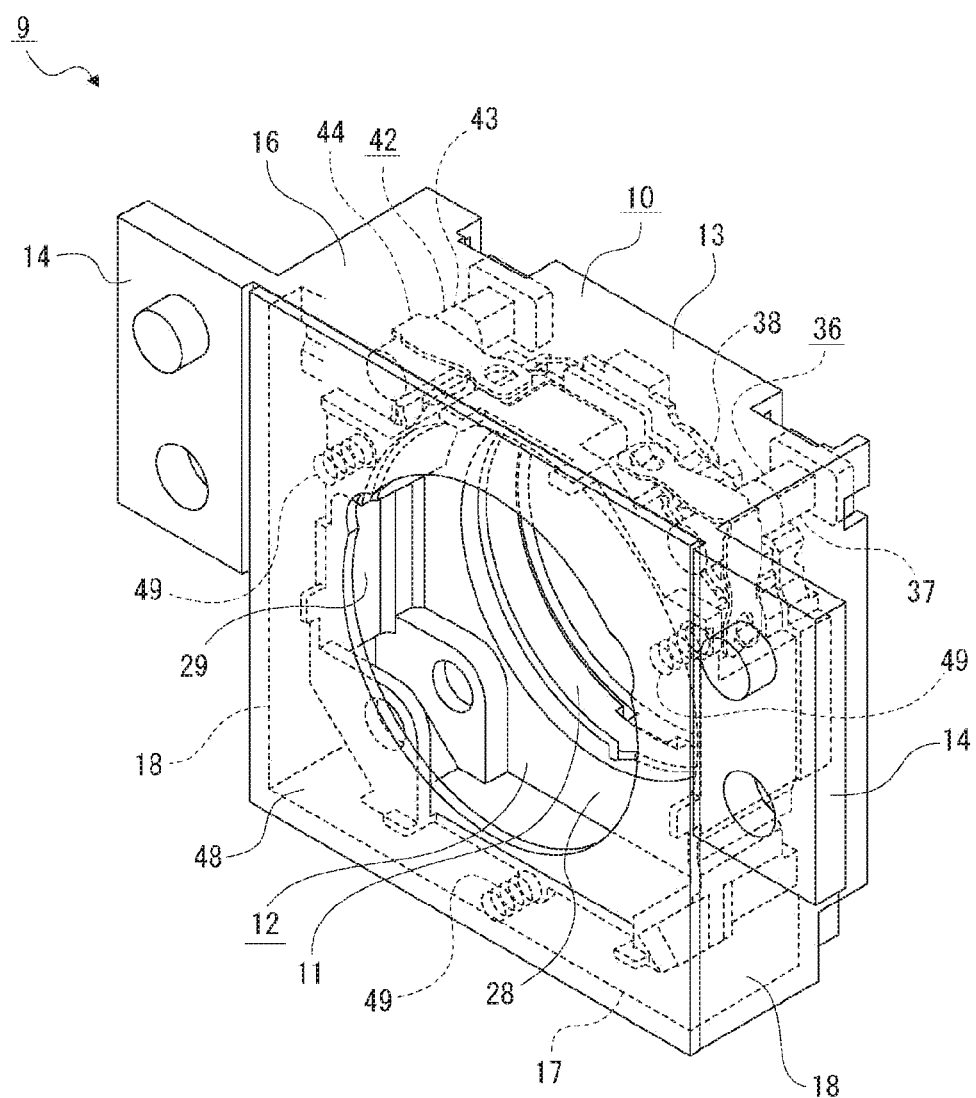
FIG. 5 is a perspective view of the blur correction device.

The blur correction device 9 includes a base body 10 arranged in a fixed state, a first movable body 11 that is movable in the left-right direction that is a first movement direction with respect to the base body 10, and a second movable body 12 that is movable in the upward-downward direction that is a second movement direction with respect to the first movable body 11 (see FIGS. 3 to 5).

The base body 10 includes an arrangement unit 13 formed in a case-like shape that opens forward, and supported protrusions 14 and 14 protruding leftward and rightward from the arrangement unit 13.

Figure 6:
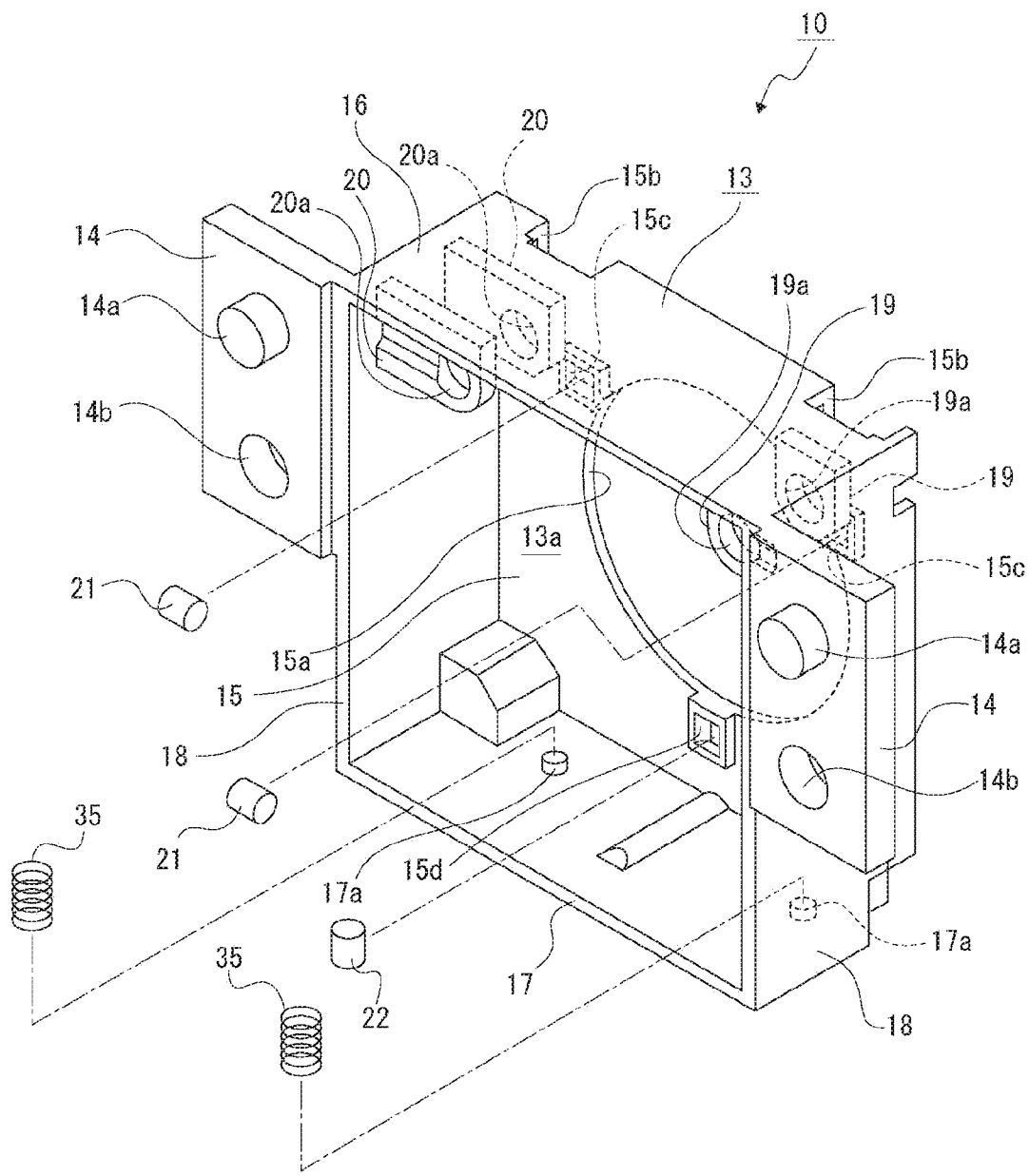

The arrangement unit 13 includes a base surface portion 15, an upper surface portion 16, a lower surface portion 17, and side surface portions 18 and 18 (see FIG. 6). The internal space of the arrangement unit 13 is formed as an arrangement space 13a. The base surface portion 15 faces the front-rear direction, the upper surface portion 16 protrudes forward from the upper end of the base surface portion 15, the lower surface portion 17 protrudes forward from the lower end of the base surface portion 15, and the side surface portions 18 and 18 protrude forward respectively from both the left and right ends of the base surface portion 15.

The base surface portion 15 is formed in a rectangular plate-like shape. The base surface portion 15 is formed with a light transmission hole 15a having a circular shape and penetrating in the front-rear direction. The base surface portion 15 is formed with arrangement holes 15b and 15b penetrating in the front-rear direction, at both the left and right ends of the upper end. On the base surface portion 15, arrangement recesses 15c and 15c opened forward are formed to be separated on the left and right of the light transmission hole 15a. The base surface portion 15 is formed with a support recess 15d opened forward below the light transmission hole 15a.

The arrangement unit 13 is provided with support protrusions 19, 19, 20, and 20. The support protrusions 19 and 19 protrude inward from a position across one of the left and right ends of the upper surface portion 16 and the upper end of one of the side surface portions 18, and are positioned to be separated in the front and rear. The support protrusion 19 is formed with a support hole 19a penetrating in the front-rear direction. The support protrusions 20 and 20 protrude inward from a position across the other of the left and right ends of the upper surface portion 16 and the upper end of the other of the side surface portions 18, and are positioned to be separated in the front and rear. The support protrusion 20 is formed with a support hole 20a penetrating in the front-rear direction.

On the lower surface portion 17, spring support protrusions 17a and 17a protruding upward are provided to be separated on the left and right.

Positioning pins 14a and insertion holes 14b are positioned to be separated in the upward-downward direction in the supported protrusion 14. In the base body 10, the supported protrusions 14 and 14 are attached to the lens barrel 2 or an attachment member (not illustrated) arranged inside the lens barrel 2. At this time, the base body 10 is positioned with respect to the lens barrel 2 or the attachment member by the positioning pins 14a and 14a, and is attached to the lens barrel 2 or the attachment member by a mounting screw (not illustrated) inserted into the insertion holes 14b and 14b.

First guides 21 and 21 are arranged respectively in the arrangement recesses 15c and 15c of the base body 10. The first guide 21 is formed in a cylindrical or columnar shape, and is arranged in the arrangement recess 15c in a state where the axial direction coincides with the left-right direction. The first guide 21 is made to be immovable with respect to the base surface portion 15.

A first rolling member 22 is supported by the support recess 15d of the base body 10. The first rolling member 22 is formed in a cylindrical or columnar shape, is supported by the support recess 15d in a state where the axial direction coincides with the upward-downward direction, and is made to be rotatable in a direction around the axis with respect to the base body 10. Note that, the support recesses 15d and 15d may be formed above and below the light transmission hole 15a in the base body 10, and the first rolling members 22 and 22 may be supported by the support recesses 15d and 15d, respectively (see enclosed figure A in two-dot chain line of FIG. 3).

Figure 7:
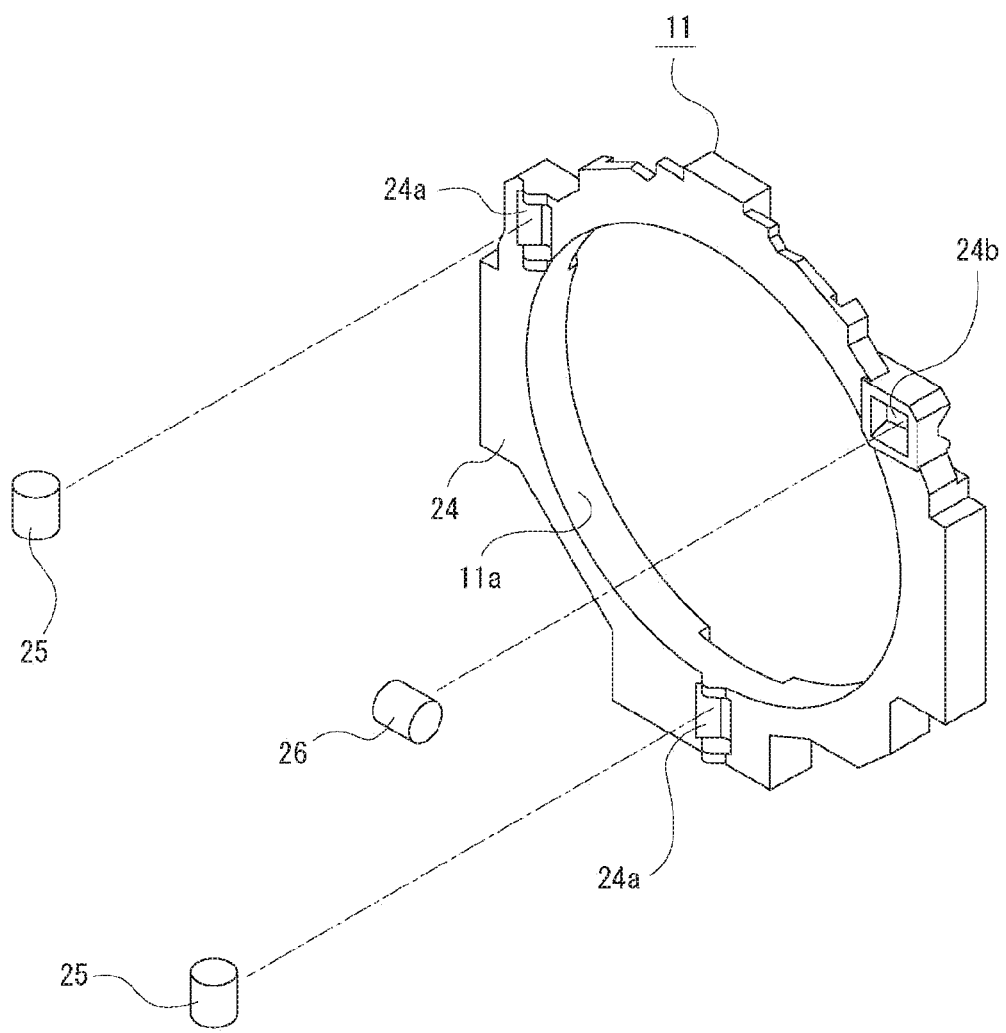
Figure 8:
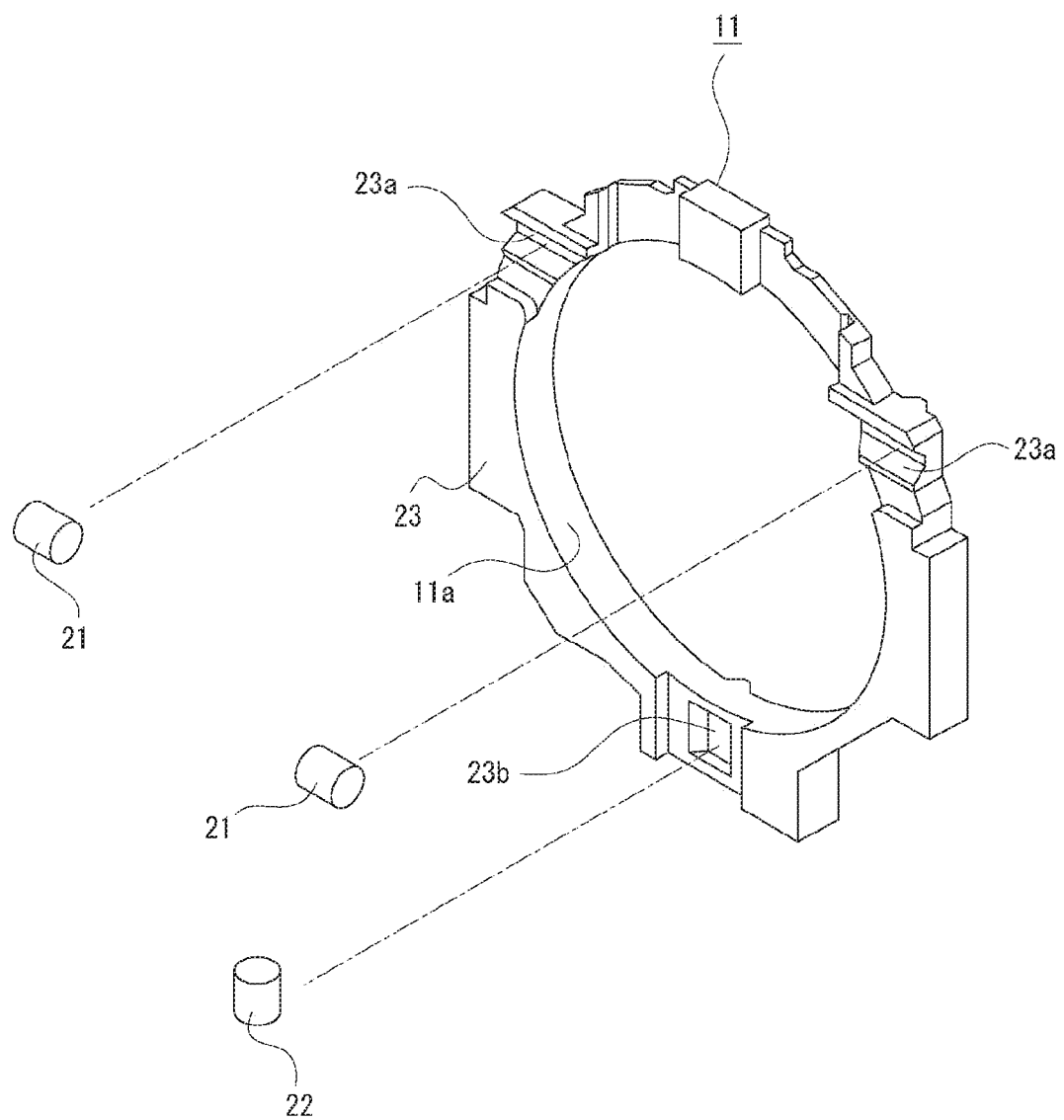
FIG. 8 is a perspective view of the first movable body and the like as viewed from a direction different from that in FIG. 7.
Figure 9:
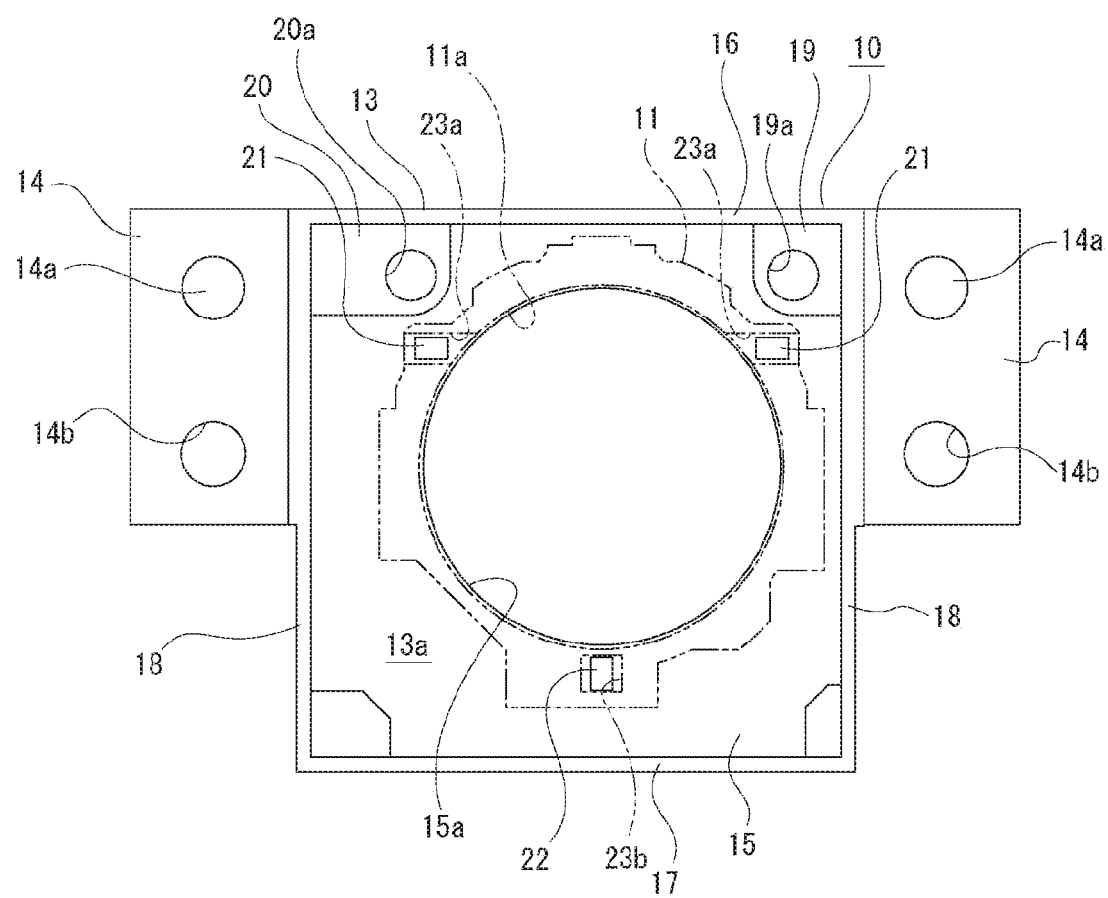
FIG. 9 is a front view illustrating a state in which the first movable body is supported by the base body.

The first movable body 11 is formed in a substantially annular shape, and an inner space is formed as a transmission hole 11a (see FIGS. 7 and 8).

On a rear surface 23 of the first movable body 11, guided grooves 23a and 23a opened backward are formed to be separated on the left and right of the transmission hole 11a (see FIG. 8). The guided grooves 23a and 23a are formed in a shape extending to the left and right. On the rear surface 23 of the first movable body 11, a support recess 23b opened backward is formed below the transmission hole 11a.

On a front surface 24 of the first movable body 11, arrangement recesses 24a and 24a opened forward are formed to be separated in the circumferential direction of the transmission hole 11a outside the transmission hole 11a (see FIG. 7). On the front surface 24 of the first movable body 11, a support recess 24b opened forward is formed outside the transmission hole 11a. The arrangement recesses 24a and 24a and the support recess 24b are formed to be separated in the circumferential direction in order.

The first guides 21 and 21 are respectively arranged in the guided grooves 23a and 23a of the first movable body 11 (see FIG. 9), and the guided grooves 23a and 23a are respectively guided by the first guides 21 and 21, whereby the first movable body 11 is movable in the left-right direction (first movement direction) with respect to the base body 10. Thus, the first movable body 11 is arranged in the arrangement space 13a of the arrangement unit 13 in a state of being supported by the base surface portion 15 of the base body 10 via the first guides 21 and 21.

The first rolling member 22 is supported by the support recess 23b of the first movable body 11, and the first rolling member 22 is rolled between the base body 10 and the first movable body 11, whereby the first movable body 11 is smoothly moved in the left-right direction with respect to the base body 10. Note that, the support recesses 23b and 23b may be formed above and below the transmission hole 11a in the first movable body 11, and the first rolling members 22 and 22 may be supported by the support recesses 23b and 23b, respectively (see enclosed figure D in two-dot chain line of FIG. 4).

Second guides 25 and 25 are respectively arranged in the arrangement recesses 24a and 24a of the first movable body 11 (see FIG. 7). The second guide 25 is formed in a cylindrical or columnar shape, and is arranged in the arrangement recess 24a in a state where the axial direction coincides with the upward-downward direction. The second guide 25 is made to be immovable with respect to the first movable body 11.

A second rolling member 26 is supported by the support recess 24b of the first movable body 11. The second rolling member 26 is formed in a cylindrical or columnar shape, is supported by the support recess 24b in a state where the axial direction coincides with the left-right direction, and is made to be rotatable in a direction around the axis with respect to the first movable body 11. Note that, the support recesses 24b and 24b may be formed around the transmission hole 11a in the first movable body 11, and the second rolling members 26 and 27 may be supported by the support recesses 24b and 24b, respectively (see enclosed figures B and C in two-dot chain line of FIG. 3). The second rolling member 26 is formed in a cylindrical or columnar shape, is supported by the support recess 24b in a state where the axial direction coincides with the left-right direction, and is made to be rotatable in a direction around the axis with respect to the first movable body 11. The second rolling member 27 is formed, for example, in a spherical shape, and is made to be rotatable in the same direction as that of the second rolling member 26 along the shape of the support recess 24b with respect to the first movable body 11. Furthermore, the second rolling members 26 and 26 may be supported by both the support recesses 24b and 24b, respectively, or the second rolling members 27 and 27 may be supported by the both the support recesses 24b and 24b, respectively.

Figure 10:
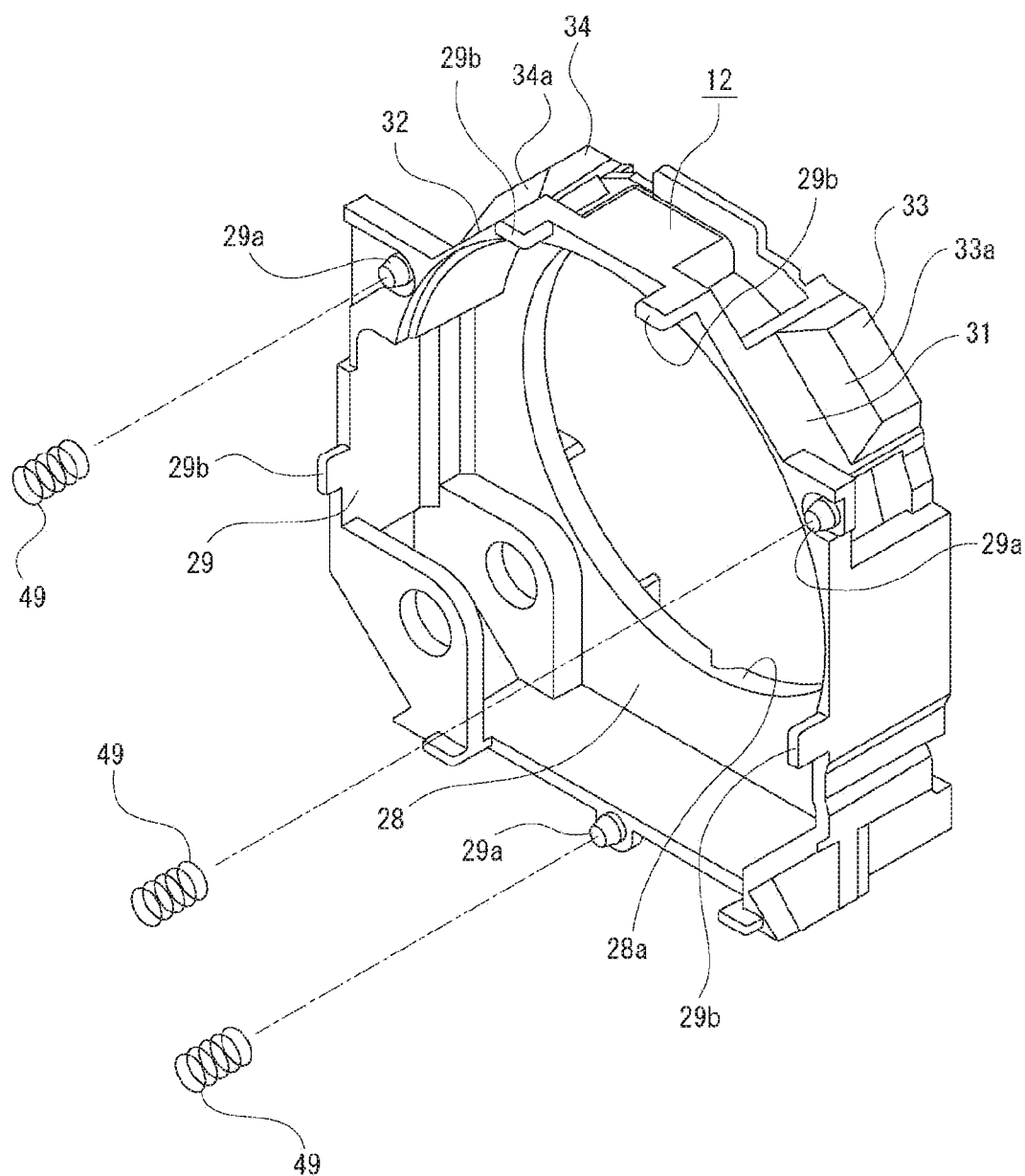
Figure 11:
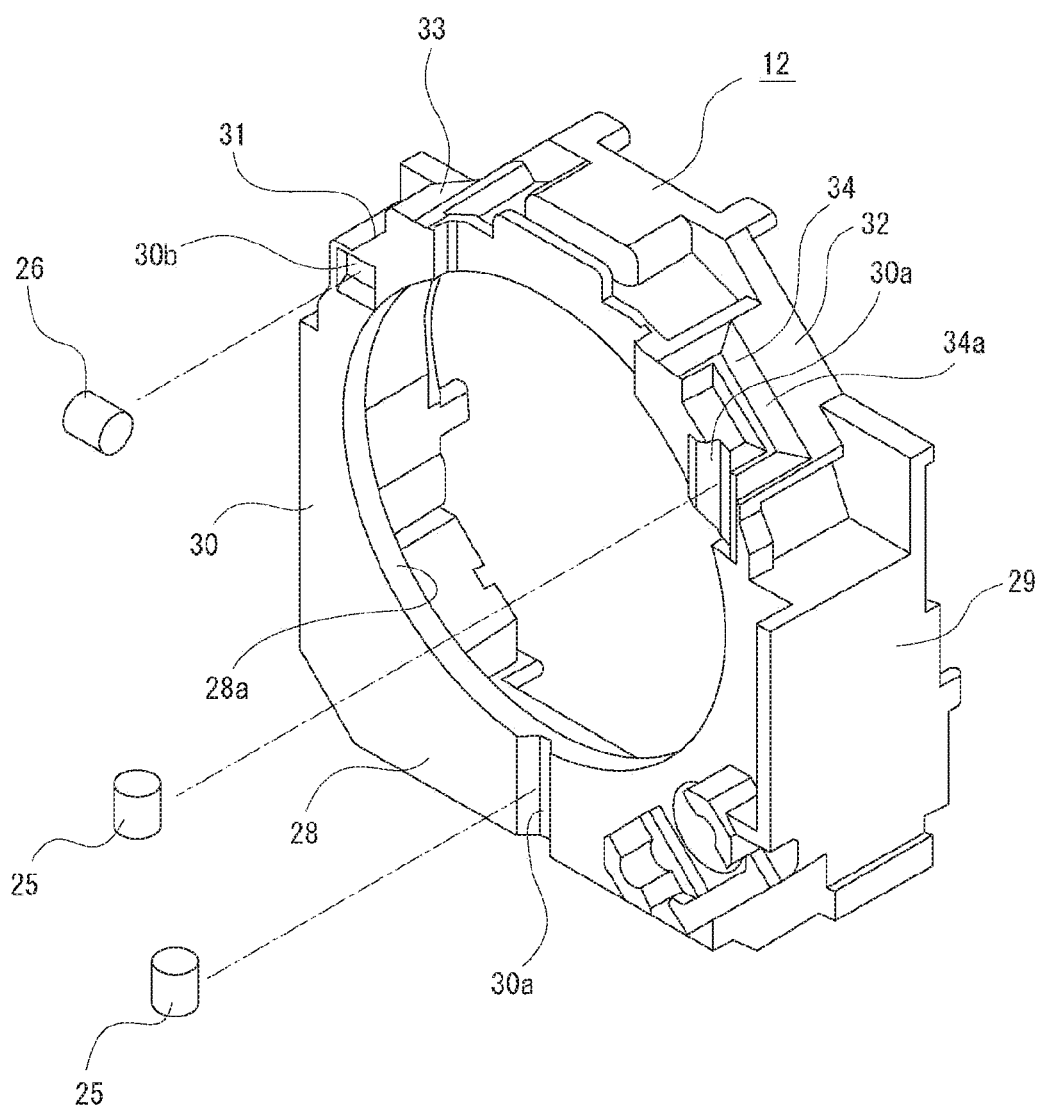
FIG. 11 is a perspective view illustrating the second movable body and the like as viewed from a direction different from that in FIG. 10.

The second movable body 12 includes a base surface portion 28 formed in an annular shape and a peripheral surface portion 29 protruding forward from the outer peripheral portion of the base surface portion 28 (see FIGS. 10 and 11). The outer shape of the second movable body 12 is made larger than the outer shape of the first movable body 11. An inner space in the base surface portion 28 is formed as a through hole 28a.

The shift lens group 3a is held by the second movable body 12 to cover the through hole 28a. Imaging light taken in by the lens groups 3, 3, . . . including the shift lens group 3a is incident on the imaging element 7. At this time, the imaging light is sequentially transmitted through the through hole 28a of the second movable body 12, the transmission hole 11a of the first movable body 11, and the light transmission hole 15a of the base body 10, and is incident on the imaging element 7.

On a rear surface 30 of the base surface portion 28, guided grooves 30a and 30a opened backward are formed to be separated in the circumferential direction of the through hole 28a outside the through hole 28a (see FIG. 11). The guided grooves 30a and 30a are formed in a shape extending upward and downward. On the rear surface 30 of the base surface portion 28, a support recess 30b opened backward is formed outside the through hole 28a.

Both the left and right ends of a portion near the upper end of the peripheral surface portion 29 are provided as inclined surface portions 31 and 32, respectively (see FIGS. 10 and 11). The inclined surface portions 31 and 32 are inclined to be displaced downward as they move to be separated from each other in the left-right direction.

The peripheral surface portion 29 is provided with receiving protrusions 33 and 34 protruding from the outer surface of the inclined surface portions 31 and 32. A first operated surface 33a is formed on the receiving protrusion 33, and a second operated surface 34a is formed on the receiving protrusion 34.

The first operated surface 33a positioned on the left side is inclined to face the upper left direction and the upper front direction, and the second operated surface 34a positioned on the right side is inclined to face the upper right direction and the upper front direction. Inclination angles of the first operated surface 33a and the second operated surface 34a to the horizontal plane are made to be the same as each other in the left-right direction and the upward-downward direction.

On the front end of the peripheral surface portion 29, spring support protrusions 29a, 29a, and 29a protruding forward are provided to be separated in the circumferential direction. On the front end of the peripheral surface portion 29, stopper protrusions 29b, 29b, . . . protruding forward are provided to be separated in the circumferential direction.

The second guides 25 and 25 are respectively arranged in the guided grooves 30a and 30a of the second movable body 12 (see FIG. 12), and the second guided grooves 30a and 30a are respectively guided by the guides 25 and 25, whereby the second movable body 12 is movable in the upward-downward direction (second movement direction) with respect to the first movable body 11. Thus, the second movable body 12 is supported by the first movable body 11 via the second guides 25 and 25, and arranged in the arrangement space 13a of the arrangement unit 13.

The second rolling member 26 is supported by the support recess 30b of the second movable body 12, and the second rolling member 26 is rolled between the first movable body 11 and the second movable body 12, whereby the second movable body 12 is smoothly moved in the upward-downward direction with respect to the first movable body 11 with less friction during movement of the second movable body 12 with respect to the first movable body 11. The second movable body 12 is moved in the upward-downward direction with respect to the first movable body 11, and the first movable body 11 is moved in the left-right direction with respect to the base body 10, so that the second movable body 12 supported by the first movable body 11 is moved integrally with the first movable body 11 in the left-right direction with respect to the base body 10. Note that, the support recesses 30b and 30b may be formed around the through hole 28a in the second movable body 12, and the second rolling members 26 and 27 may be supported by the support recesses 30b and 30b, respectively (see enclosed figure E in two-dot chain line of FIG. 4).

As described above, the blur correction device 9 is provided with the first guides 21 and 21 that guide the first movable body 11 in the first movement direction, and the second guides 25 and 25 that guide the second movable body 12 in the second movement direction.

Thus, the first movable body 11 is guided by the first guides 21 and 21 with respect to the base body 10, and the second movable body 12 is guided by the second guides 25 and 25 with respect to the first movable body 11, so that the first movable body 11 and the second movable body 12 can be reliably moved in the first movement direction and the second movement direction, respectively.

Figure 13:
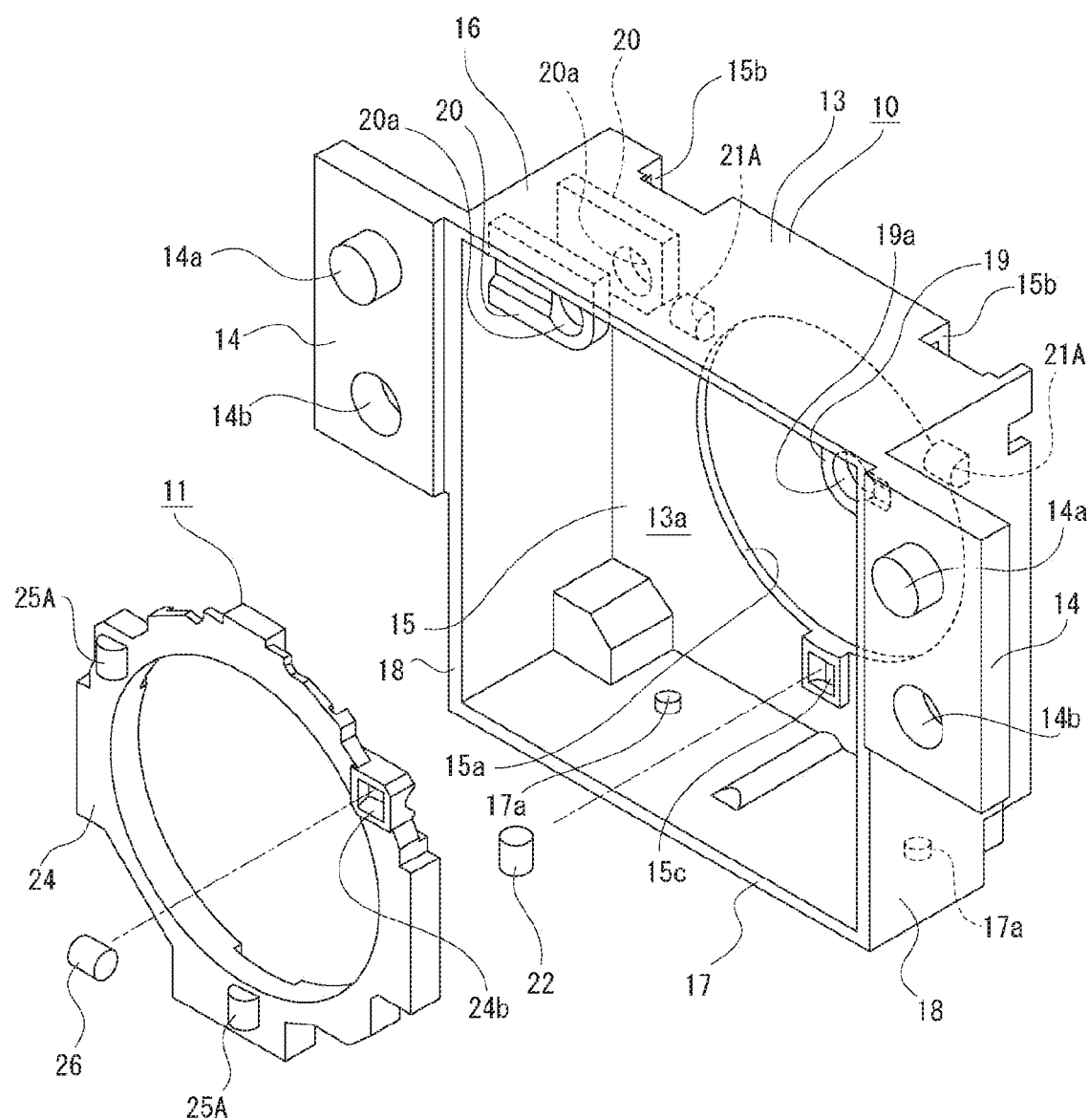
FIG. 13 is an exploded perspective view illustrating an example in which guides are integrally formed with the base body and the first movable body.

Note that, in the above, an example has been described in which the first guides 21 and 21 are provided as separate members from the base body 10, and the second guides 25 and 25 are provided as separate members from the first movable body 11; however, the first guides 21 and 21 may be integrally formed as first guides 21A and 21A with the base body 10, and the second guides 25 and 25 may be integrally formed as second guides 25A and 25A with the first movable body 11 (see FIG. 13).

The first guides 21 and 21 are integrally formed as the first guides 21A and 21A with the base body 10, and the second guides 25 and 25 are integrally formed as the second guides 25A and 25A with the first movable body 11, so that it is not necessary to form the first guides 21 and 21 and the second guides 25 and 25 as separate members from the base body 10 and the first movable body 11, and the first movable body 11 and the second movable body 12 can be reliably moved in the first movement direction and the second movement direction, respectively, while the number of parts is reduced.

Note that, instead of the first guides 21 and 21 and the second guides 25 and 25, a first guided member immovable with respect to the first movable body 11 may be provided between the base body 10 and the first movable body 11, and a second guided member immovable with respect to the second movable body 12 may be provided between the first movable body 11 and the second movable body 12. In this case, a configuration can be made in which a first guide groove is formed in the base body 10, a second guide groove is formed in the first movable body 11, the first movable body 11 is guided by the first guide groove via the first guided member, and the second movable body 12 is guided by the second guide groove via the second guided member. Furthermore, in this case, the first guided member may be integrally formed with the first movable body 11, and the second guided member may be integrally formed with the second movable body 12.

Furthermore, between the base body 10 and the first movable body 11, the first rolling member 22 is arranged that is rolled when the first movable body 11 is moved in the first movement direction, and between the first movable body 11 and the second movable body 12, the second rolling member 26 is arranged that is rolled when the second movable body 12 is moved in the second movement direction.

Thus, the first rolling member 22 is rolled when the first movable body 11 is moved in the first movement direction, and the second rolling member 26 is rolled when the second movable body 12 is moved in the second movement direction, so that the first movable body 11 and the second movable body 12 can be smoothly moved in the first movement direction and the second movement direction, respectively.

Between the lower surface of the peripheral surface portion 29 in the second movable body 12 and the upper surface of the lower surface portion 17 in the base body 10, pressing springs 35 and 35 are arranged that function as biasing units (see FIGS. 6 and 12). The pressing springs 35 and 35 are, for example, compression coil springs, and the lower ends are supported by the spring support protrusions 17a and 17a of the base body 10. The second movable body 12 is biased upward by the pressing springs 35 and 35. Note that, the number of the pressing springs 35 to be provided may be one.

Figure 14:
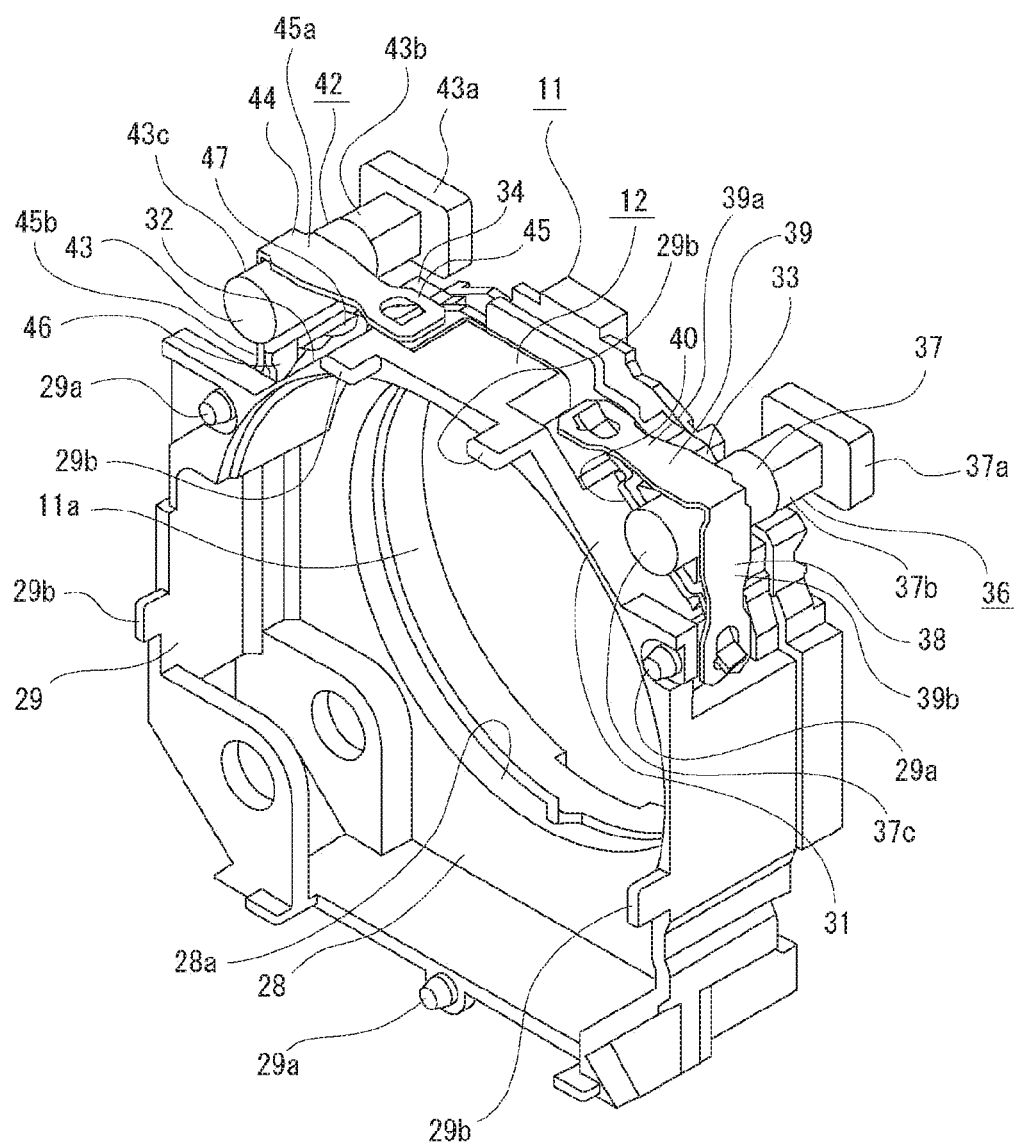
FIG. 14 is a perspective view illustrating the first movable body, the second movable body, and drive bodies.
Figure 15:
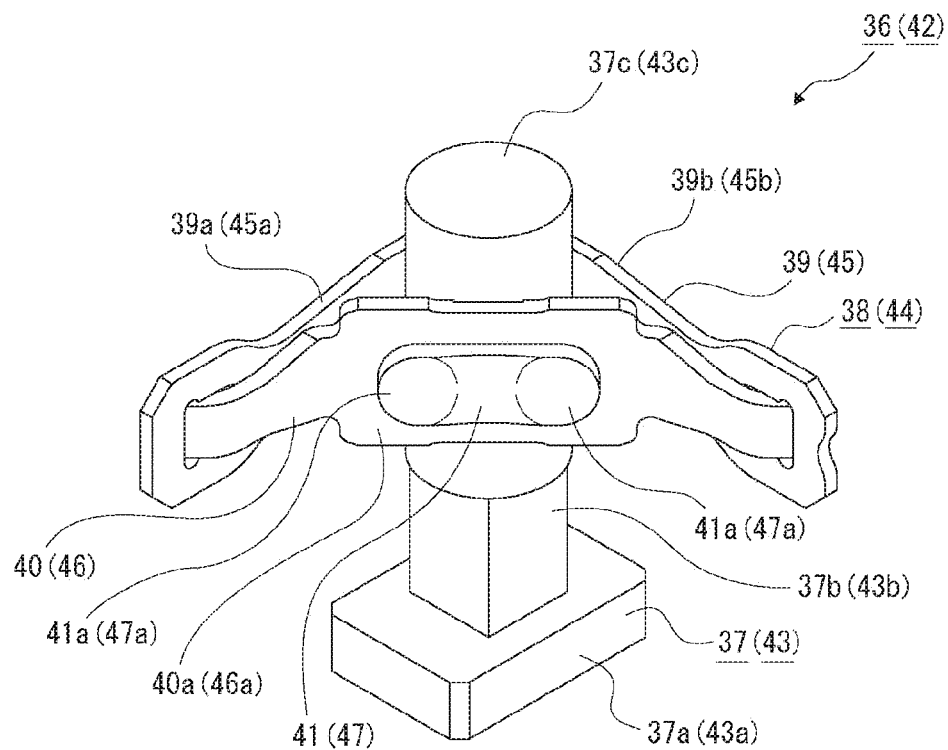
FIG. 15 is a perspective view illustrating the drive body.

A first drive body 36 is attached to the support protrusions 19 and 19 of the base body 10 (see FIGS. 3 and 14). The first drive body 36 includes a first actuator 37 and a first slider 38 (see FIGS. 15 and 16).

The first actuator 37 is, for example, an actuator using a piezoelectric element, and includes a fixed portion 37a, a piezoelectric element 37b, and a drive shaft 37c, and the piezoelectric element 37b protrudes forward from the fixed portion 37a and the drive shaft 37c is continuously provided on the front side of the piezoelectric element 37b, and the piezoelectric element 37b and the drive shaft 37c are arranged in a state of extending in the front-rear direction.

In the first actuator 37, in a state where the fixed portion 37a is arranged in the arrangement hole 15b of the base surface portion 15 and fixed to the base body 10, the drive shaft 37c is movably supported in the front-rear direction by the support holes 19a and 19a of the support protrusions 19 and 19. When a voltage is applied to the piezoelectric element 37b in the first actuator 37, the piezoelectric element 37b is expanded and contracted and the drive shaft 37c is moved in the front-rear direction.

The first slider 38 includes a base member 39 bent at a right angle and a coupling member 40 coupled to the base member 39 in the longitudinal direction, and both ends in the longitudinal direction of the coupling member 40 are respectively coupled to both ends in the longitudinal direction of the base member 39. In the base member 39, with reference to the bent portion, one side is provided as a first portion 39a and the other side is provided as a second portion 39b. In the coupling member 40, a portion other than the both ends in the longitudinal direction is provided as a contact surface portion 40a of a flat plate-like shape.

The first slider 38 has elastic force in a direction in which the base member 39 and the coupling member 40 approach each other. The drive shaft 37c of the first actuator 37 is inserted between the base member 39 and the coupling member 40, and the first portion 39a and the second portion 39b in the base member 39 and the contact surface portion 40a of the coupling member 40 are pressed against the shaft 37c.

A transmission member 41 is attached to an opposite surface of the contact surface portion 40a from a surface in contact with the drive shaft 37c. In the transmission member 41, first driving force transmission portions 41a and 41a protruding toward an opposite side from the contact surface portion 40a are provided to be separated in the longitudinal direction of the coupling member 40. The first driving force transmission portions 41a and 41a are formed in a moderate curved surface with a convex outer surface.

Figure 16:
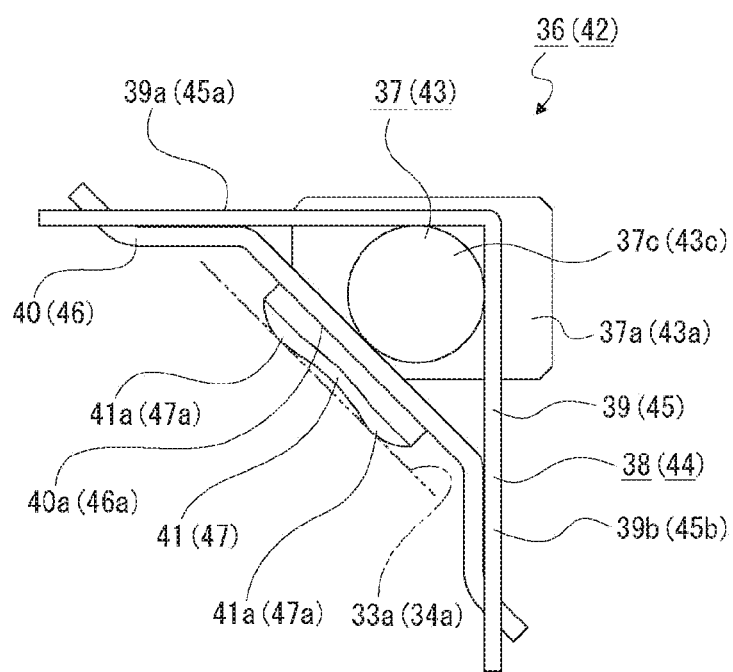
FIG. 16 is a front view illustrating the drive body.
Figure 17:
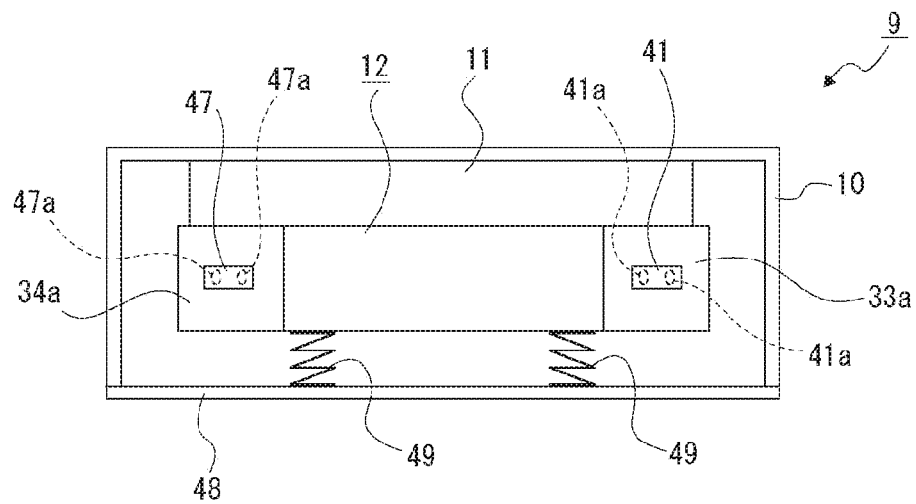
FIG. 17 illustrates blur correction operation together with FIGS. 18 to 26, and this figure is a schematic plan view illustrating a state in which the first movable body and the second movable body are at reference positions.

The first drive body 36 is positioned at the upper left corner in the arrangement unit 13 of the base body 10, and the first driving force transmission portions 41a and 41a of the transmission member 41 are in contact with the first operated surface 33a in the receiving protrusion 33 of the second movable body 12 in a slidable state (see FIG. 16). The transmission member 41 is in contact with the first operated surface 33a from the upper left direction.

At this time, since the second movable body 12 is biased upward by the pressing springs 35 and 35, the first operated surface 33a is pressed against the first driving force transmission portions 41a and 41a of the transmission member 41.

A second drive body 42 is attached to the support protrusions 20 and 20 of the base body 10 (see FIGS. 3 and 14). The second drive body 42 includes a second actuator 43 and a second slider 44 (see FIGS. 15 and 16).

The second actuator 43 is, for example, an actuator using a piezoelectric element, and includes a fixed portion 43a, a piezoelectric element 43b, and a drive shaft 43c, and the piezoelectric element 43b protrudes forward from the fixed portion 43a and the drive shaft 43c is continuously provided on the front side of the piezoelectric element 43b, and the piezoelectric element 43b and the drive shaft 43c are arranged in a state of extending in the front-rear direction.

In the second actuator 43, in a state where the fixed portion 43a is arranged in the arrangement hole 15b of the base surface portion 15 and fixed to the base body 10, the drive shaft 43c is movably supported in the front-rear direction by the support holes 20a and 20a of the support protrusions 20 and 20. When a voltage is applied to the piezoelectric element 43b in the second actuator 43, the piezoelectric element 43b is expanded and contracted and the drive shaft 43c is moved in the front-rear direction.

The second slider 44 includes a base member 45 bent at a right angle and a coupling member 46 coupled to the base member 45 in the longitudinal direction, and both ends in the longitudinal direction of the coupling member 46 are respectively coupled to both ends in the longitudinal direction of the base member 45. In the base member 45, with reference to the bent portion, one side is provided as a first portion 45a and the other side is provided as a second portion 45b. In the coupling member 46, a portion other than the both ends in the longitudinal direction is provided as a contact surface portion 46a of a flat plate-like shape.

The second slider 44 has elastic force in a direction in which the base member 45 and the coupling member 46 approach each other. The drive shaft 43c of the second actuator 43 is inserted between the base member 45 and the coupling member 46, and the first portion 45a and the second portion 45b in the base member 45 and the contact surface portion 46a of the coupling member 46 are pressed against the shaft 43c.

A transmission member 47 is attached to an opposite surface of the contact surface portion 46a from a surface in contact with the drive shaft 43c. In the transmission member 47, second driving force transmission portions 47a and 47a protruding toward an opposite side from the contact surface portion 46a are provided to be separated in the longitudinal direction of the coupling member 46. The first driving force transmission portions 47a and 47a are formed in a moderate curved surface with a convex outer surface.

The second drive body 42 is positioned at the upper right corner of the arrangement unit 13 of the base body 10, and the second driving force transmission portions 47a and 47a of the transmission member 47 are in contact with the second operated surface 34a of the receiving protrusion 34 of the second movable body 12 in a slidable state (see FIG. 16). The transmission member 47 is in contact with the second operated surface 34a from the upper right direction.

At this time, since the second movable body 12 is biased upward by the pressing springs 35 and 35, the second operated surface 34a is pressed against the second driving force transmission portions 47a and 47a of the transmission member 47.

As described above, in the first drive body 36, the transmission member 41 is in contact with the first operated surface 33a of the second movable body 12 from the upper left direction, and driving force is applied to the second movable body 12 from the first drive body 36 toward the lower right direction or the upper left direction, and this direction is made to be the first driving direction. Furthermore, in the second drive body 42, the transmission member 47 is in contact with the second operated surface 34a of the second movable body 12 from the upper right direction, and driving force is applied to the second movable body 12 from the second drive body 42 toward the lower left direction or the upper right direction, and this direction is made to be the second driving direction.

The first driving direction and the second driving direction are made to be orthogonal to each other, and the first driving direction and the second driving direction are made to be different from the first movement direction of the first movable body 11 and the second movement direction of the second movable body 12 by 45 degrees (see FIG. 12).

Note that, in the above, an example has been described of the first drive body 36 and the second drive body 42 each including the piezoelectric elements 37b and 43b; however, the first drive body and the second drive body each may be, for example, an electromagnetic actuator that generates driving force by a coil and a magnet, or may be an electric actuator that generates driving force by rotation of a lead screw.

In the arrangement unit 13 of the base body 10, a lid 48 is attached from the front side in a state where the first movable body 11, the second movable body 12, the first drive body 36, and the second drive body 42 are arranged in the arrangement space 13a, and the first movable body 11, the second movable body 12, the first drive body 36, and the second drive body 42 are closed by the lid 48 (see FIGS. 3 to 5). The lid 48 is formed with a passage hole 48a penetrating in the front-rear direction.

Bias springs 49, 49, and 49 are arranged between the front surface of the peripheral surface portion 29 in the second movable body 12 and the rear surface of the lid 48 (see FIGS. 5 and 10). The bias springs 49, 49, and 49 are, for example, compression coil springs, and the rear ends are supported by the spring support protrusions 29a, 29a, and 29a of the second movable body 12. The second movable body 12 is biased backward by the bias springs 49, 49, and 49, and the second movable body 12 is biased backward, whereby the first movable body 11 is also biased backward.

Thus, the second movable body 12 is pressed against the second guides 25 and 25 and the second rolling member 26, the second guides 25 and 25 and the second rolling member 26 are pressed against the first movable body 11, the first movable body 11 is pressed against the first guides 21 and 21 and the first rolling member 22, and the first guides 21 and 21 and the first rolling member 22 are pressed against the base surface portion 15 of the base body 10.

Note that, in the blur correction device 9, since the base body 10 is provided with the stopper protrusions 29b, 29b, . . . protruding forward, when a large impact is applied to the imaging device 1 due to dropping or the like, the stopper protrusions 29b, 29b, . . . are in contact with the rear surface of the lid 48, and excessive forward movement of the second movable body 12 and the first movable body 11 is prevented.

As described above, since the first actuator 37 and the second actuator 43 are attached to the base body 10 that supports the first movable body 11, a dedicated member is not necessary for attaching the first actuator 37 and the second actuator 43, and the structure of the blur correction device 9 can be simplified.

Furthermore, the base body 10 is provided with the arrangement unit 13 of a substantially rectangular shape in which the first movable body 11 and the second movable body 12 are arranged, and the first drive body 36 and the second drive body 42 are respectively attached to the corners of the arrangement unit 13 outside the first movable body 11 and the second movable body 12.

Thus, the first drive body 36 and the second drive body 42 are arranged in a portion near the outer periphery in the arrangement unit 13, so that the blur correction device 9 can be downsized by effective use of the space.

Note that, the first drive body 36 and the second drive body 42 may be attached to portions other than the corners of the arrangement unit 13.

Moreover, since the outer shape of the first movable body 11 is made smaller than the outer shape of the second movable body 12, the first movable body 11 and the second movable body 12 can be arranged in a state where the first movable body 11 does not protrude outward from the second movable body 12, and the blur correction device 9 can be further downsized.

In particular, the first movable body 11 is movable only in the left-right direction with respect to the base body 10, and has a function of restricting rotation of the second movable body 12 and the shift lens group 3a held by the second movable body 12 in a direction around the optical axis, and the first movable body 11 that restricts the rotation is positioned inside the second movable body 12, whereby the imaging device 1 can be downsized in the radial direction of the lens barrel 2 and the structure can be simplified.

Further, since the base body 10 is formed with the arrangement space 13a in which the first movable body 11, the second movable body 12, the first drive body 36, and the second drive body 42 are arranged, the first movable body 11, the second movable body 12, the first drive body 36, and the second drive body 42 are arranged in the same space formed in the base body 10, and the blur correction device 9 can be further downsized by effective use of the arrangement space.

<Operation of Blur Correction Device According to First Embodiment>

Hereinafter, blur correction operation will be described in the blur correction device 9 (see FIGS. 17 to 26). Note that, in FIGS. 17 to 26, each unit is simplified and illustrated to facilitate understanding of the blur correction operation.

Note that, in the blur correction device 9, the first movable body 11 is movable only in the left-right direction (first movement direction) by the first guides 21 and 21 with respect to the base body 10, and the second movable body 12 is movable only in the upward-downward direction (the second movement direction) by the second guides 25 and 25 with respect to the first movable body 11. Thus, in the blur correction operation described below, so-called rolling operation does not occur that is operation in the rotational direction of the first movable body 11 and the second movable body 12 with respect to the base body 10 in a direction around the optical axis. Furthermore, since the first movable body 11 and the second movable body 12 are biased backward by the bias springs 49, 49, . . . , the first movable body 11 and the second movable body 12 are not moved in the front-rear direction in the blur correction operation.

In a state before the blur correction operation is performed, the first drive body 36 and the second drive body 42 are not operated. The first drive body 36 is made to be in a state where the first driving force transmission portions 41a and 41a of the transmission member 41 are in contact with a central portion in the front-rear direction of the first operated surface 33a formed on the receiving protrusion 33 of the second movable body 12, and the second drive body 42 is made to be in a state where the second driving force transmission portions 47a and 47a of the transmission member 47 are in contact with a central portion in the front-rear direction of the second operated surface 34a formed on the receiving protrusion 34 of the second movable body 12 (see FIG. 17).

Figure 18:
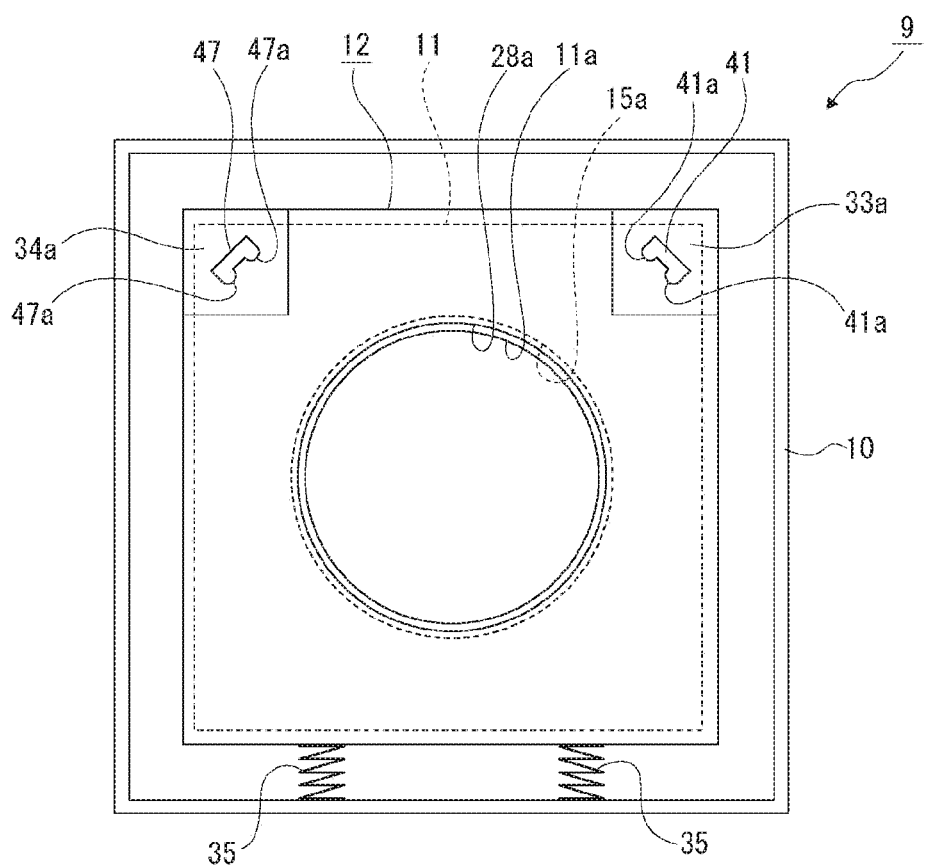
FIG. 18 is a schematic front view illustrating the state in which the first movable body and the second movable body are at the reference positions.

Thus, in the blur correction device 9, the first movable body 11 and the second movable body 12 are at reference positions and not moved in either the left-right direction or the upward-downward direction (see FIG. 18).

First, the blur correction operation in the second movement direction (upward-downward direction) in the blur correction device 9 will be described (see FIGS. 19 to 22).

Figure 19:
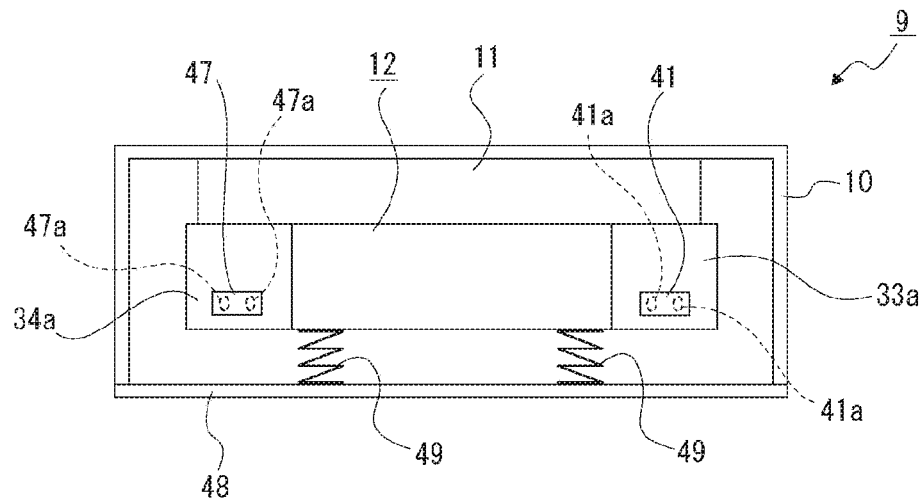
FIG. 19 is a schematic plan view illustrating a state in which a first slider and a second slider are moved forward.

In the blur correction device 9, when voltages are applied to the piezoelectric elements 37b and 43b of the first actuator 37 and the second actuator 43, and the drive shafts 37c and 43c are operated and the first slider 38 and the second slider 44 are moved forward, the first driving force transmission portions 41a and 41a are slid on the first operated surface 33a and moved to the front end side of the first operated surface 33a, and the second driving force transmission portions 47a and 47a are slid on the second operated surface 34a and moved to the front end side of the second operated surface 34a (see FIG. 19).

Figure 20:
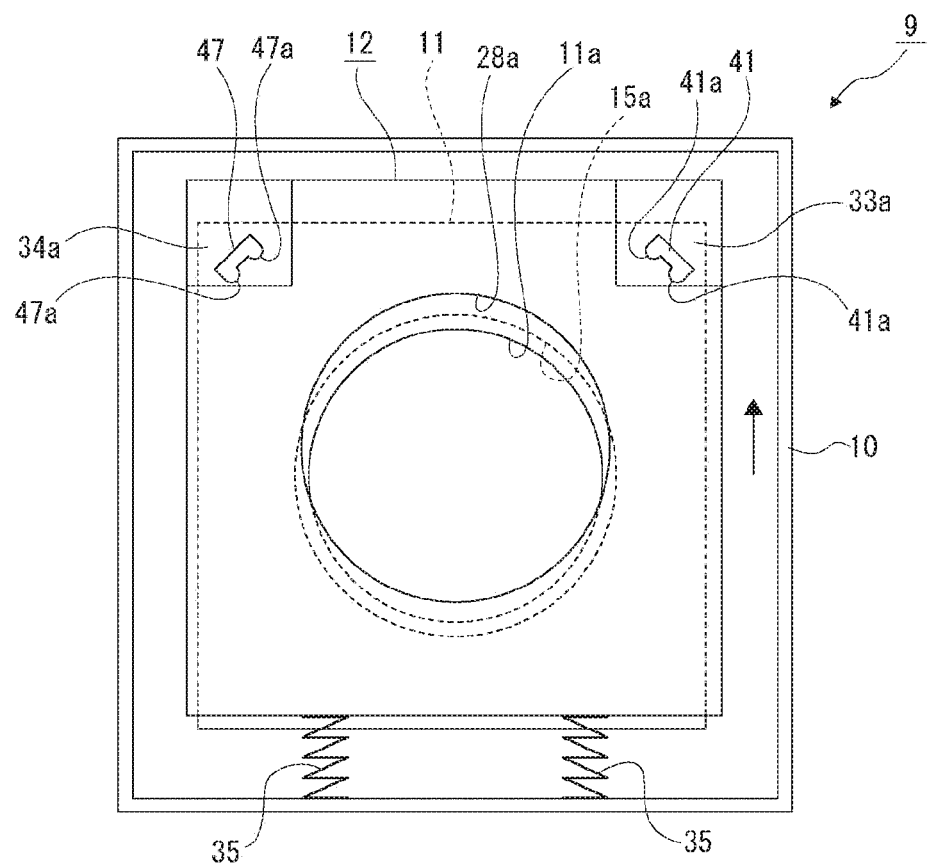
FIG. 20 is a schematic front view illustrating a state in which the first slider and the second slider are moved forward and the second movable body is moved in a second movement direction.

When the first driving force transmission portions 41a and 41a are moved to the front end side of the first operated surface 33a and the second driving force transmission portions 47a and 47a are moved to the front end side of the second operated surface 34a, the second movable body 12 biased upward by the pressing springs 35 and 35 is guided by the second guides 25 and 25 with respect to the first movable body 11 and moved upward (see FIG. 20).

Figure 21:
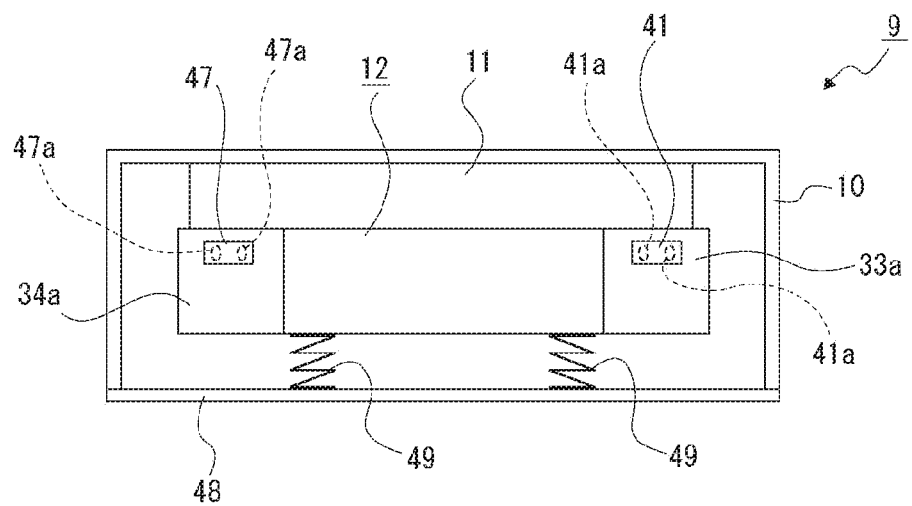
FIG. 21 is a schematic plan view illustrating a state in which the first slider and the second slider are moved backward.

On the other hand, in the blur correction device 9, when voltages are applied to the piezoelectric elements 37b and 43b of the first actuator 37 and the second actuator 43, and the drive shafts 37c and 43c are operated and the first slider 38 and the second slider 44 are moved backward, the first driving force transmission portions 41a and 41a are slid on the first operated surface 33a and moved to the rear end side of the first operated surface 33a, and the second driving force transmission portions 47a and 47a are slid on the second operated surface 34a and moved to the rear end side of the second operated surface 34a (see FIG. 21).

Figure 22:
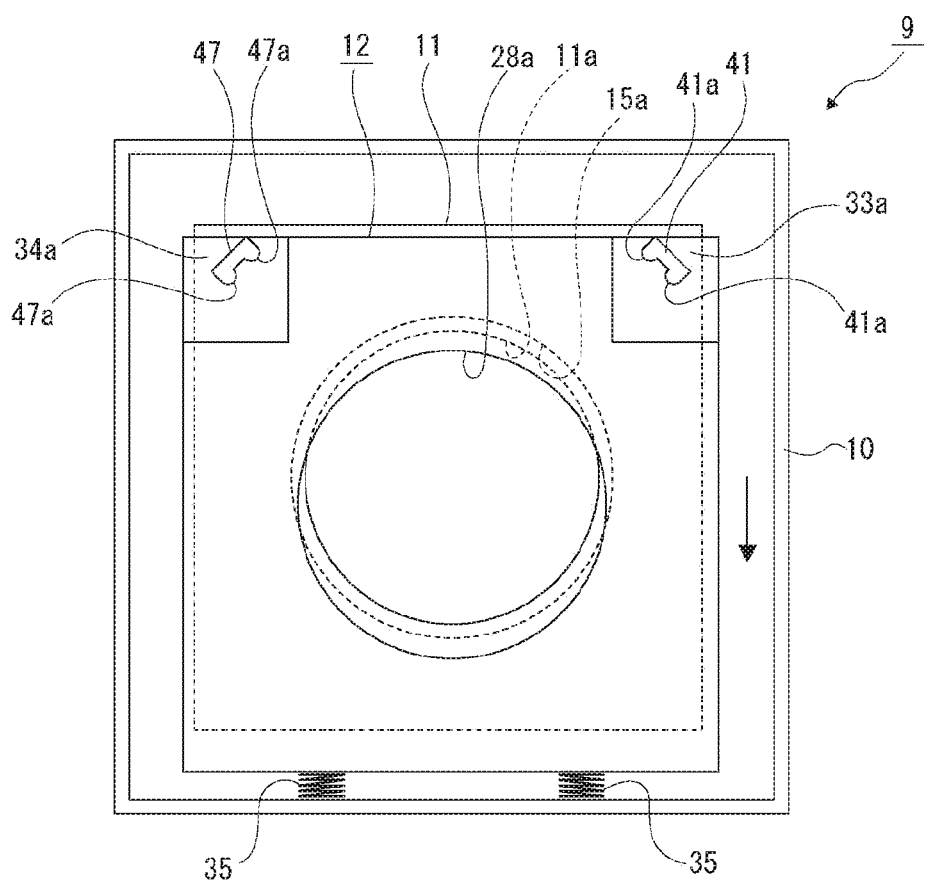
FIG. 22 is a schematic front view illustrating a state in which the first slider and the second slider are moved backward and the second movable body is moved in the second movement direction.

When the first driving force transmission portions 41a and 41a are moved to the rear end side of the first operated surface 33a, and the second driving force transmission portions 47a and 47a are moved to the rear end side of the second operated surface 34a, the second movable body 12 is guided by the second guides 25 and 25 with respect to the first movable body 11 against biasing force of the pressing springs 35 and 35 and moved downward (see FIG. 22).

Next, the blur correction operation in the first movement direction (left-right direction) in the blur correction device 9 will be described (see FIGS. 23 to 26).

Figure 23:
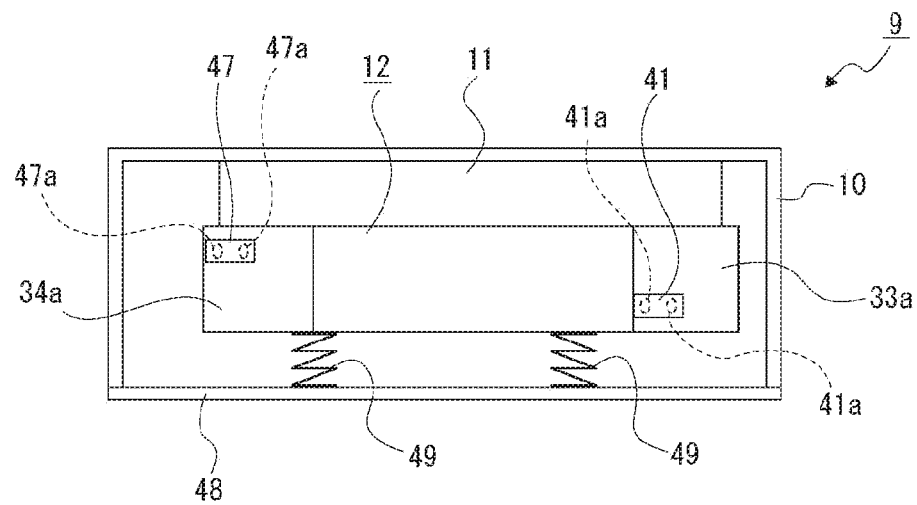
FIG. 23 is a schematic plan view illustrating a state in which the first slider is moved forward and the second slider is moved backward.

In the blur correction device 9, when voltages are applied to the piezoelectric elements 37b and 43b of the first actuator 37 and the second actuator 43, and the drive shafts 37c and 43c are operated and the first slider 38 is moved forward and the second slider 44 is moved backward, the first driving force transmission portions 41a and 41a are slid on the first operated surface 33a and moved to the front end side of the first operated surface 33a, and the second driving force transmission portions 47a and 47a are slid on the second operated surface 34a and moved to the rear end side of the second operated surface 34a (see FIG. 23).

Figure 24:
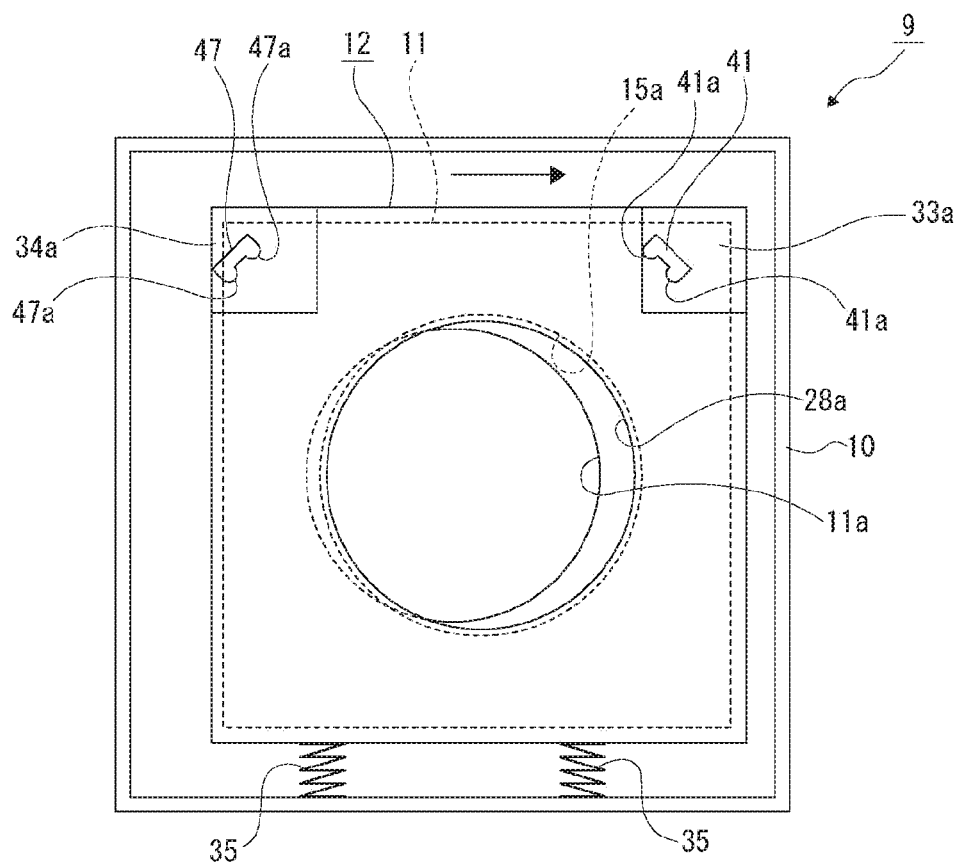
FIG. 24 is a schematic front view illustrating a state in which the first slider is moved forward and the second slider is moved backward, and the first movable body and the second movable body are integrally moved in a first movement direction.

When the first driving force transmission portions 41a and 41a are moved to the front end side of the first operated surface 33a, and the second driving force transmission portions 47a and 47a are moved to the rear end side of the second operated surface 34a, moving force to the left is applied to the second movable body 12, the applied moving force is transmitted from the second movable body 12 to the first movable body 11, and the first movable body 11 is guided by the first guides 21 and 21 integrally with the second movable body 12 and moved to the left (see FIG. 24).

Figure 25:
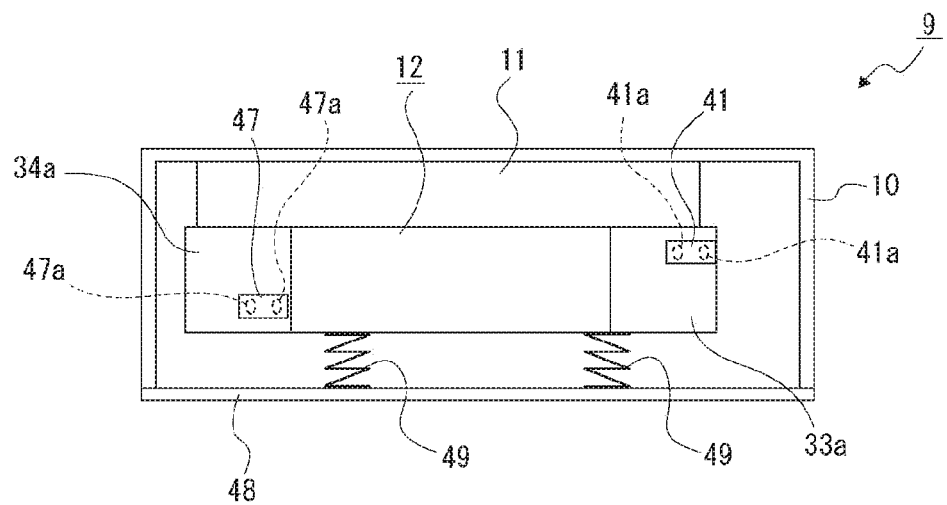
FIG. 25 is a schematic plan view illustrating a state in which the first slider is moved backward and the second slider is moved forward.

On the other hand, in the blur correction device 9, when voltages are applied to the piezoelectric elements 37b and 43b of the first actuator 37 and the second actuator 43, and the drive shafts 37c and 43c are operated and the first slider 38 is moved backward and the second slider 44 is moved forward, the first driving force transmission portions 41a and 41a are slid on the first operated surface 33a and moved to the rear end side of the first operated surface 33a, and the second driving force transmission portions 47a and 47a are slid on the second operated surface 34a and moved to the front end side of the second operated surface 34a (see FIG. 25).

Figure 26:
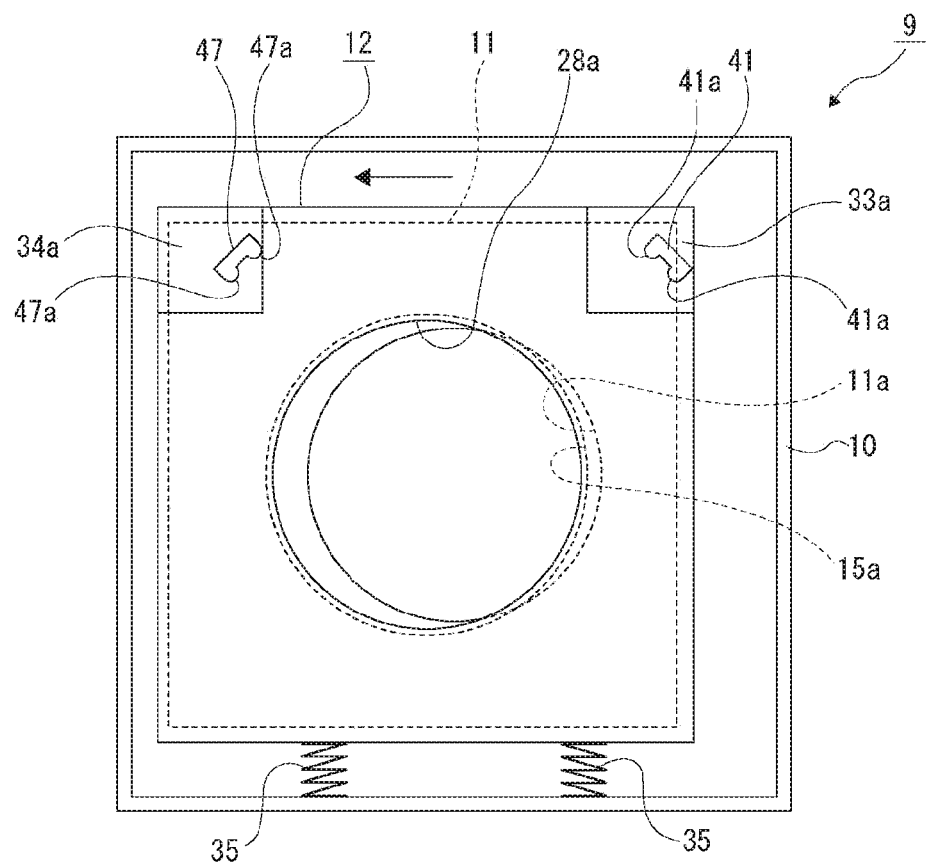
FIG. 26 is a schematic front view illustrating a state in which the first slider is moved backward, the second slider is moved forward, and the first movable body and the second movable body are integrally moved in the first movement direction.

When the first driving force transmission portions 41a and 41a are moved to the rear end side of the first operated surface 33a, and the second driving force transmission portions 47a and 47a are moved to the front end side of the second operated surface 34a, moving force to the right is applied to the second movable body 12, the applied moving force is transmitted from the second movable body 12 to the first movable body 11, and the first movable body 11 is guided by the first guides 21 and 21 integrally with the second movable body 12 and moved to the right (see FIG. 26).

As described above, the second movable body 12 is moved in the upward-downward direction with respect to the first movable body 11 and is moved integrally with the first movable body 11 in the left-right direction, whereby blur correction is performed in which the shift lens group 3a held by the second movable body 12 is also moved in the upward-downward and left-right directions, and the optical axis of the shift lens group 3a is displaced and an image blur is corrected.

Note that, in the above, an example has been described in which the first driving force transmission portions 41a and 41a and the second driving force transmission portions 47a and 47a are simultaneously moved with respect to the first operated surface 33a and the second operated surface 34a; however, only one of the first driving force transmission portions 41a and 41a, or the second driving force transmission portions 47a and 47a may be moved with respect to the first operated surface 33a or the second operated surface 34a. Furthermore, by changing magnitude of the voltages and directions of the current applied to the first actuator 37 and the second actuator 43, it is possible to adjust amounts of movement and movement directions in the front-rear direction of the first driving force transmission portions 41a and 41a and the second driving force transmission portions 47a and 47a, and move the second movable body 12 to an arbitrary position in a plane orthogonal to the optical axis.

As described above, in the blur correction device 9, the first movable body 11 and the second movable body 12 are positioned side by side in the optical axis direction (front-rear direction), and the first movement direction is made to be a direction orthogonal to the optical axis direction, and the second movement direction is made to be a direction orthogonal to both the optical axis direction and the first movement direction.

Thus, the first movement direction in which the first movable body 11 is moved and the second movement direction in which the second movable body 12 is moved are directions orthogonal to each other and both orthogonal to the optical axis, so that highly reliable blur correction can be performed.

Note that, in the above, an example has been described in which the first movable body 11 is moved in the first movement direction that is the left-right direction, and the second movable body 12 is moved in the second movement direction that is the upward-downward direction; however, conversely, the first movable body 11 may be moved in the upward-downward direction, and the second movable body 12 may be moved in the left-right direction.

Furthermore, in the blur correction device 9, the first driving direction that is a driving direction of the driving force applied from the first drive body 36 to the second movable body 12 is made to be the lower left direction and the upper left direction, and the second driving direction that is a driving direction of the driving force applied from the second drive body 42 to the second movable body 12 is made to be the lower left direction and the upper right direction, and the first driving direction and the second driving direction are both made to be orthogonal to the optical axis direction and are orthogonal to each other.

Thus, the first driving direction and the second driving direction are directions orthogonal to each other and both orthogonal to the optical axis, so that highly reliable blur correction can be performed.

Figure 27:
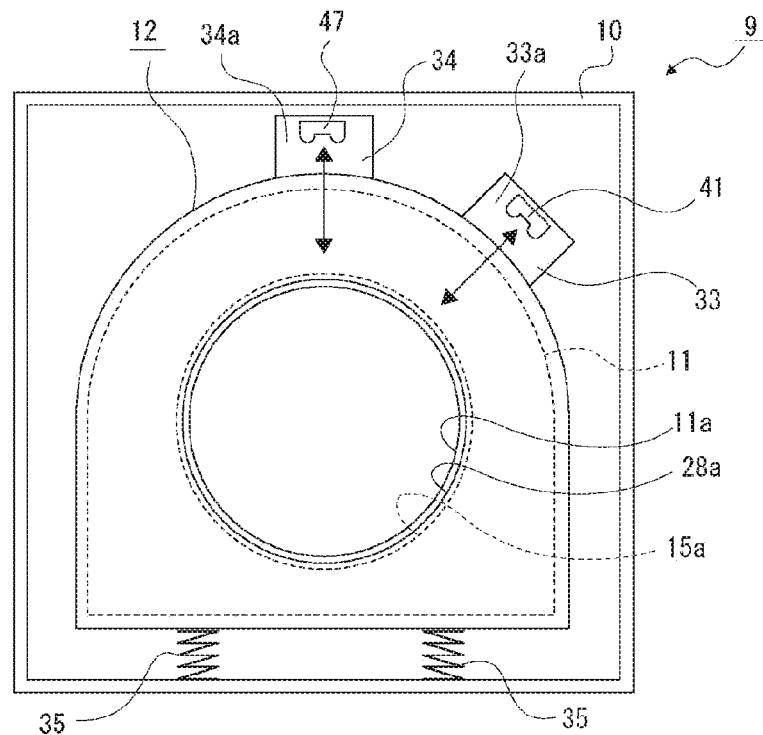
FIG. 27 is a schematic front view illustrating an example in which the first driving direction and the second driving direction are made directions other than directions orthogonal to each other.

Note that, the first driving direction and the second driving direction may be made to be directions other than the directions orthogonal to each other, for example, the first driving direction and the second driving direction may be made to have an angle of less than 90 degrees in the circumferential direction (see FIG. 27). Furthermore, the first driving direction and the second driving direction may be made to have an angle larger than 90 degrees in the circumferential direction.

Even in a case where the first driving direction and the second driving direction are made to have an angle other than the directions orthogonal to each other (90 degrees) as described above, by changing the magnitude of the voltages and the directions of the current applied to the first actuator 37 and the second actuator 43, it is possible to adjust the amounts of movement and the movement directions of the first driving force transmission portions 41a and 41a and the second driving force transmission portions 47a and 47a, and move the second movable body 12 to an arbitrary position in the plane orthogonal to the optical axis.

Furthermore, in the blur correction device 9, the first driving force transmission portions 41a and 41a are pressed against the first operated surface 33a in a slidable state, the second driving force transmission portions 47a and 47a are pressed against the second operated surface 34a in a slidable state, a position of at least one of a position of the first driving force transmission portions 41a and 41a with respect to the first operated surface 33a or a position of the second driving force transmission portions 47a and 47a with respect to the second operated surface 34a is changed, and the second movable body 12 is moved with respect to the base body 10.

Thus, the driving force of the first drive body 36 is transmitted to the first operated surface 33a, the driving force of the second drive body 42 is transmitted to the second operated surface 34a, and the second movable body 12 is moved, so that the second movable body 12 can be moved reliably with a simple configuration.

Moreover, the pressing springs 35 and 35 are provided that perform biasing in a direction in which the first operated surface 33a is pressed against the first driving force transmission portions 41a and 41a, and the second operated surface 34a is pressed against the second driving force transmission portions 47a and 47a.

Thus, the first operated surface 33a is pressed against the first driving force transmission portions 41a and 41a, and the second operated surface 34a is pressed against the second driving force transmission portions 47a and 47a, by the pressing springs 35 and 35, so that the driving force is reliably transmitted from the first drive body 36 and the second drive body 42 to the second movable body 12, and highly reliable blur correction can be performed while the number of parts is reduced.

Further, the first driving direction of the first drive body 36 and the second driving direction of the second drive body 42 are made to be different directions and inclined with respect to the upward, downward, left, and right directions, and the biasing direction by the pressing springs 35 and 35 is made to be the upward direction, whereby it is not necessary to provide springs that perform biasing in different directions to press the first operated surface 33a and the second operated surface 34a of the second movable body 12 respectively against the first driving force transmission portions 41a and 41a and the second driving force transmission portions 47a and 47a, and the structure can be simplified by reduction of the number of parts.

Furthermore, since the first operated surface 33a and the second operated surface 34a are both inclined with respect to the first movement direction and the second movement direction, the driving force of the first drive body 36 is transmitted to the first operated surface 33a made to be the inclined surface, the driving force of the second drive body 42 is transmitted to the second operated surface 34a made to be the inclined surface, the second movable body 12 is moved, and the second movable body 12 can be reliably moved with a simpler configuration.

Moreover, the inclination angle of the first operated surface 33a with respect to the first movement direction and the second movement direction is made to be the same as the inclination angle of the second operated surface 34a with respect to the first movement direction and the second movement direction.

Thus, the driving force of the first drive body 36 is transmitted to the first operated surface 33a made to be the inclined surface, the driving force of the second drive body 42 is transmitted to the second operated surface 34a inclined at the same inclination angle as that of the first operated surface 33a, and the second movable body 12 is moved, so that it is possible to make an amount of movement in the first movement direction and an amount of movement in the second movement direction of the second movable body 12 by the same driving force of the first drive body 36 and the second drive body 42 the same as each other, and movement control can be easily performed of the second movable body 12 to the first movement direction and the second movement direction.

However, in the blur correction device 9, a configuration may be made in which the inclination angle of the first operated surface 33a with respect to the first movement direction and the second movement direction is different from the inclination angle of the second operated surface 34a with respect to the first movement direction and the second movement direction, and the inclination angles of the first operated surface 33a and the second operated surface 34a are made to be different from each other, whereby it is possible to change the amounts of movement in the first movement direction and the second movement direction of the second movable body 12 with respect to the same driving force of the first drive body 36 and the second drive body 42.

Thus, control can be performed depending on the moving speed in the first movement direction and the second movement direction required for the second movable body 12, the characteristics of the first drive body 36 and the second drive body 42, for example, the driving force and the driving speed, or the like, and the degree of freedom can be improved in design regarding the movement control of the second movable body 12.

Figure 28:
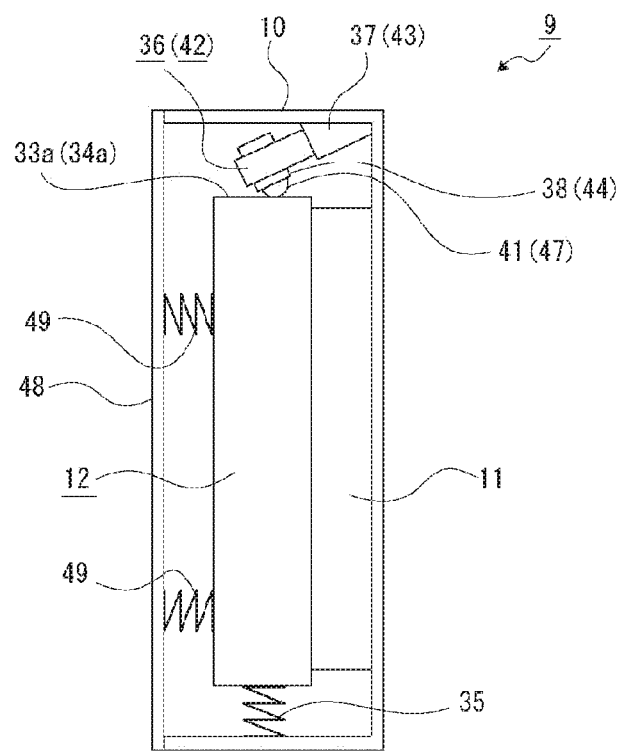
FIG. 28 is a schematic side view illustrating an example in which the first driving direction (second driving direction) is inclined with respect to a direction orthogonal to the optical axis.

Note that, in the above, an example has been described in which the first operated surface 33a and the second operated surface 34a are respectively inclined with respect to the first movement direction and the second movement direction, and the first driving direction of the first drive body 36 and the second driving direction of the second drive body 42 are directions orthogonal to the optical axis; however, for example, the first operated surface 33a and the second operated surface 34a may face the direction orthogonal to the optical axis, and the first driving direction of the first drive body 36 and the second driving direction of the second drive body 42 may be inclined with respect to the direction orthogonal to the optical axis (see FIG. 28).

Furthermore, in the above, an example has been described in which the second movable body 12 is biased by the pressing springs 35 and 35; however, for example, instead of the pressing springs 35 and 35, another means may be provided that performs biasing in a direction in which the first operated surface 33a and the second operated surface 34a of the second movable body 12 are respectively pressed against the first driving force transmission portions 41a and 41a and the second driving force transmission portions 47a and 47a. For example, the receiving protrusions 33 and 34 of the second movable body 12 may include magnetic materials, and the transmission member 41 of the first drive body 36 and the transmission member 47 of the second drive body 42 may include magnets, and the receiving protrusion 33 may be attracted by the transmission member 41 and the first operated surface 33a may be pressed against the first driving force transmission portions 41a and 41a, and the receiving protrusion 34 may be attracted by the transmission member 47 and the second operated surface 34a may be pressed against the second driving force transmission portions 47a and 47a. Note that, conversely, the receiving protrusions 33 and 34 of the second movable body 12 may include magnets, and the transmission members 41 and 47 may include magnetic materials.

In the blur correction device 9, as described above, a plurality of, for example, two each of the first driving force transmission portions 41a and 41a, and the second driving force transmission portions 47a and 47a are provided.

Thus, the first operated surface 33a is pressed against the plurality of first driving force transmission portions 41a and 41a, and the second operated surface 34a is pressed against the plurality of second driving force transmission portions 47a and 47a, so that the positions of the first drive body 36 and the second drive body 42 with respect to the second movable body 12 can be stabilized, and the driving force can be transmitted in a stable state to the second movable body 12 from the first drive body 36 and the second drive body 42.

Furthermore, the first movement direction in which the first movable body 11 is moved is made to be a different direction from the first driving direction of the driving force applied from the first drive body 36 to the second movable body 12, and the second movement direction in which the second movable body 12 is moved is made to be a different direction from the second driving direction of the driving force applied from the second drive body 42 to the second movable body 12.

Thus, the driving force of both the driving force of the first drive body 36 and the driving force of the second drive body 42 is transmitted and the second movable body 12 is moved, so that the second movable body 12 is moved in the first movement direction or the second movement direction depending on the magnitude of the driving force of the first drive body 36 and the second drive body 42, and the degree of freedom can be improved of the movement control for the second movable body 12.

Moreover, the first drive body 36 includes the first actuator 37 and the first slider 38 operated by the first actuator 37, and the second drive body 42 includes the second actuator 43 and the second slider 44 operated by the second actuator 43, and the first slider 38 and the second slider 44 are made to be slidable on the second movable body 12.

Thus, the driving force of the first drive body 36 and the driving force of the second drive body 42 are transmitted respectively from the first slider 38 and the second slider 44 to the second movable body 12, so that the driving force of the first drive body 36 and the second drive body 42 can be reliably transmitted to the second movable body 12 with a simple structure.

Further, the first movement direction and the second movement direction are made to be orthogonal to each other, and the first slider 38 and the second slider 44 are operated in a direction (front-rear direction) orthogonal to both the first movement direction and the second movement direction.

Thus, the first slider 38 and the second slider 44 are operated in the direction orthogonal to the movement directions of the first movable body 11 and the second movable body 12, so that the arrangement space of the first slider 38 and the second slider 44 is reduced in a plane including the movement directions of the first movable body 11 and the second movable body 12, in other words, in a plane orthogonal to the optical axis, and the imaging device 1 can be downsized in the radial direction of the lens barrel 2.

Furthermore, in the blur correction device 9, the first slider 38 and the second slider 44 are operated in the optical axis direction (front-rear direction), and the first movable body 11 and the second movable body 12 are operated in the direction orthogonal to the optical axis, whereby the movement directions of the first slider 38 and the second slider 44 are made to be different from the movement directions of the first movable body 11 and the second movable body 12.

The movement directions of the first slider 38 and the second slider 44 are made to be different from the movement directions of the first movable body 11 and the second movable body 12 as described above, whereby influence of the inertial mass of the first slider 38 and the second slider 44, and the first movable body 11 and the second movable body 12 is dispersed respectively in the operation direction and the movement direction. Thus, when a large impact is applied due to dropping or the like of the imaging device 1, the impact is dispersed in each direction, and occurrence of breakage or damage of each unit due to the impact can be suppressed.

Hereinafter, a control example will be described in the blur correction operation of the blur correction device 9 (see FIGS. 29 and 30).

Figure 29:
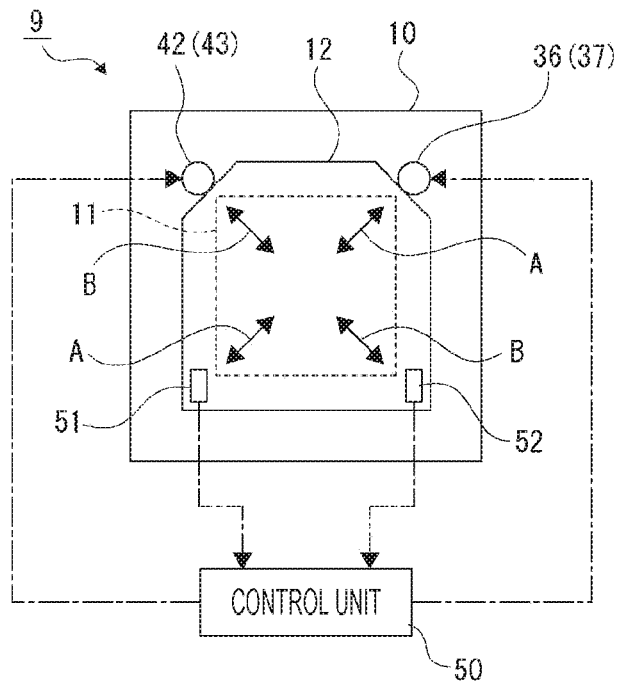
FIG. 29 is a schematic front view illustrating a configuration of the blur correction device for describing a control example of the blur correction operation.
Figure 30:
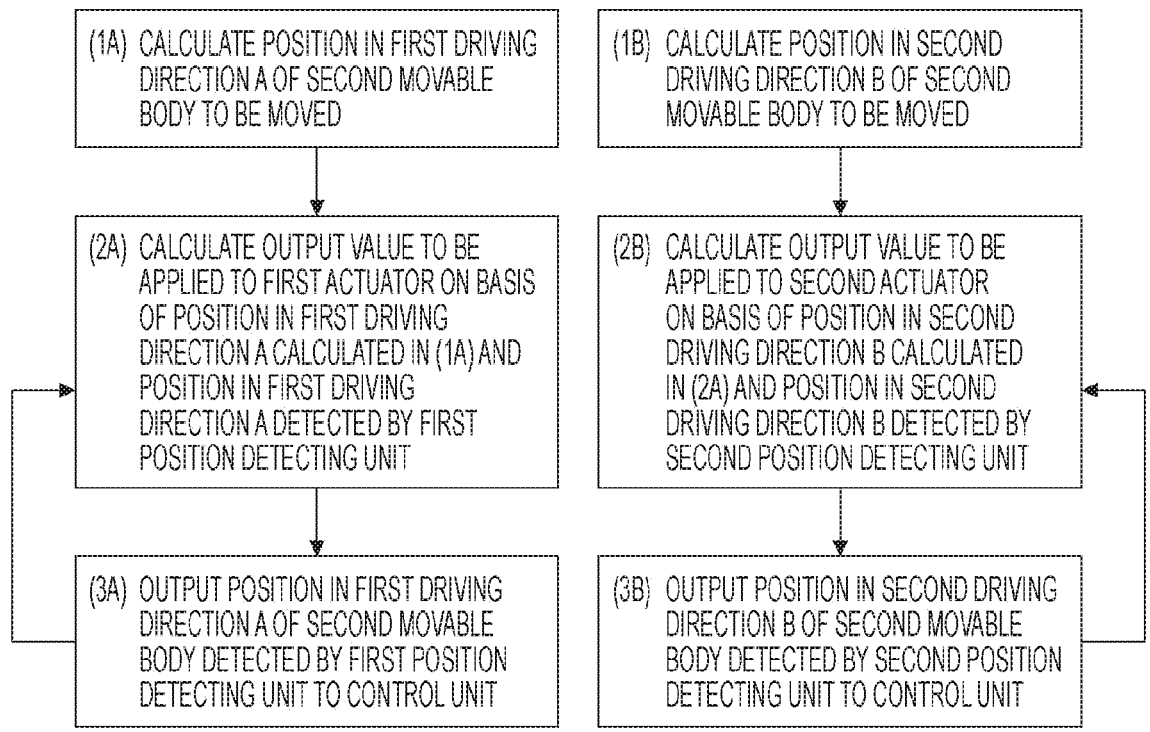
FIG. 30 is a flowchart illustrating a control example of the blur correction operation.

The imaging device 1 is provided with the control unit 50 (see FIG. 29). As the control unit 50, for example, the CPU 4 is used that comprehensively controls the entire imaging device 1.

The blur correction device 9 is provided with a first position detecting unit 51 that detects a position of the second movable body 12 in a first driving direction A, and a second position detecting unit 52 that detects a position of the second movable body 12 in a second driving direction B. As the first position detecting unit 51 and the second position detecting unit 52, various detectors are used such as an optical detector or a magnetic detector.

Control in the blur correction operation is performed in a procedure as described below (see FIG. 30).

(1A, 1B) The control unit 50 calculates each of the position in the first driving direction A and the position in the second driving direction B of the second movable body 12 to be moved to correct an image blur.

(2A, 2B) An output value to be applied to the first actuator 37 is calculated on the basis of the position in the first driving direction A calculated in (1A) and the position in the first driving direction A of the second movable body 12 detected by the first position detecting unit 51, and the calculated output value is output to the first actuator 37. At the same time, an output value to be applied to the second actuator 43 is calculated on the basis of the position in the second driving direction B calculated in (1B) and the position in the second driving direction B of the second movable body 12 detected by the second position detecting unit 52, and the calculated output value is output to the second actuator 43.

(3A, 3B) The position in the first driving direction A of the second movable body 12 operated on the basis of the output value of (2A) is detected by the first position detecting unit 51, and a detection result is output to the control unit 50 and operation of (2A) is performed. At the same time, the position in the second driving direction B of the second movable body 12 operated on the basis of the output value of (2B) is detected by the second position detecting unit 52, and a detection result is output to the control unit 50 and operation of (2B) is performed.

As described above, the positions in the first driving direction A and the second driving direction B of the second movable body 12 are respectively detected by the first position detecting unit 51 and the second position detecting unit 52 and the control is performed, whereby the detection positions of the second movable body 12 by the first position detecting unit 51 and the second position detecting unit 52 are made to coincide with the driving directions of the first drive body 36 and the second drive body 42, so that the control regarding the blur correction can be performed with a simple logic.

Next, another control example will be described in the blur correction operation of the blur correction device 9 (see FIGS. 31 and 32).

Figure 31:
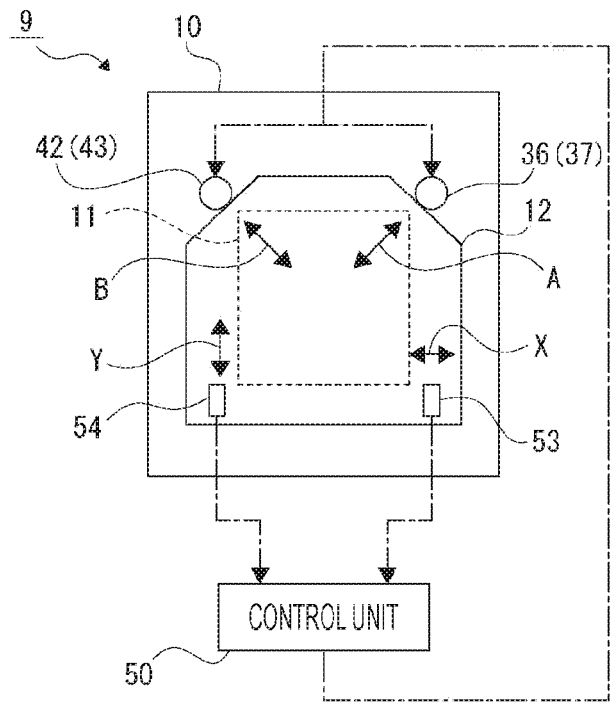
FIG. 31 is a schematic front view illustrating a configuration of the blur correction device for describing another control example of the blur correction operation.
Figure 32:
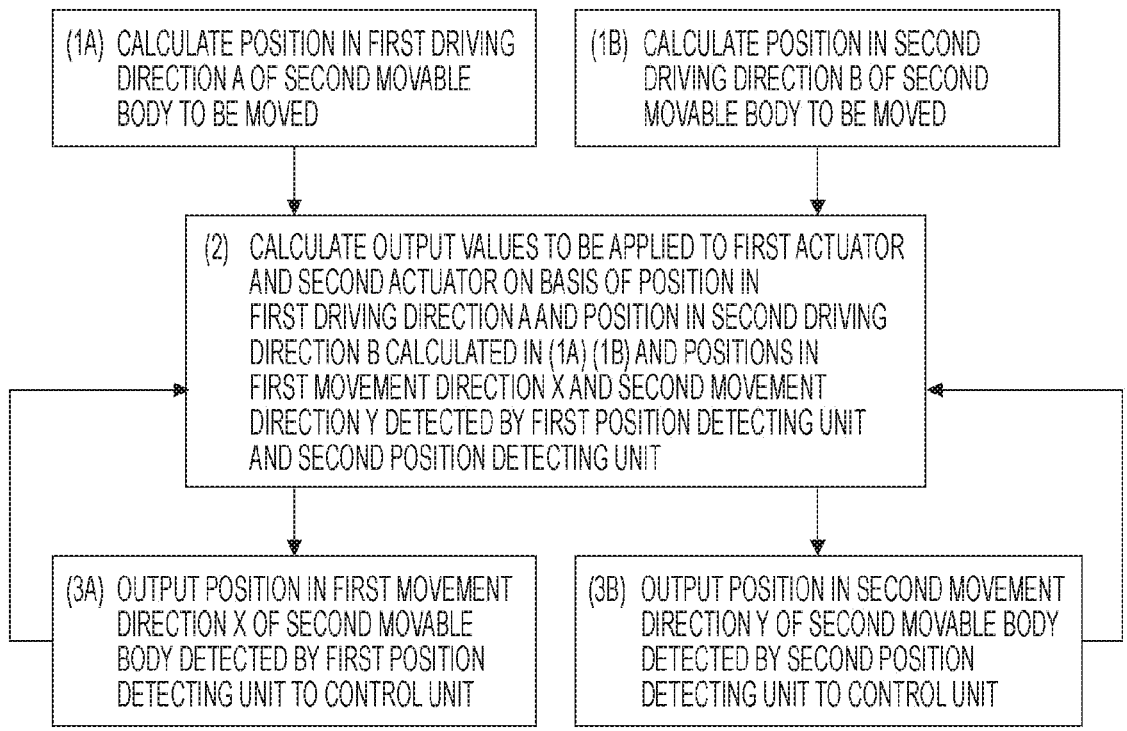
FIG. 32 is a flowchart illustrating still another control example of the blur correction operation.

The imaging device 1 is provided with the control unit 50 (see FIG. 31). As the control unit 50, for example, the CPU 4 is used that comprehensively controls the entire imaging device 1.

The blur correction device 9 is provided with a first position detecting unit 53 that detects a position of the second movable body 12 in a first movement direction X, and a second position detecting unit 54 that detects a position of the second movable body 12 in a second movement direction Y. As the first position detecting unit 53 and the second position detecting unit 54, various detectors are used such as an optical detector or a magnetic detector.

Control in the blur correction operation is performed in a procedure as described below (see FIG. 32).

(1A, 1B) The control unit 50 calculates each of the position in the first driving direction A and the position in the second driving direction B of the second movable body 12 to be moved to correct an image blur.

(2) Output values to be applied to the first actuator 37 and the second actuator 43 are each calculated on the basis of the position in the first driving direction A and the second driving direction B calculated in (1A, 1B), and the positions in the first movement direction X and the second movement direction Y of the second movable body 12 respectively detected by the first position detecting unit 53 and the second position detecting unit 54, and the calculated output values are output to the first actuator 37 and the second actuator 43.

(3A, 3B) The position in the first movement direction X of the second movable body 12 operated on the basis of the output value of (2) is detected by the first position detecting unit 53, and a detection result is output to the control unit 50, and operation of (2) is performed. At the same time, the position in the second movement direction Y of the second movable body 12 operated on the basis of the output value of (2) is detected by the second position detecting unit 54, and a detection result is output to the control unit 50, and operation of (2) is performed.

As described above, the positions in the first movement direction X and the second movement direction Y of the second movable body 12 are detected by the first position detecting unit 53 and the second position detecting unit 54 and the control is performed, whereby the positions in the first driving direction A and the second driving direction B of the second movable body 12 do not have to coincide with detection directions by the first position detecting unit 53 and the second position detecting unit 54. Thus, the degree of freedom is increased in design of the blur correction device 9, and for example, the first position detecting unit 53 and the second position detecting unit 54 can be arranged at positions where the blur correction device 9 is minimized, and the imaging device 1 can be downsized.

<Configuration of Blur Correction Device According to Second Embodiment>

Next, a configuration will be described of a blur correction device 9A according to a second embodiment (see FIGS. 33 to 43).

Note that, the blur correction device 9A described below is different from the above-described blur correction device 9 only in that the movement directions of the first movable body and the second movable body are different, and the biasing direction to the second movable body by the pressing spring is different, so that only the different parts will be described in detail as compared to the blur correction device 9, and the other parts will be denoted by the same reference numerals as the similar parts in the blur correction device 9, and the description will be omitted.

Figure 33:
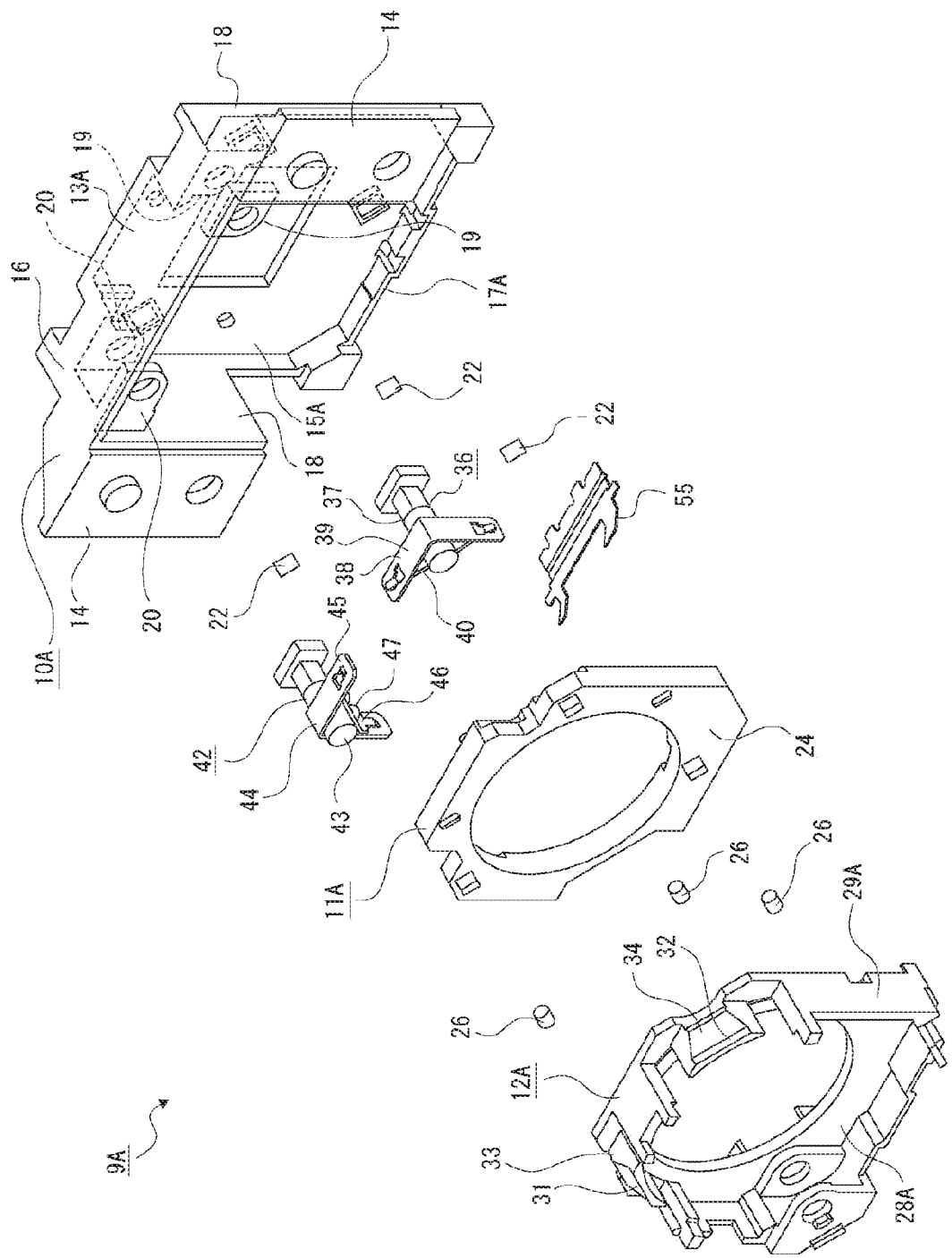
FIG. 33 illustrates a blur correction device according to a second embodiment together with FIGS. 34 to 43, and this figure is an exploded perspective view of the blur correction device.
Figure 34:
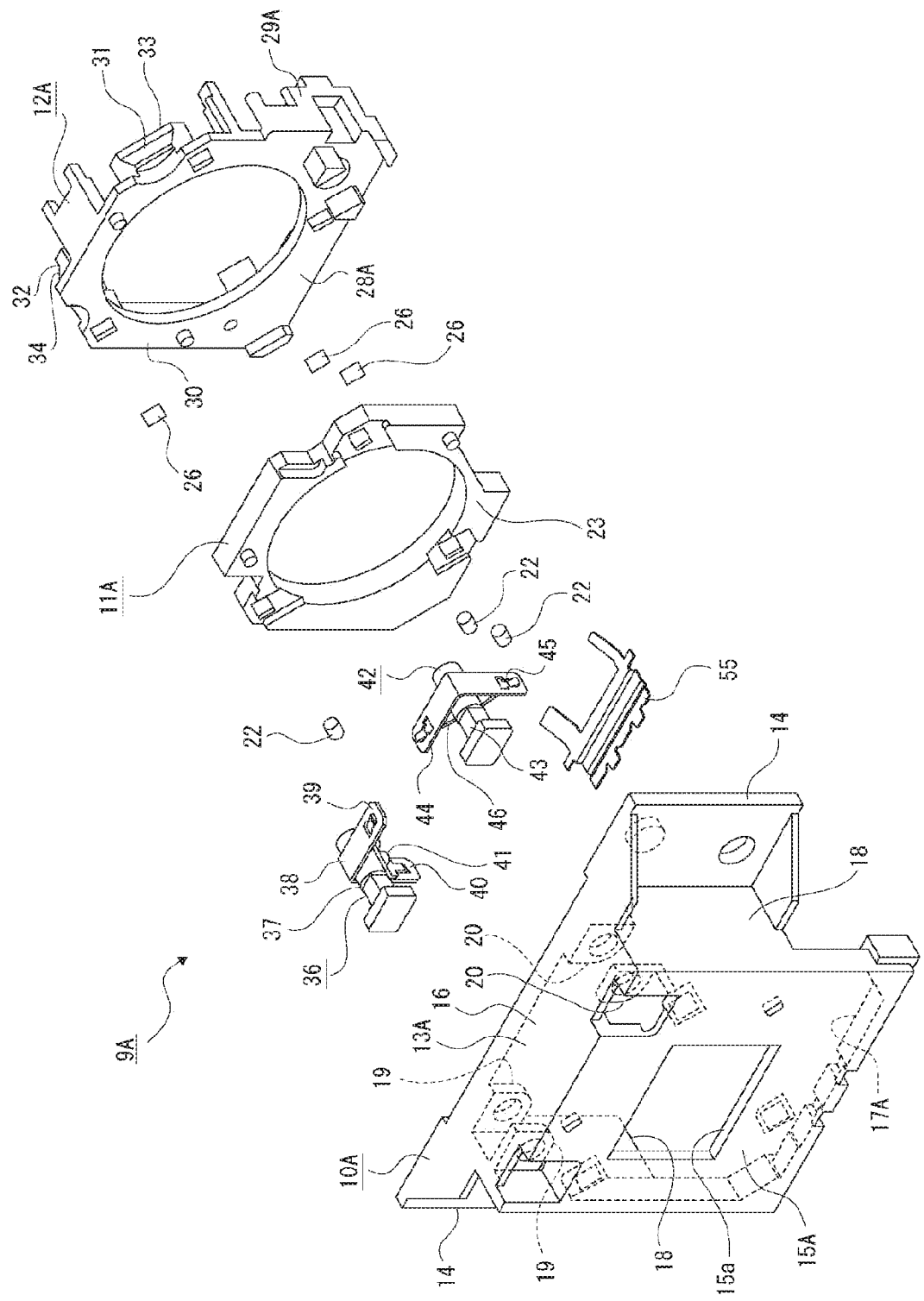
FIG. 34 is an exploded perspective view of the blur correction device as viewed from a direction different from that in FIG. 33.
Figure 35:
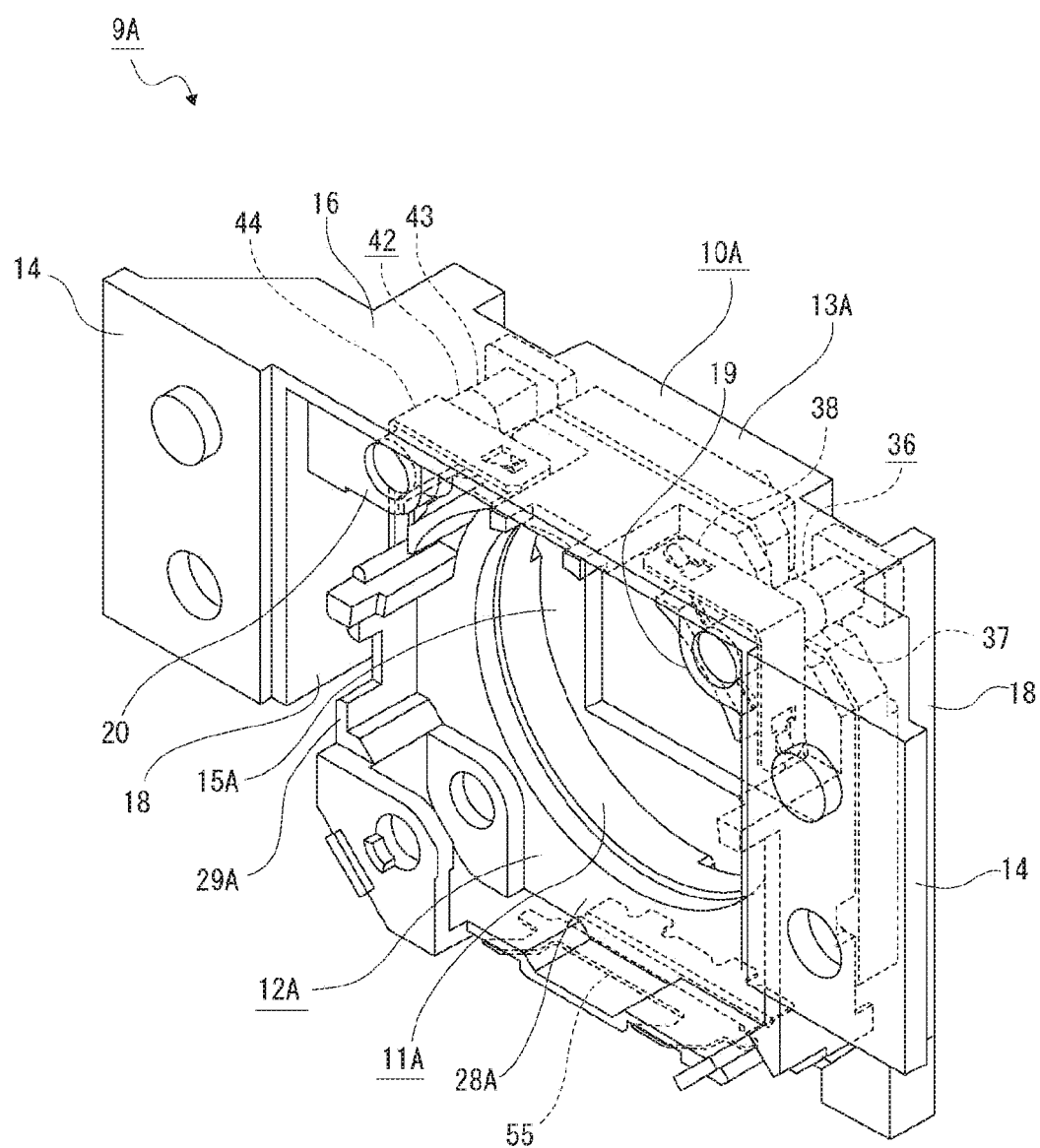
FIG. 35 is a perspective view of the blur correction device.

The blur correction device 9A includes a base body 10A arranged in a fixed state, a first movable body 11A that is movable in a first movement direction with respect to the base body 10A, and a second movable body 12A that is movable in a second movement direction with respect to the first movable body 11A (see FIGS. 33 to 35). The first movement direction and the second movement direction are both orthogonal to the optical axis, and the first movement direction is a direction connecting the lower right direction and the upper left direction and inclined by 45 degrees with respect to the front-rear direction and the left-right direction, and the second movement direction is a direction connecting the lower left direction and the upper right direction and inclined by 45 degrees with respect to the front-rear direction and the left-right direction.

Figure 36:
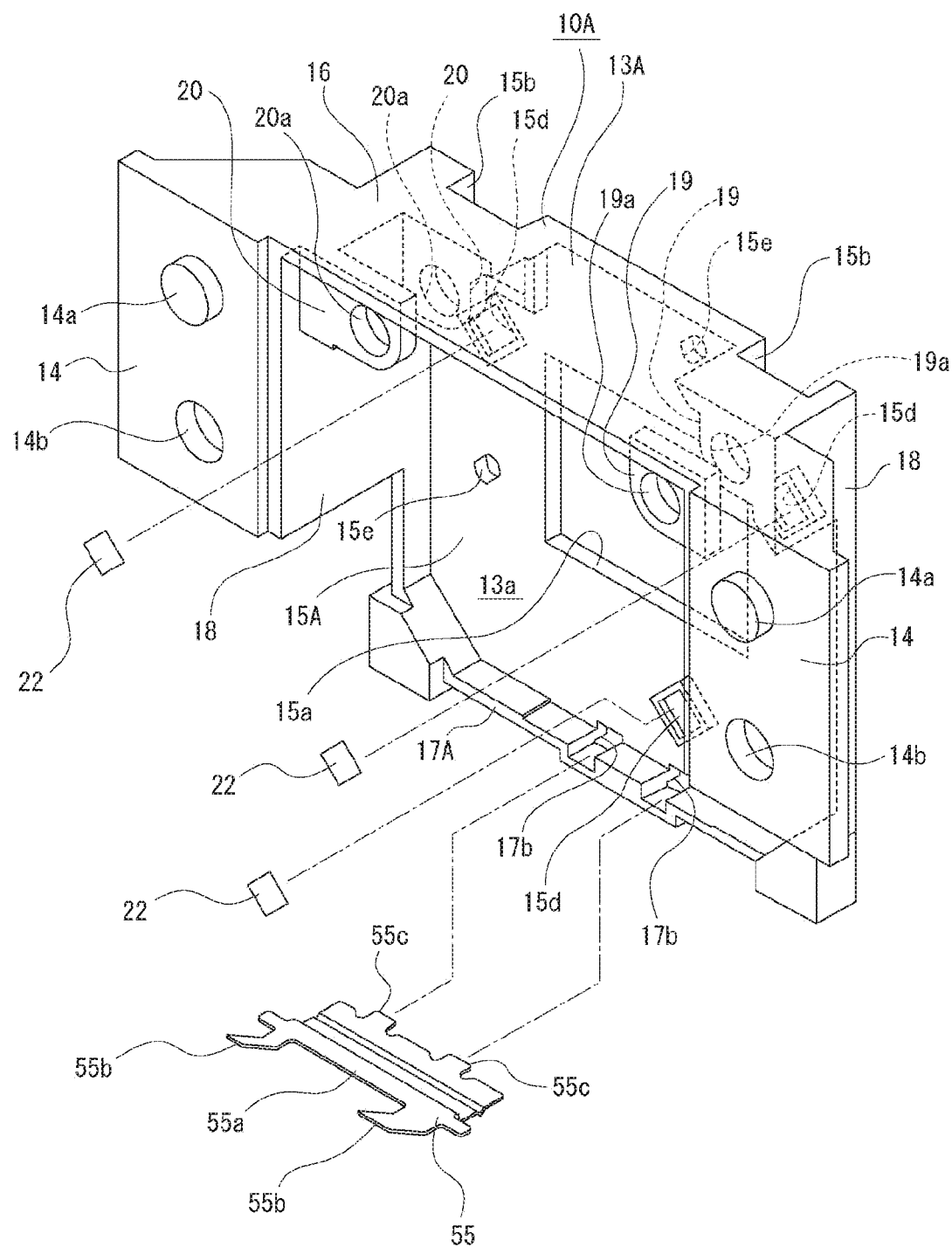

The base body 10A includes an arrangement unit 13A and the supported protrusions 14 and 14, and the arrangement unit 13A includes a base surface portion 15A, the upper surface portion 16, a lower surface portion 17A, and the side surface portions 18 and 18 (see FIG. 36).

The support recesses 15d, 15d, and 15d are formed in the base surface portion 15A. In the base surface portion 15A, guide holes 15e and 15e penetrating in the front-rear direction are formed instead of the arrangement recesses 15c and 15c. The guide holes 15e and 15e are positioned to be separated in the circumferential direction of the light transmission hole 15a, and formed in a long hole shape extending in the first movement direction.

In the lower surface portion 17A, spring mounting holes 17b and 17b are formed to be separated in the left-right direction instead of the spring support protrusions 17a and 17a.

The first rolling members 22, 22, and 22 are respectively supported by the support recesses 15d, 15d, and 15d of the base body 10A. The first rolling member 22 is supported by the support recess 15d in a state where the axial direction coincides with the second movement direction, and is made to be rotatable in a direction around the axis with respect to the base body 10A.

Figure 38:
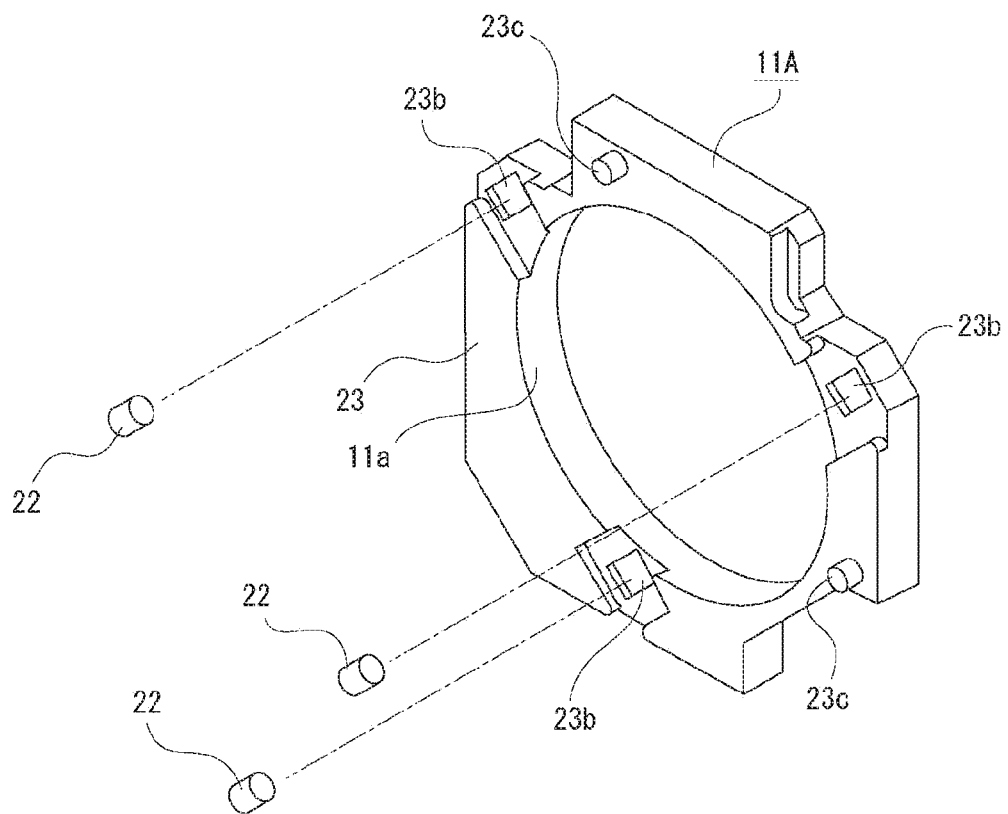
FIG. 38 is a perspective view of the first movable body and the like as viewed from a direction different from that in FIG. 37.
Figure 39:
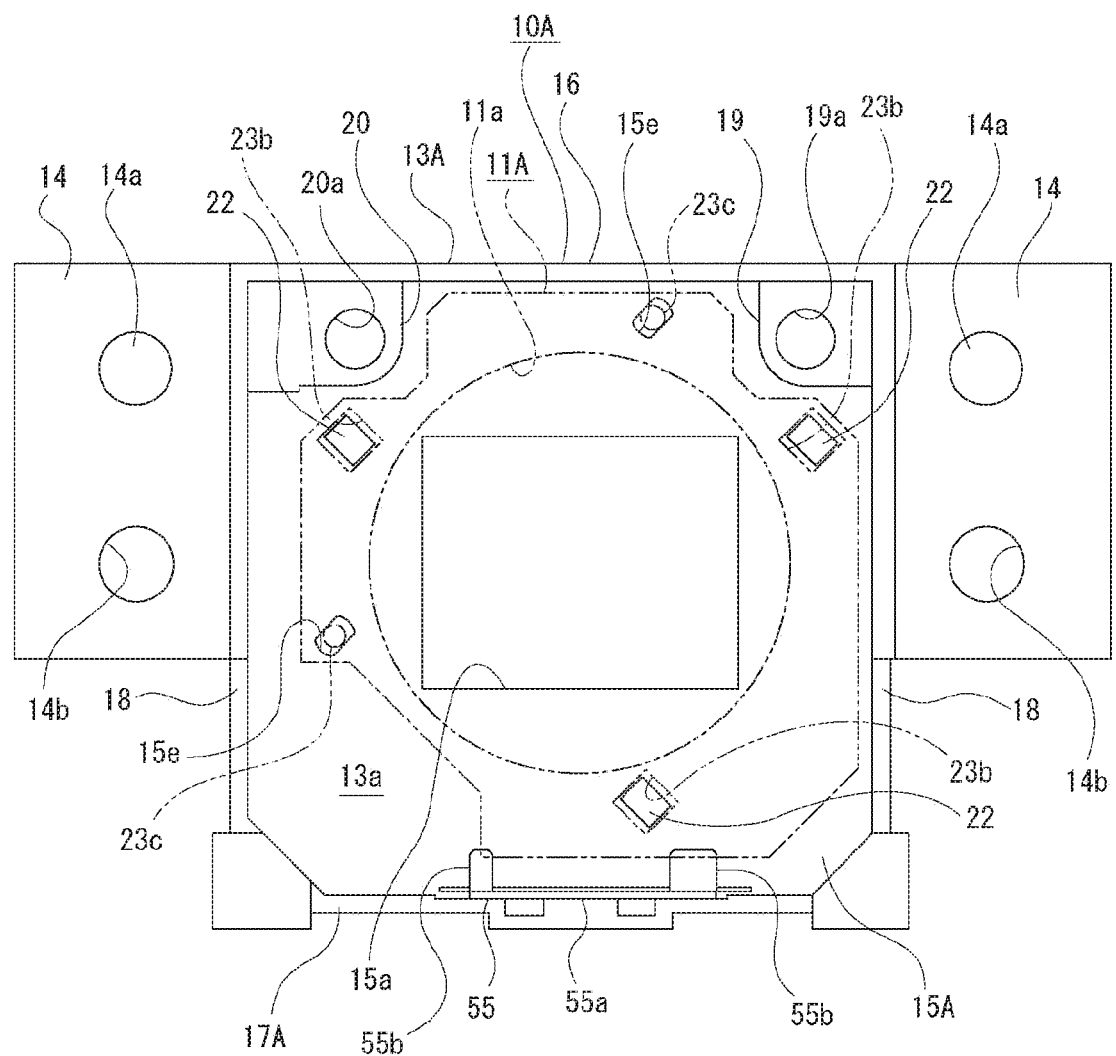
FIG. 39 is a front view illustrating a state in which the first movable body is supported by the base body.

On the rear surface 23 of the first movable body 11A, instead of the guided grooves 23a and 23a, guided protrusions 23c and 23c protruding backward are provided to be separated in the circumferential direction of the transmission hole 11a (see FIG. 38). On the rear surface 23 of the first movable body 11A, the support recesses 23b, 23b, and 23b opened backward are formed to be separated in the circumferential direction of the transmission hole 11a.

Figure 37:
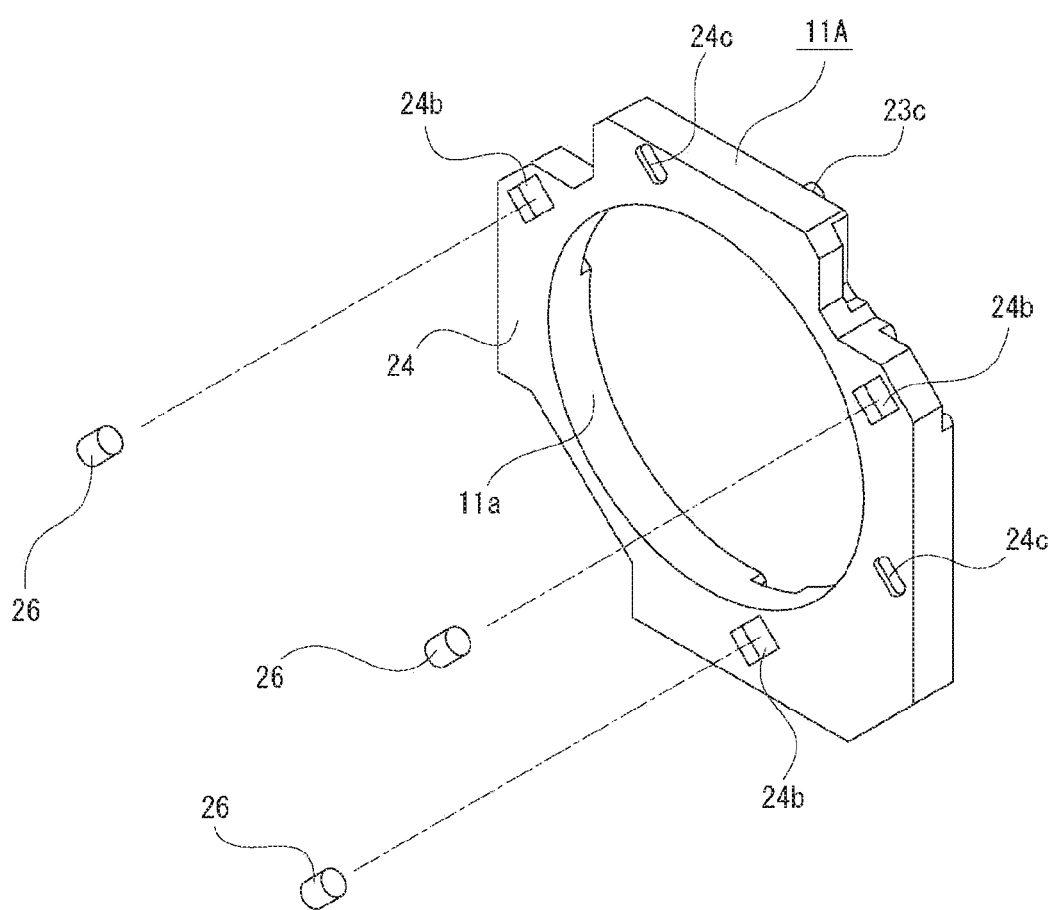

On the front surface 24 of the first movable body 11A, the support recesses 24b, 24b, and 24b are formed to be separated in the circumferential direction of the transmission hole 11a (see FIG. 37). On the front surface 24 of the first movable body 11A, instead of the arrangement recesses 24a and 24a, guide holes 24c and 24c opened forward are formed. The guide holes 24c and 24c are positioned to be separated in the circumferential direction of the light transmission hole 15a, and formed in a long hole shape extending in the second movement direction.

The guided protrusions 23c and 23c of the first movable body 11A are slidably supported respectively by the guide holes 15e and 15e of the base body 10A (see FIG. 39), and the guided protrusions 23c and 23c are respectively guided by the guide holes 15e and 15e, whereby the first movable body 11A is movable in the first movement direction with respect to the base body 10A.

The first rolling members 22, 22, and 22 are respectively supported by the support recesses 23a, 23a, and 23a of the first movable body 11A, and the first rolling members 22, 22, and 22 are rolled between the base body 10A and the first movable body 11A, whereby the first movable body 11A is smoothly moved in the first movement direction with respect to the base body 10A.

The second rolling members 26, 26, and 26 are respectively supported by the support recesses 24b, 24b, and 24b of the first movable body 11A. The second rolling member 26 is formed in a cylindrical or columnar shape, is supported by the support recess 24b in a state where the axial direction coincides with the first movement direction, and is made to be rotatable in a direction around the axis with respect to the first movable body 11A.

Figure 40:
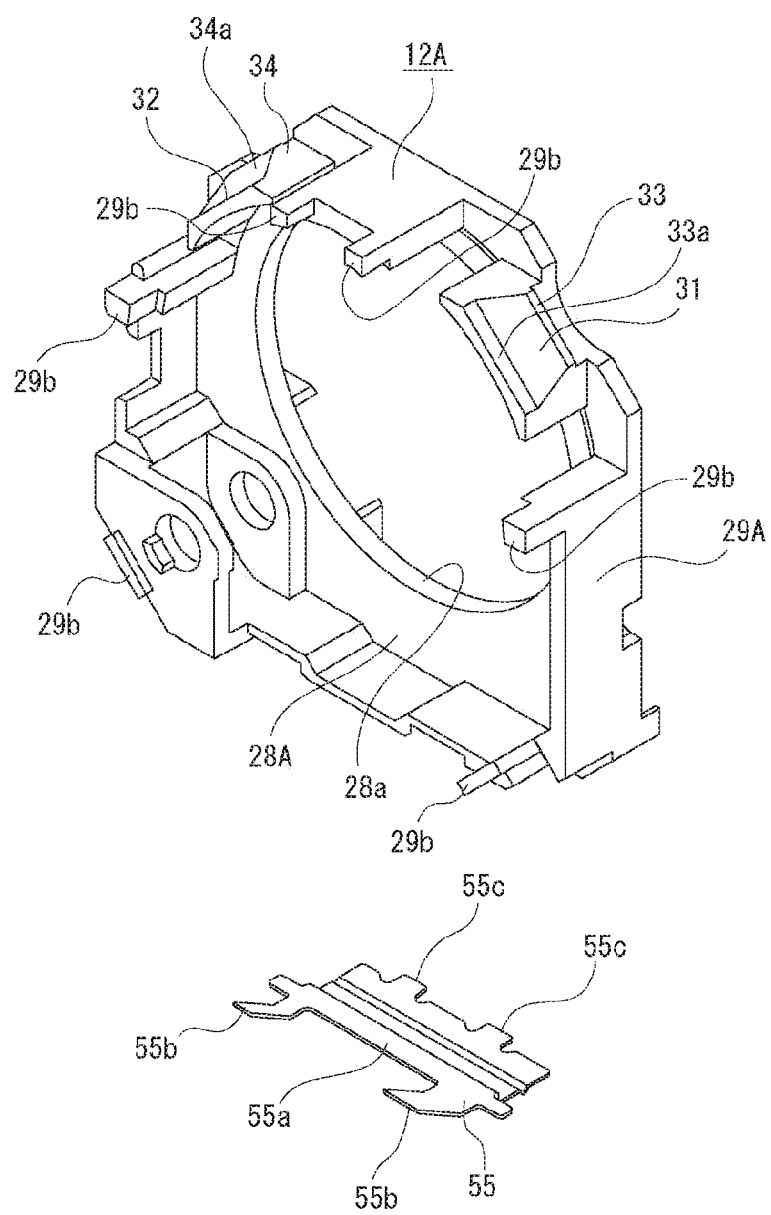
Figure 41:
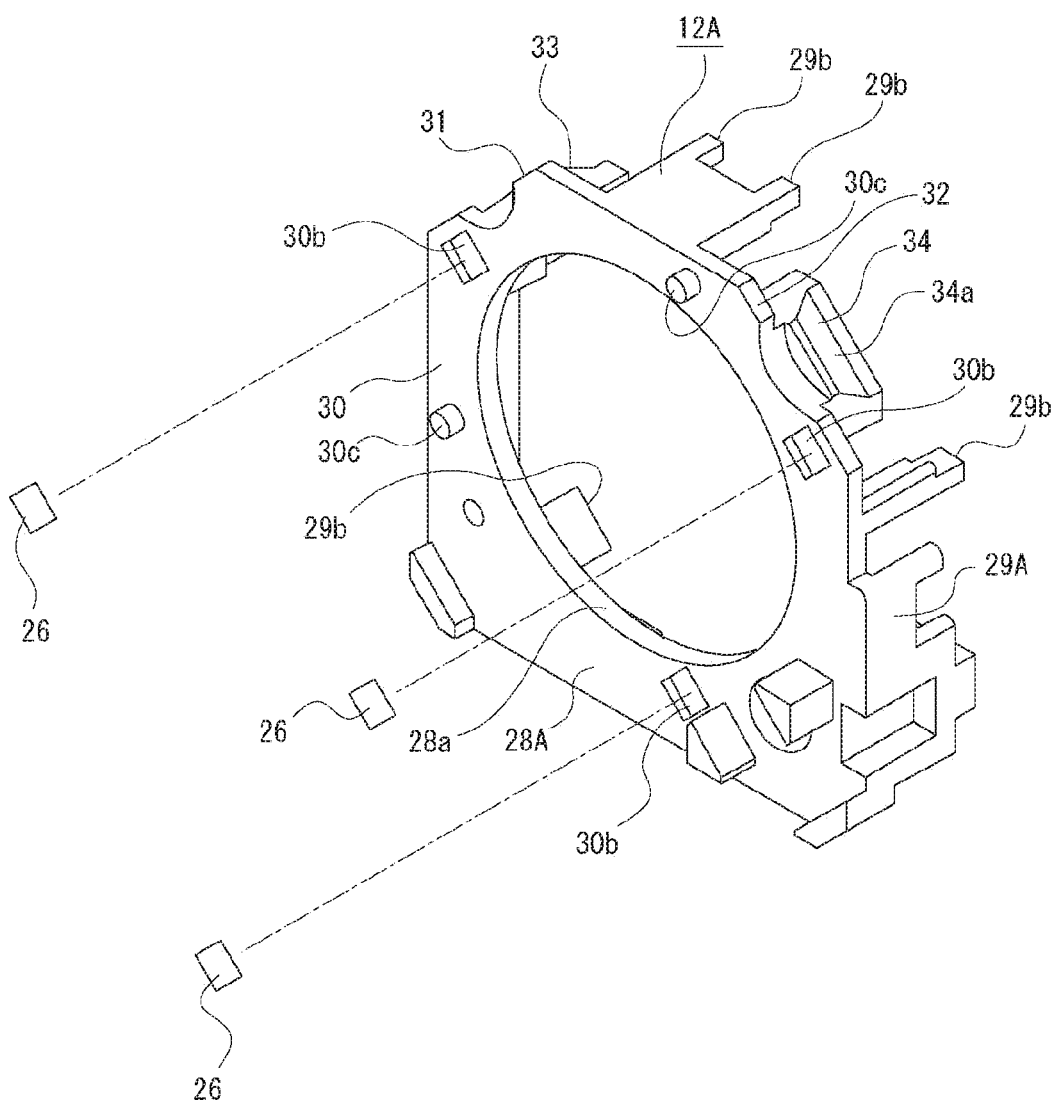
FIG. 41 is a perspective view illustrating the second movable body and the like as viewed from a direction different from that in FIG. 40.

The second movable body 12A includes a base surface portion 28A formed in an annular shape, and a peripheral surface portion 29A protruding forward from the outer peripheral portion of the base surface portion 28A (see FIGS. 40 and 41). The outer shape of the second movable body 12A is made larger than the outer shape of the first movable body 11A. The shift lens group 3a is held by the second movable body 12A.

On the rear surface 30 of the base surface portion 28A, instead of the guided grooves 30a and 30a, guided portions 30c and 30c protruding backward are provided to be separated in the circumferential direction of the through hole 28a (see FIG. 41). On the rear surface 30 of the base surface portion 28A, the support recesses 30b, 30b, and 30b opened backward are formed to be separated in the circumferential direction outside the through hole 28a. The spring support protrusion 29a is not provided on the peripheral surface portion 29A.

The guided portions 30c and 30c of the second movable body 12A are slidably supported respectively by the guide holes 24c and 24c of the first movable body 11A (see FIG. 42), and the guided protrusions 30c and 30c are respectively guided by the guide holes 24c and 24c, whereby the first movable body 11A is movable in the second movement direction with respect to the base body 10A.

The second rolling members 26, 26, and 26 are respectively supported by the support recesses 30b, 30b, and 30b of the second movable body 12A, and the second rolling members 26, 26, and 26 are rolled between the first movable body 11A and the second movable body 12A, whereby the second movable body 12A is smoothly moved in the second movement direction with respect to the first movable body 11A. The second movable body 12A is moved in the second movement direction with respect to the first movable body 11A, and the first movable body 11A is moved in the first movement direction with respect to the base body 10A, so that the second movable body 12A supported by the first movable body 11A is moved in the first movement direction with respect to the base body 10A integrally with the first movable body 11A.

In the blur correction device 9A, the guided protrusion 23c for guiding the first movable body 11A in the first movement direction is integrally provided with the first movable body 11A, and the guided portion 30c for guiding the second movable body 12A in the second movement direction is integrally provided with the second movable body 12A, so that dedicated members for guiding the first movable body 11A and the second movable body 12A are not necessary, and the number of parts can be reduced.

Note that, contrary to the above, a guide protrusion may be provided on the base body 10A and a guided groove may be formed on the first movable body 11A, and a guide protrusion may be provided on the first movable body 11A and a guided groove may be formed on the second movable body 12A.

Figure 43:
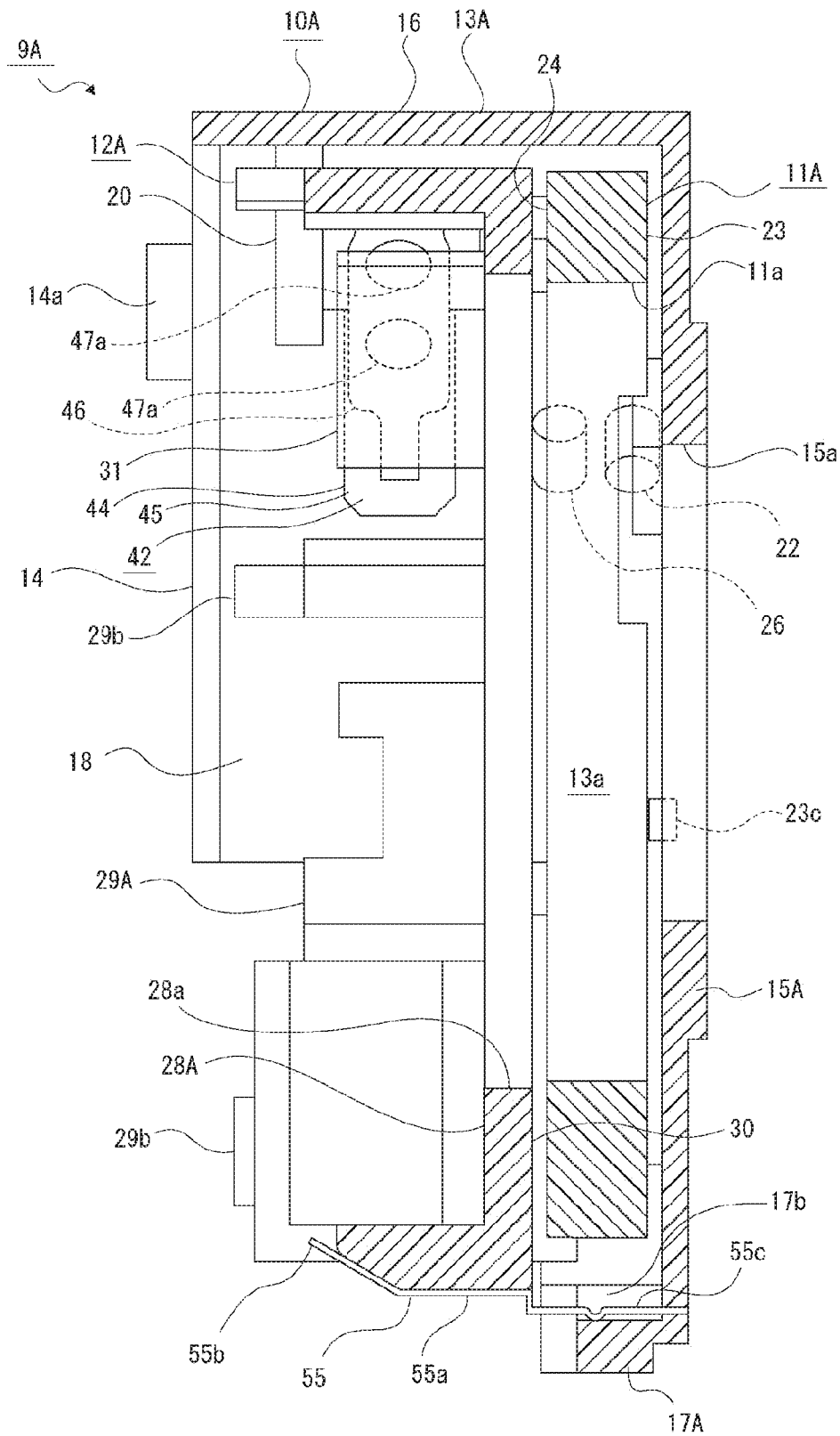
FIG. 43 is a schematic cross-sectional view of the blur correction device.
Figure 44:
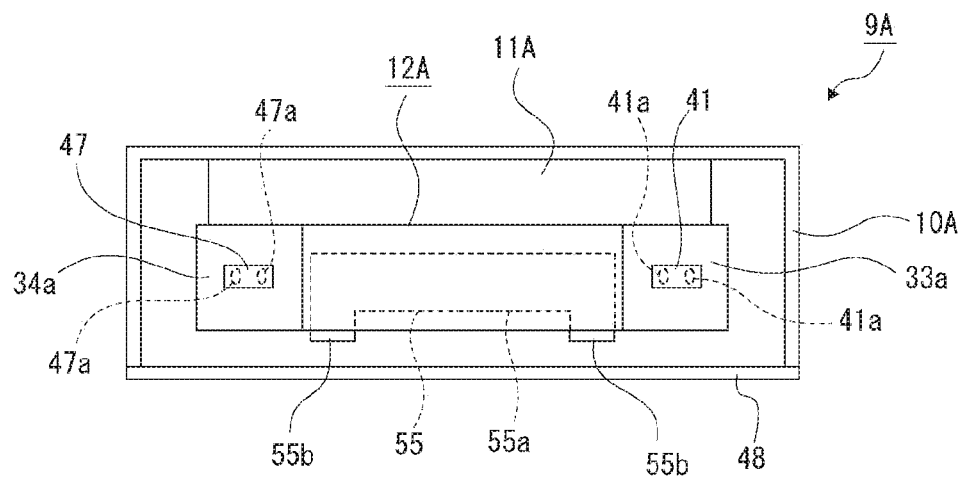
FIG. 44 illustrates blur correction operation together with FIGS. 45 to 53, and this figure is a schematic plan view illustrating a state in which the first movable body and the second movable body are at reference positions.

A pressing spring 55 functioning as a biasing unit is attached to the spring mounting holes 17b and 17b formed in the lower surface portion 17A of the base body 10A (see FIGS. 36, 40 and 43). The pressing spring 55 is, for example, a leaf spring, and includes an intermediate plate portion 55a formed in a laterally elongated shape, pressing plate portions 55b and 55b each protruding upward from the intermediate plate portion 55a, and attachment plate portions 55c and 55c each protruding downward from the intermediate plate portion 55a.

The pressing spring 55 is made to be in a state where the attachment plate portions 55c and 55c are respectively inserted into the spring mounting holes 17b and 17b and attached to the lower surface portion 17a, and the pressing plate portions 55b and 55b are in contact with a front edge of the lower end in the peripheral surface portion 29A of the second movable body 12A (see FIG. 43). The pressing spring 55 is made to be in a state where the pressing plate portions 55b and 55b are in contact with the front edge in the lower end of the peripheral surface portion 29A from the obliquely lower front direction, and the second movable body 12A is biased upward and backward by the pressing spring 55.

As described above, the second movable body 12A is biased upward and backward by the pressing spring 55, and by the pressing spring 55, the first operated surface 33a is pressed against the first driving force transmission portions 41a and 41a, the second operated surface 34a is pressed against the second driving force transmission portions 47a and 47a, and the first movable body 11A and the second movable body 12A are biased in a direction toward the base body 10A.

Thus, it is not necessary to separately provide a spring that performs biasing so that the first operated surface 33a and the second operated surface 34a are respectively pressed against the first driving force transmission portions 41a and 41a and the second driving force transmission portions 47a and 47a, and a spring that biases the first movable body 11A and the second movable body 12A in a direction toward the base body 10A, and it is possible to bias the second movable body 12A in a plurality of directions while the number of parts is reduced.

In the first drive body 36, the transmission member 41 is in contact with the first operated surface 33a of the second movable body 12A from the upper left direction, and the driving force is applied in the lower right direction or the upper left direction from the first drive body 36 to the second movable body 12A, and this direction is made to be the first driving direction. Furthermore, in the second drive body 42, the transmission member 47 is in contact with the second operated surface 34a of the second movable body 12A from the upper right direction, and the driving force is applied in the lower left direction or the upper right direction from the second drive body 42 to the second movable body 12A, and this direction is made to be the second driving direction.

Thus, the first driving direction is made to coincide with the first movement direction, and the second driving direction is made to coincide with the second movement direction.

The bias spring 49 is not provided in the blur correction device 9A.

<Operation of Blur Correction Device According to Second Embodiment>

Hereinafter, blur correction operation will be described in the blur correction device 9A (see FIGS. 44 to 53). Note that, in FIGS. 44 to 53, each unit is simplified and illustrated to facilitate understanding of the blur correction operation.

In the blur correction device 9A, the first movable body 11A is movable only in the first movement direction by the guide hole 15e and the guided protrusion 23c with respect to the base body 10A, and the second movable body 12A is movable only in the second movement direction by the guide hole 24c and the guided portion 30c with respect to the first movable body 11A. Thus, in the blur correction operation described below, so-called rolling operation does not occur that is operation of the first movable body 11A and the second movable body 12A in the rotational direction with respect to the base body 10A in a direction around the optical axis. Furthermore, since the first movable body 11A and the second movable body 12A are biased backward by the pressing spring 55, the first movable body 11A and the second movable body 12A are not moved in the front-rear direction in the blur correction operation.

In a state before the blur correction operation is performed, the first drive body 36 and the second drive body 42 are not operated. The first drive body 36 is made to be in a state where the first driving force transmission portions 41a and 41a provided on the transmission member 41 are in contact with a central portion in the front-rear direction of the first operated surface 33a formed on the receiving protrusion 33 of the second movable body 12A, and the second drive body 42 is made to be in a state where the second driving force transmission portions 47a and 47a provided on the transmission member 47 are in contact with a central portion in the front-rear direction of the second operated surface 34a formed on the receiving protrusion 34 of the second movable body 12A (see FIG. 44).

Figure 45:
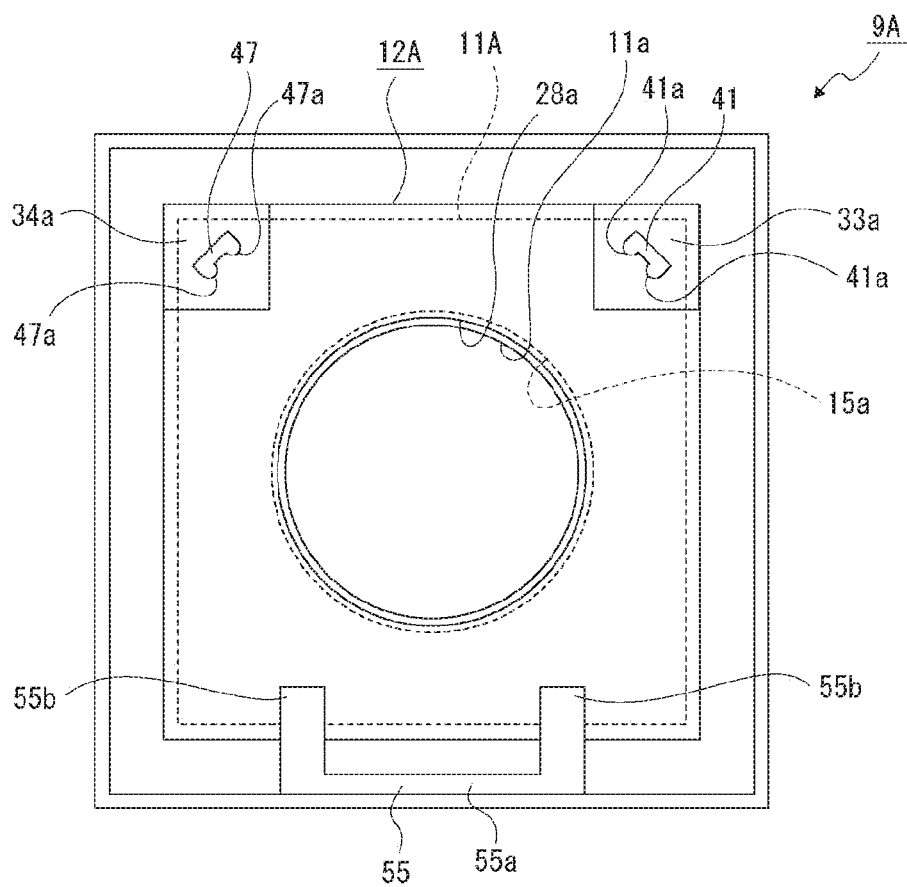
FIG. 45 is a schematic front view illustrating the state in which the first movable body and the second movable body are at the reference positions.

Thus, in the blur correction device 9A, the first movable body 11A and the second movable body 12A are at reference positions and not moved in either the first movement direction or the second movement direction (see FIG. 45).

First, the blur correction operation in the second movement direction in the blur correction device 9A will be described (see FIGS. 46 to 49).

Figure 46:
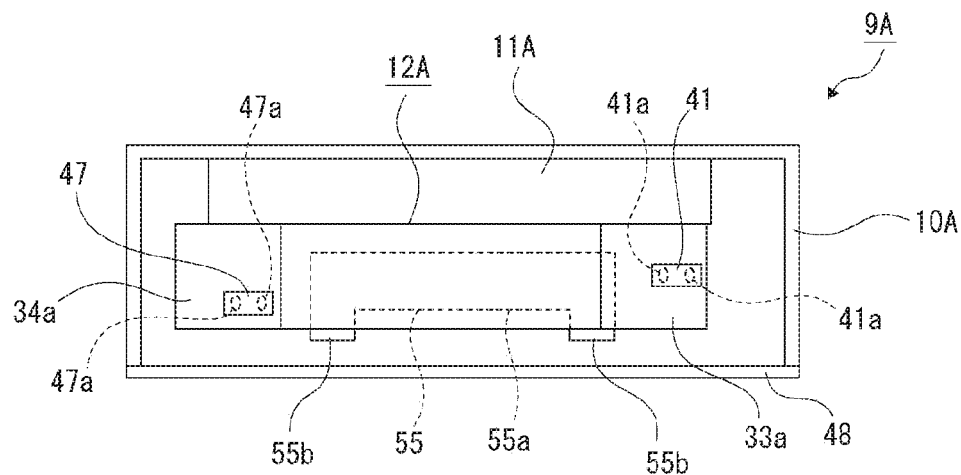
FIG. 46 is a schematic plan view illustrating a state in which a second slider is moved forward.

In the blur correction device 9A, when a voltage is applied to the piezoelectric element 43b of the second actuator 43 and the drive shaft 43c is operated and the second slider 44 is moved forward, the second driving force transmission portions 47a and 47a are slid on the second operated surface 34a and moved to the front end side of the second operated surface 34a (see FIG. 46).

Figure 47:
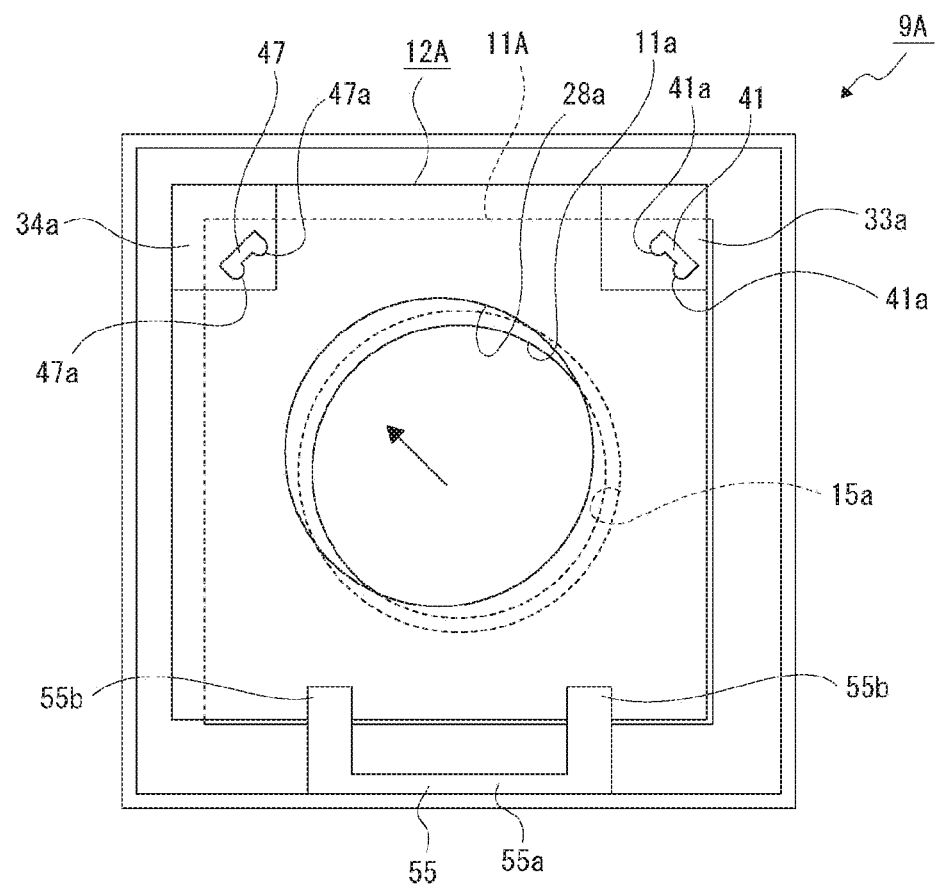
FIG. 47 is a schematic front view illustrating a state in which the second slider is moved forward and the second movable body is moved in a second movement direction.

When the second driving force transmission portions 47a and 47a are moved to the front end side of the second operated surface 34a, the second movable body 12A biased upward by the pressing spring 55 is moved upward in the second movement direction with respect to the first movable body 11A (see FIG. 47). At this time, the first driving force transmission portions 41a and 41a of the first slider 38 are slide on the first operated surface 33a.

Figure 48:
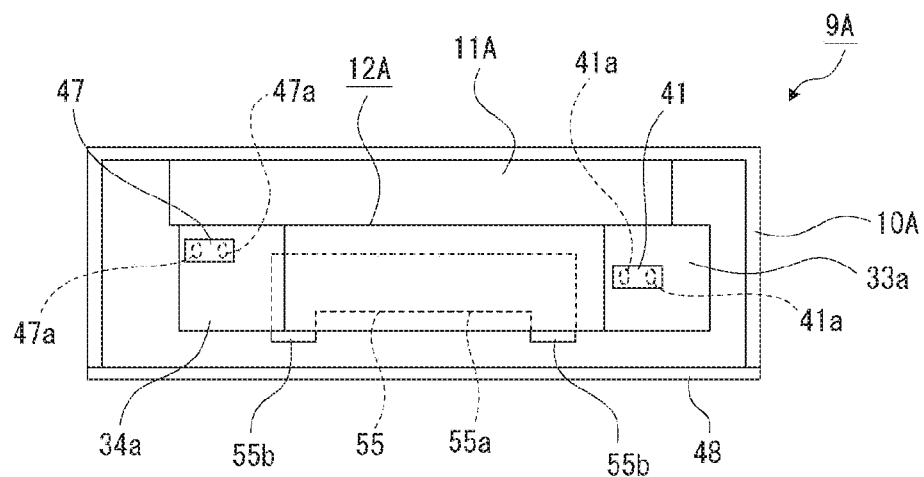
FIG. 48 is a schematic plan view illustrating a state in which the second slider is moved backward.

On the other hand, in the blur correction device 9A, when a voltage is applied to the piezoelectric element 43b of the second actuator 43 and the drive shaft 43c is moved and the second slider 44 is moved backward, the second driving force transmission portions 47a and 47a are slid on the second operated surface 34a and moved to the rear end side of the second operated surface 34a (see FIG. 48).

Figure 49:
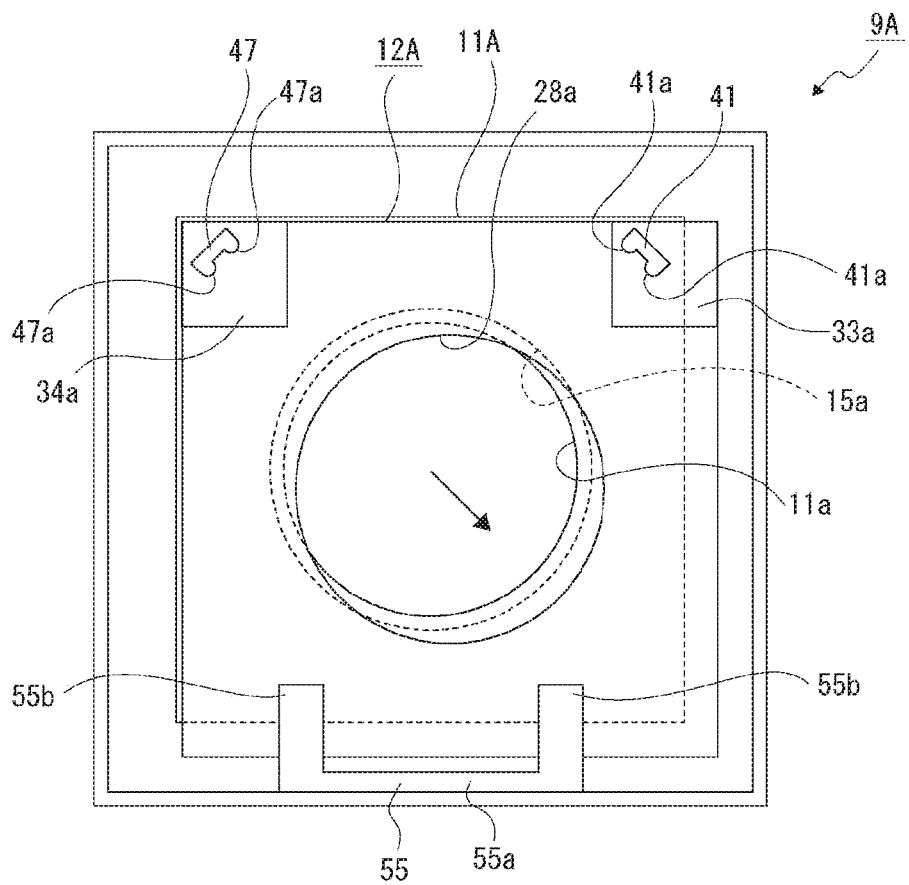
FIG. 49 is a schematic front view illustrating a state in which the second slider is moved backward and the second movable body is moved in the second movement direction.

When the second driving force transmission portions 47a and 47a are moved to the rear end side of the second operated surface 34a, the second movable body 12A biased upward by the pressing spring 55 is moved downward in the second movement direction with respect to the first movable body 11A against the biasing force of the pressing spring 55 (see FIG. 49). At this time, the first driving force transmission portions 41a and 41a of the first slider 38 are slide on the first operated surface 33a.

Next, the blur correction operation in the first movement direction in the blur correction device 9A will be described (see FIGS. 50 to 53).

Figure 50:
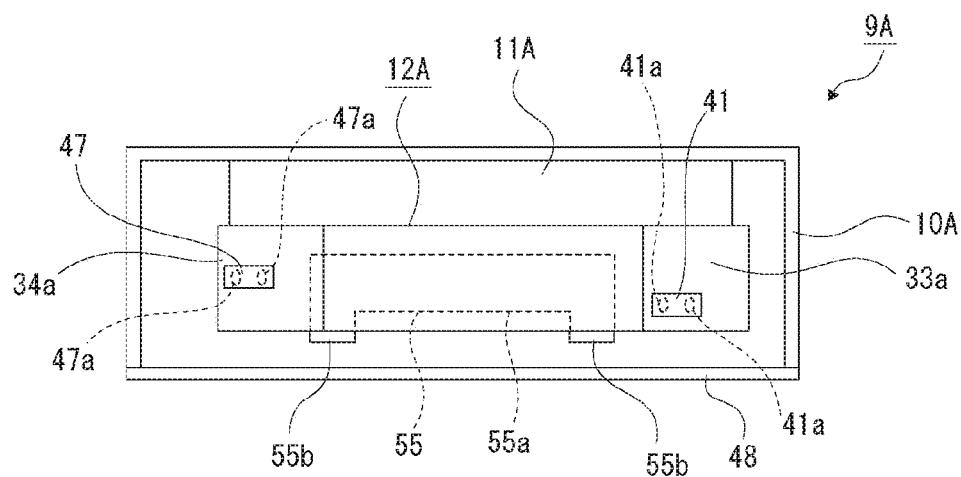
FIG. 50 is a schematic plan view illustrating a state in which a first slider is moved forward.

In the blur correction device 9A, when a voltage is applied to the piezoelectric element 37b of the first actuator 37 and the drive shaft 37c is operated and the first slider 38 is moved forward, the first driving force transmission portions 41a and 41a are slid on the first operated surface 33a and moved to the front end side of the first operated surface 33a (see FIG. 50).

Figure 51:
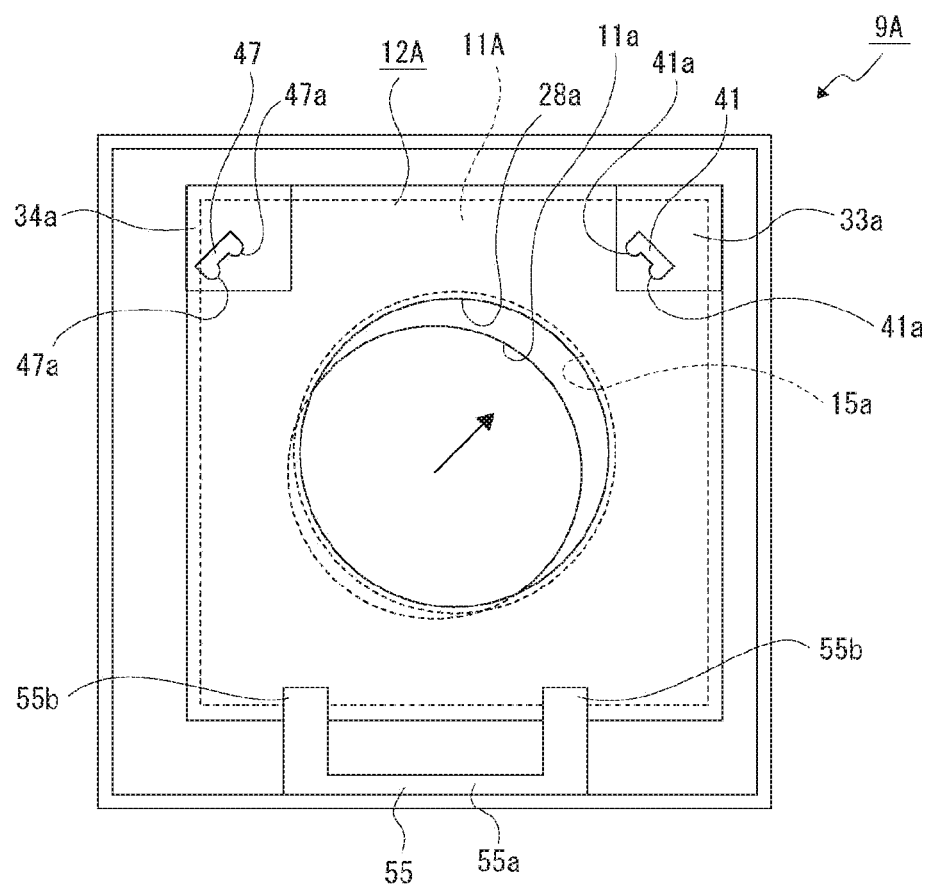
FIG. 51 is a schematic front view illustrating a state in which the first slider is moved forward and the first movable body and the second movable body are integrally moved in a first movement direction.

When the first driving force transmission portions 41a and 41a are moved to the front end side of the first operated surface 33a, moving force in the first movement direction is applied to the second movable body 12A biased upward by the pressing spring 55, the applied moving force is transmitted from the second movable body 12A to the first movable body 11A, and the first movable body 11A is moved upward in the first movement direction integrally with the second movable body 12A (see FIG. 51). At this time, the second driving force transmission portions 47a and 47a of the second slider 44 are slid on the second operated surface 34a.

Figure 52:
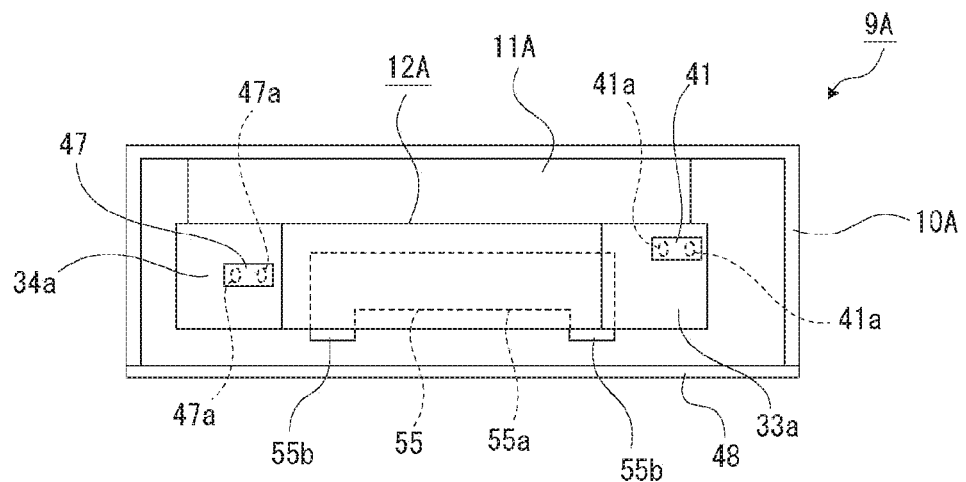
FIG. 52 is a schematic plan view illustrating a state in which the first slider is moved backward.

On the other hand, in the blur correction device 9A, when a voltage is applied to the piezoelectric element 37b of the first actuator 37 and the drive shaft 37c is operated and the first slider 38 is moved backward, the first driving force transmission portions 41a and 41a are slid on the first operated surface 33a and moved to the rear end side of the first operated surface 33a (see FIG. 52).

Figure 53:
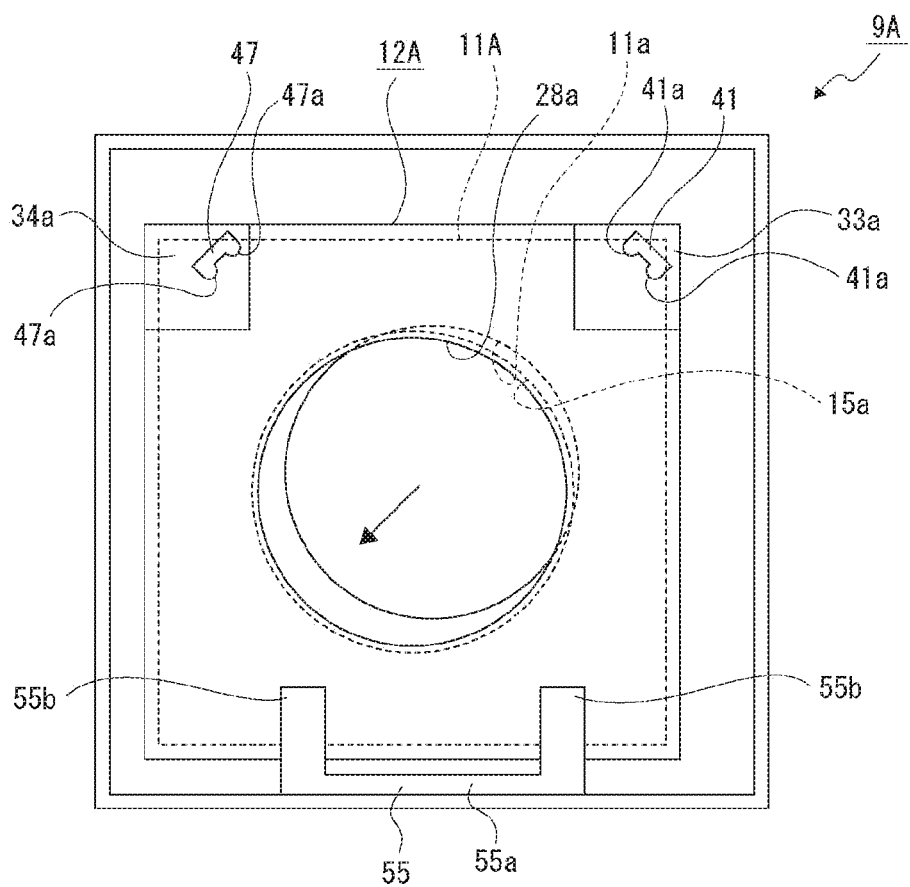
FIG. 53 is a schematic front view illustrating a state in which the first slider is moved backward and the first movable body and the second movable body are integrally moved in the first movement direction.

When the first driving force transmission portions 41a and 41a are moved to the rear end side of the first operated surface 33a, moving force in the first movement direction is applied to the second movable body 12A biased upward by the pressing spring 55, the applied moving force is transmitted from the second movable body 12A to the first movable body 11A, and the first movable body 11A is moved downward in the first movement direction integrally with the second movable body 12A against the biasing force of the pressing spring 55 (see FIG. 53). At this time, the second driving force transmission portions 47a and 47a of the second slider 44 are slid on the second operated surface 34a.

As described above, the second movable body 12A is moved in the second movement direction with respect to the first movable body 11A and moved integrally with the first movable body 11A in the first movement direction, whereby the shift lens group 3a held by the second movable body 12A is also moved in the first movement direction or the second movement direction, and the blur correction is performed in which the optical axis of the shift lens group 3a is displaced and the image blur is corrected.

Note that, in the above, an example has been described in which the first movement direction, the second movement direction, the first driving direction, and the second driving direction are inclined with respect to the upward, downward, left, and right directions; however, it is sufficient that the first movement direction, the second movement direction, the first driving direction, and the second driving direction are any directions in a plane orthogonal to the optical axis. For example, the first movement direction and the first driving direction may be the upward-downward direction or the left-right direction, and the second movement direction and the second driving direction may be the left-right direction or the upward-downward direction.

As described above, in the blur correction device 9A, the first movable body 11A and the second movable body 12A are positioned side by side in the optical axis direction (front-rear direction), and the first movement direction and the second movement direction are both made to be orthogonal to the optical axis direction.

Thus, the first movement direction in which the first movable body 11A is moved and the second movement direction in which the second movable body 12A is moved are orthogonal to each other and both orthogonal to the optical axis, so that highly reliable blur correction can be performed.

Note that, in the above, an example has been described in which the first movable body 11A is moved in the first movement direction that is the first movement direction, and the second movable body 12A is moved in the second movement direction that is the second movement direction; however, conversely, the first movable body 11A may be moved in the second movement direction, and the second movable body 12A may be moved in the first movement direction.

Furthermore, in the blur correction device 9A, the first driving direction that is a driving direction of driving force applied from the first drive body 36 to the second movable body 12A, and the second driving direction that is a driving direction of driving force applied from the second drive body 42 to the second movable body 12A are both orthogonal to the optical axis direction, and are orthogonal to each other.

Thus, the first driving direction and the second driving direction are directions orthogonal to each other and both orthogonal to the optical axis, so that highly reliable blur correction can be performed.

Note that, the first driving direction and the second driving direction may be made to be directions other than the directions orthogonal to each other, for example, the first driving direction and the second driving direction may be made to have an angle of less than 90 degrees in the circumferential direction. Furthermore, the first driving direction and the second driving direction may be made to have an angle larger than 90 degrees in the circumferential direction.

<Others>

Figure 54:
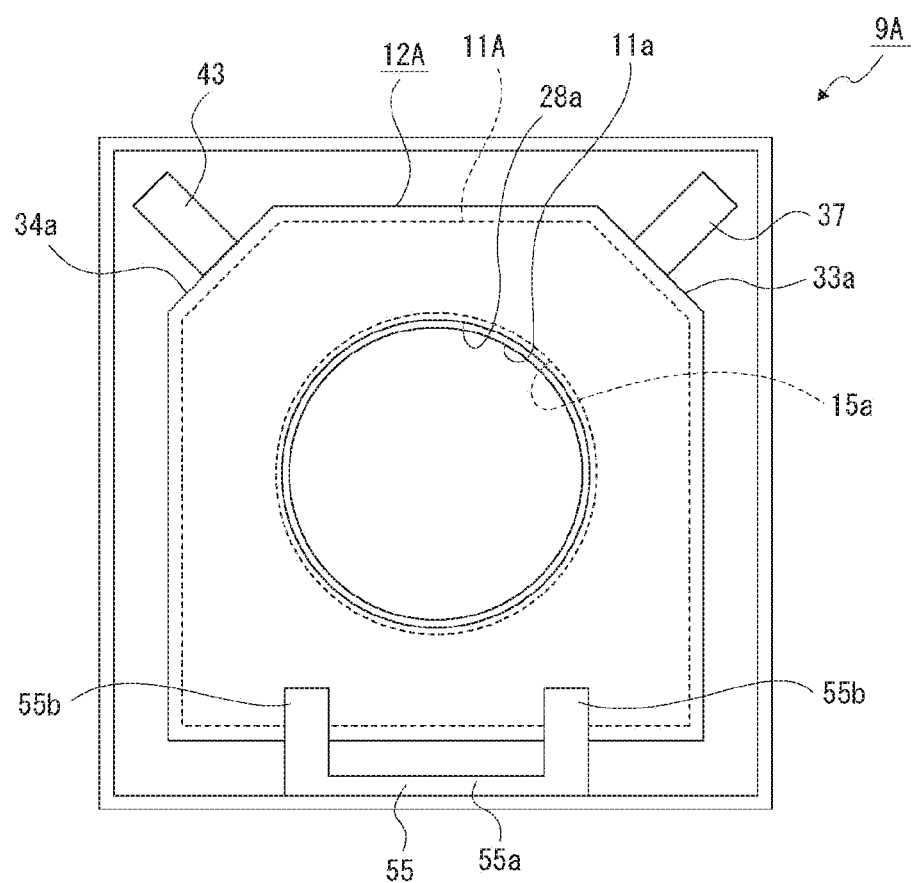
FIG. 54 is a schematic front view illustrating an example in which driving force of an actuator not including a slider is applied to the second movable body.

In the above, an example has been described of the first drive body 36 provided with the first slider 38, and the second drive body 42 provided with the second slider 44; however, the first drive body and the second drive body each may include only an actuator (see FIG. 54).

For example, only the first actuator 37 is provided as a first drive body 36B, and only the second actuator 43 is provided as a second drive body 42B, and the first actuator 37 and the second actuator may be respectively pressed against the first operated surface 33a and the second operated surface 34a, and the first movable body 11 or 11A and the second movable body 12 or 12A may be operated.

With such a configuration, the first slider 38 and the second slider 44 become unnecessary, and the manufacturing cost can be reduced and the structure can be simplified by reduction of the number of parts.

However, even in such a configuration, the first slider 38 and the second slider 44 may be used, and the first slider 38 and the second slider 44 may be moved in directions orthogonal to the optical axis, and the driving force may be transmitted to the second movable body 12 or 12A via the first slider 38 and the second slider 44.

<Conclusion>

As described above, in the blur correction device 9 or 9A, and the imaging device 1, the first movable body 11 or 11A and the second movable body 12 or 12A are integrally moved in the first movement direction with respect to the base body 10 by the driving force of at least one of the first drive body 36 or 36B or the second drive body 42 or 42B, and the second movable body 12 or 12A is moved in the second movement direction with respect to the first movable body 11 or 11A by the driving force of at least one of the first drive body 36 or 36B, or the second drive body 42 or 42B.

Thus, the driving force is applied to the second movable body 12 or 12A by each of the first drive body 36 or 36B and the second drive body 42 or 42B, and the second movable body 12 or 12A is moved in the first movement direction or the second movement direction by the driving force of at least one of the first drive body 36 or 36B, or the second drive body 42 or 42B, so that the weight of the movable body can be reduced while the structure is simplified.

In particular, since it is not necessary to attach one of the first drive body 36 or 36B, or the second drive body 42 or 42B to the first movable body 11 or 11A, the weight of the movable body is reduced, and it is possible to improve reliability and increase speed, of the blur correction operation.

Furthermore, since the first drive body 36 or 36B, and the second drive body 42 or 42B are not attached to the first movable body 11 or 11A, and the second movable body 12 or 12A, it is not necessary to connect a wire for feeding power or a flexible printed wiring board to the first actuator 37 and the second actuator 43.

Thus, no load is generated for the operation of the first movable body 11 or 11A, and the second movable body 12 or 12A by the wire or the wiring board, and it is possible to further improve reliability and further increase speed, of the blur correction operation.

Moreover, since the first drive body 36 or 36B, and the second drive body 42 or 42B are not attached to the first movable body 11 or 11A, and the second movable body 12 or 12A, it is possible to reduce the difference in weight of the movable body between when the second movable body 12 or 12A is moved and when the first movable body 11 or 11A and the second movable body 12 or 12A are integrally moved.

Thus, at the time of driving of the first drive body 36 or 36B, and the second drive body 42 or 42B, it is possible to reduce the difference in servo characteristics with respect to the movement direction of the movable body.

Further, the first movable body 11 or 11A, and the second movable body 12 or 12A are moved in a state where the first operated surface 33a is pressed against the first driving force transmission portions 41a and 41a, and the second operated surface 34a is pressed against the second driving force transmission portions 47a and 47a, by the pressing spring 35 or the pressing spring 55.

Thus, as compared with a structure in which the first movable body and the second movable body are moved in a state where the movable body is suspended by a wire or the like, it is possible to improve accuracy of the movement positions of the first movable body 11 or 11A, and the second movable body 12 or 12A, and reduce the influence of disturbance due to vibration or the like, and reduce the occurrence of tilt due to deformation of the wire or the like.

Moreover, the blur correction device 9 or 9A is configured such that the first movable body 11 or 11A, the second movable body 12 or 12A, the first drive body 36, and the second drive body 42 are assembled to the base body 10 or 10A from one direction (optical axis direction), so that each unit can be assembled in the same process, and the workability in the assembling operation can be improved.

<Application Example to Endoscopic Surgical System>

The technology according to the present disclosure (the present technology) can be applied to various products. For example, the technology according to the present disclosure may be applied to an endoscopic surgical system.

Figure 55:
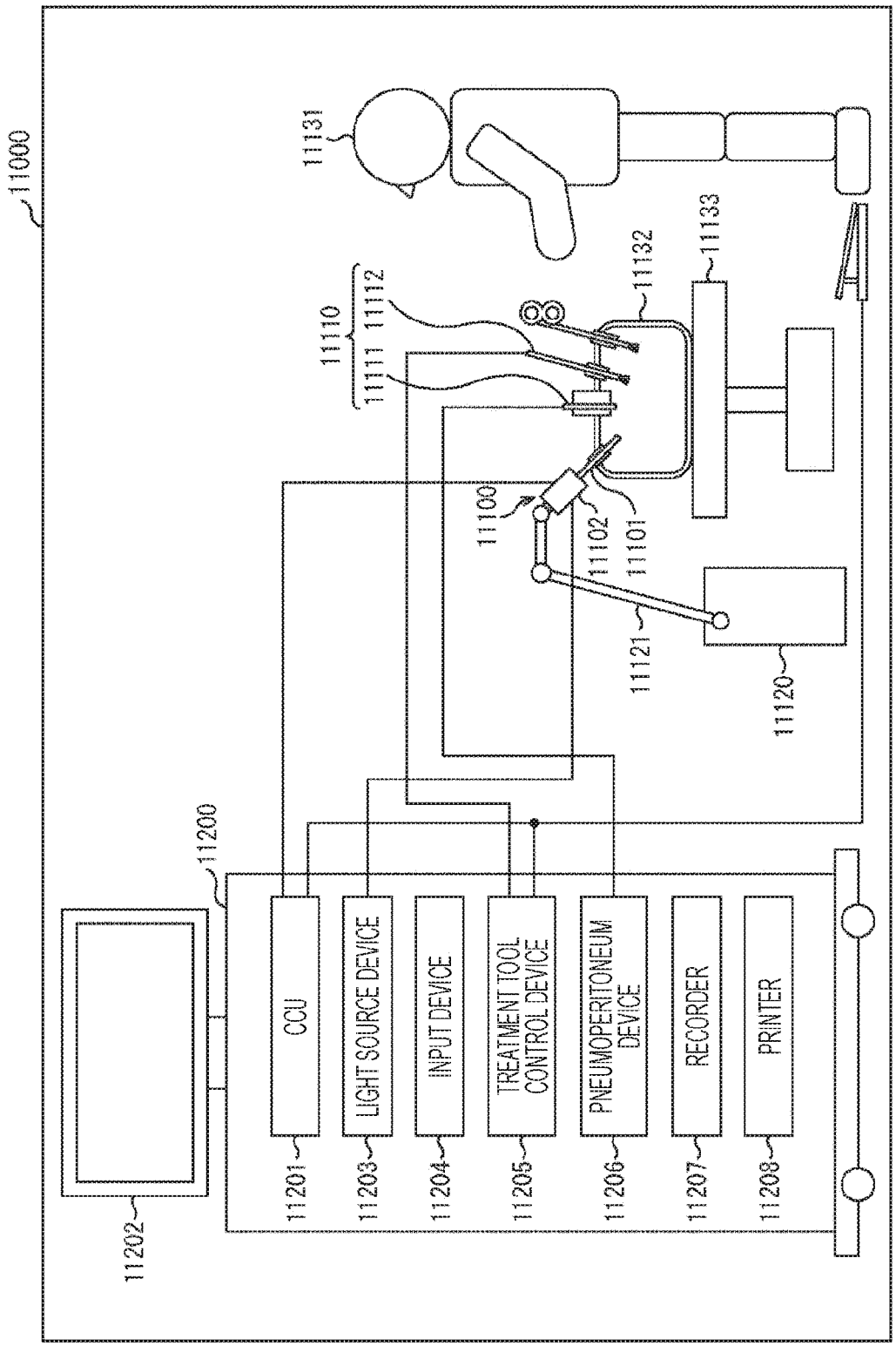
FIG. 55 is a diagram illustrating an example of a schematic configuration of an endoscopic surgical system.

FIG. 55 is a diagram illustrating an example of a schematic configuration of an endoscopic surgical system to which the technology according to the present disclosure (the present technology) can be applied.

FIG. 55 illustrates a state in which an operator (surgeon) 11131 is performing surgery on a patient 11132 on a patient bed 11133 using an endoscopic surgical system 11000. As illustrated, the endoscopic surgical system 11000 includes an endoscope 11100, other surgical tools 11110 such as a pneumoperitoneum tube 11111 and an energy treatment tool 11112, a support arm device 11120 that supports the endoscope 11100, and a cart 11200 on which various devices for endoscopic surgery are mounted.

The endoscope 11100 includes a lens barrel 11101 in which a region of a predetermined length from the distal end is inserted into the body cavity of the patient 11132, and a camera head 11102 connected to the proximal end of the lens barrel 11101. In the illustrated example, the endoscope 11100 formed as a so-called rigid scope including a rigid lens barrel 11101 is illustrated, but the endoscope 11100 may be formed as a so-called flexible scope including a flexible lens barrel.

At the distal end of the lens barrel 11101, an opening is provided into which an objective lens is fitted. A light source device 11203 is connected to the endoscope 11100, and light generated by the light source device 11203 is guided to the distal end of the lens barrel by a light guide extending inside the lens barrel 11101, and the light is emitted toward an observation target in the body cavity of the patient 11132 via the objective lens. Note that, the endoscope 11100 may be a direct viewing scope, an oblique viewing scope, or a side viewing scope.

An optical system and an imaging element are provided inside the camera head 11102, and reflected light (observation light) from the observation target is focused on the imaging element by the optical system. The observation light is photoelectrically converted by the imaging element, and an electric signal corresponding to the observation light, that is, an image signal corresponding to the observation image is generated. The image signal is transmitted as RAW data to a camera control unit (CCU) 11201.

The CCU 11201 includes a central processing unit (CPU), a graphics processing unit (GPU), and the like, and comprehensively controls operation of the endoscope 11100 and a display device 11202. Moreover, the CCU 11201 receives the image signal from the camera head 11102 and applies various types of image processing to the image signal, for example, development processing (demosaic processing), and the like, for displaying the image based on the image signal.

The display device 11202 displays an image based on the image signal subjected to the image processing by the CCU 11201, by the control from the CCU 11201.

The light source device 11203 includes a light source, for example, a light emitting diode (LED) or the like, and supplies irradiation light for imaging a surgical portion or the like to the endoscope 11100.

An input device 11204 is an input interface to the endoscopic surgical system 11000. A user can input various types of information and instructions to the endoscopic surgical system 11000 via the input device 11204. For example, the user inputs an instruction or the like to change imaging conditions (type of irradiation light, magnification, focal length, and the like) for the endoscope 11100.

A treatment tool control device 11205 controls drive of the energy treatment tool 11112 for cauterization of tissue, incision, sealing of blood vessels, or the like. A pneumoperitoneum device 11206 injects a gas into the body cavity of the patient 11132 via the pneumoperitoneum tube 11111 to inflate the body cavity, for the purpose of securing a visual field by the endoscope 11100 and securing a working space of the operator. A recorder 11207 is a device capable of recording various types of information regarding surgery. A printer 11208 is a device capable of printing various types of information regarding surgery in various formats such as text, image, graph, and the like.

Note that, the light source device 11203 that supplies irradiation light for imaging a surgical portion to the endoscope 11100 can include a white light source including, for example, an LED, a laser light source, or a combination thereof. In a case where the white light source includes a combination of R, G, and B laser light sources, the output intensity and the output timing of each color (each wavelength) can be controlled with high accuracy, so that adjustment can be performed of the white balance of the captured image in the light source device 11203. Furthermore, in this case, it is also possible to capture an image corresponding to each of R, G, and B in time division by emitting the laser light from each of the R, G, and B laser light sources in time division to the observation target, and controlling drive of the imaging element of the camera head 11102 in synchronization with the emission timing. According to this method, a color image can be obtained without providing a color filter in the imaging element.

Furthermore, drive of the light source device 11203 may be controlled such that the intensity of light to be output is changed at predetermined time intervals. By controlling the drive of the imaging element of the camera head 11102 in synchronization with the change timing of the light intensity to acquire images in time division, and synthesizing the images, a high dynamic range image can be generated without so-called blocked up shadows or blown out highlights.

Furthermore, the light source device 11203 may be able to supply light of a predetermined wavelength band corresponding to special light observation. In the special light observation, for example, by using wavelength dependence of light absorption in a body tissue, by emitting narrow band light compared to irradiation light (in other words, white light) at the time of ordinary observation, so-called narrow band imaging is performed in which a predetermined tissue such as a blood vessel in a mucosal surface layer is imaged with high contrast. Alternatively, in the special light observation, fluorescence observation may be performed that obtain an image by fluorescence generated by emitting excitation light. In the fluorescence observation, it is possible to irradiate a body tissue with excitation light to observe the fluorescence from the body tissue (autofluorescence observation), or to locally inject a reagent such as indocyanine green (ICG) into a body tissue and irradiate the body tissue with excitation light corresponding to the fluorescence wavelength of the reagent to obtain a fluorescent image, for example. The light source device 11203 may be able to supply narrow band light and/or excitation light corresponding to such special light observation.

Figure 56:
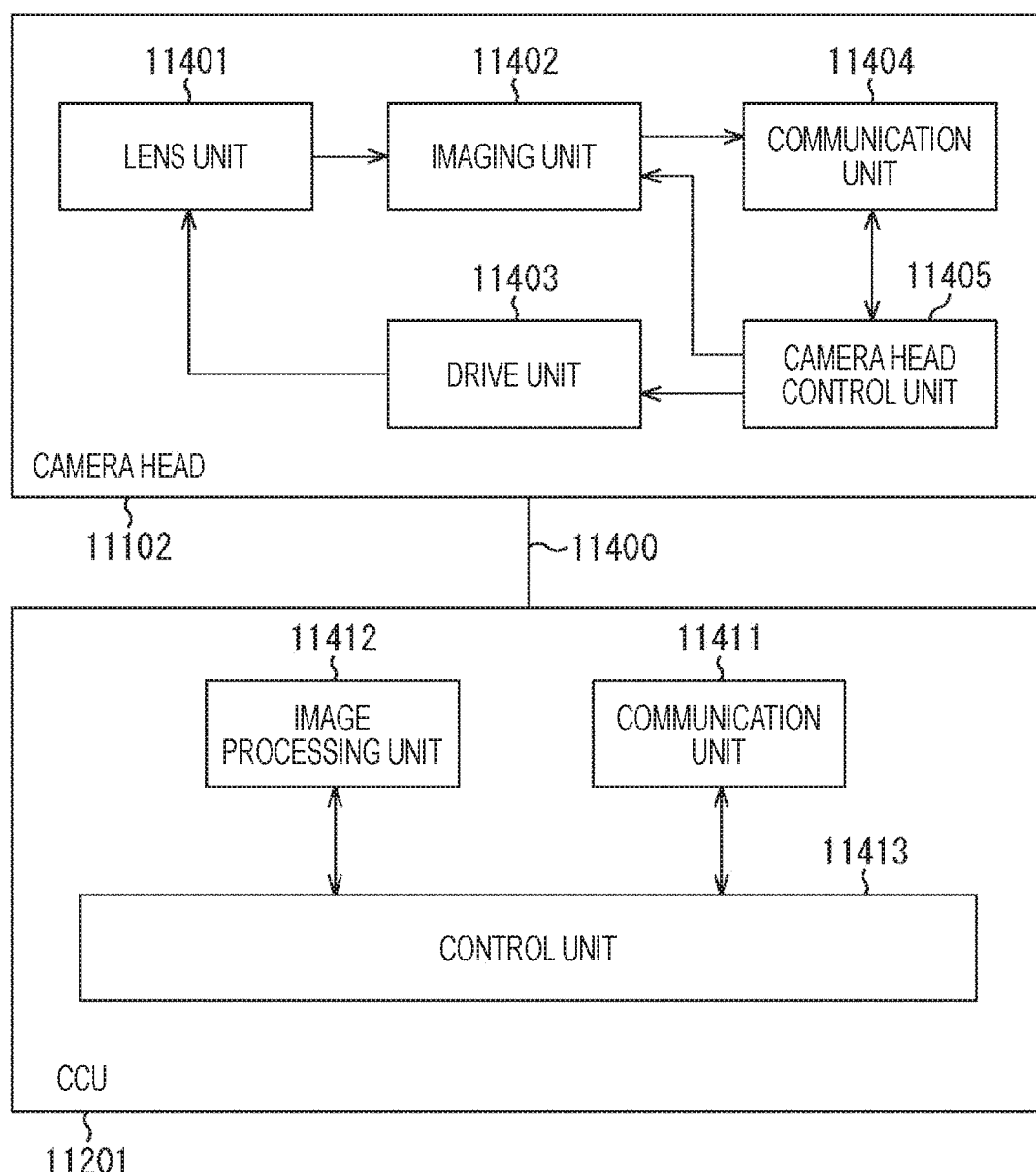
FIG. 56 is a block diagram illustrating an example of a functional configuration of a camera head and a CCU.

FIG. 56 is a block diagram illustrating an example of a functional configuration of the camera head 11102 and the CCU 11201 illustrated in FIG. 55.

The camera head 11102 includes a lens unit 11401, an imaging unit 11402, a drive unit 11403, a communication unit 11404, and a camera head control unit 11405. The CCU 11201 includes a communication unit 11411, an image processing unit 11412, and a control unit 11413. The camera head 11102 and the CCU 11201 are communicably connected to each other by a transmission cable 11400.

The lens unit 11401 is an optical system provided at a connection portion with the lens barrel 11101. The observation light taken in from the distal end of the lens barrel 11101 is guided to the camera head 11102 and is incident on the lens unit 11401. The lens unit 11401 includes a combination of a plurality of lenses including a zoom lens and a focus lens.

The imaging element constituting the imaging unit 11402 may be one (so-called single plate type) element, or a plurality of (so-called multiple plate type) elements. In a case where the imaging unit 11402 includes the multiple plate type, for example, image signals corresponding to R, G, and B may be generated by respective imaging elements, and a color image may be obtained by synthesizing the image signals. Alternatively, the imaging unit 11402 may include a pair of imaging elements for acquiring each of the right-eye and left-eye image signals corresponding to three-dimensional (3D) display. By performing the 3D display, the operator 11131 can grasp the depth of living tissue in a surgical portion more accurately. Note that, in a case where the imaging unit 11402 includes the multiple plate type, a plurality of systems of the lens units 11401 can be provided corresponding to respective imaging elements.

Furthermore, the imaging unit 11402 is not necessarily provided in the camera head 11102. For example, the imaging unit 11402 may be provided inside the lens barrel 11101 immediately after the objective lens.

The drive unit 11403 includes an actuator and moves the zoom lens and the focus lens of the lens unit 11401 by a predetermined distance along the optical axis by control of the camera head control unit 11405. As a result, the magnification and the focus of the captured image by the imaging unit 11402 can be appropriately adjusted.

The communication unit 11404 includes a communication device for transmitting/receiving various types of information to/from the CCU 11201. The communication unit 11404 transmits the image signal obtained from the imaging unit 11402 as RAW data to the CCU 11201 via the transmission cable 11400.

Furthermore, the communication unit 11404 receives a control signal for controlling drive of the camera head 11102 from the CCU 11201, and supplies the control signal to the camera head control unit 11405. The control signal includes information regarding imaging conditions, for example, information that specifies the frame rate of the captured image, information that specifies the exposure value at the time of imaging, and/or information that specifies the magnification and focus of the captured image.

Note that, the imaging conditions such as the frame rate, exposure value, magnification, and focus may be appropriately specified by the user, or automatically set by the control unit 11413 of the CCU 11201 on the basis of the acquired image signal. In the latter case, a so-called auto exposure (AE) function, auto-focus (AF) function, and auto white balance (AWB) function are installed in the endoscope 11100.

The camera head control unit 11405 controls the drive of the camera head 11102 on the basis of the control signal from the CCU 11201 received via the communication unit 11404.

The communication unit 11411 includes a communication device for transmitting/receiving various types of information to/from the camera head 11102. The communication unit 11411 receives the image signal transmitted from the camera head 11102 via the transmission cable 11400.

Furthermore, the communication unit 11411 transmits the control signal for controlling the drive of the camera head 11102 to the camera head 11102. The image signal and the control signal can be transmitted by electrical communication, optical communication, or the like.

The image processing unit 11412 performs various types of image processing on the image signal that is RAW data transmitted from the camera head 11102.

The control unit 11413 performs various types of control related to imaging of a surgical portion or the like by the endoscope 11100 and display of the captured image obtained by the imaging of the surgical portion or the like. For example, the control unit 11413 generates the control signal for controlling the drive of the camera head 11102.

Furthermore, the control unit 11413 causes the display device 11202 to display the captured image of the surgical portion or the like on the basis of the image signal subjected to the image processing by the image processing unit 11412. At this time, the control unit 11413 may recognize various objects in the captured image by using various image recognition technologies. For example, the control unit 11413 detects color, a shape of an edge, and the like of the object included in the captured image, thereby being able to recognize a surgical tool such as a forceps, a specific body part, bleeding, mist at the time of using the energy treatment tool 11112, or the like. When causing the display device 11202 to display the captured image, the control unit 11413 may cause the display device 11202 to superimpose and display various types of surgery assistance information on the image of the surgical portion by using the recognition result. The surgery assistance information is superimposed and displayed, and presented to the operator 11131, whereby the burden on the operator 11131 can be reduced, and the operator 11131 can reliably perform surgery.

The transmission cable 11400 connecting the camera head 11102 and the CCU 11201 together is an electric signal cable adaptable to communication of electric signals, an optical fiber adaptable to optical communication, or a composite cable thereof.

Here, in the illustrated example, communication is performed by wire using the transmission cable 11400, but communication between the camera head 11102 and the CCU 11201 may be performed wirelessly.

In the above, an example has been described of the endoscopic surgical system to which the technology according to the present disclosure can be applied. The technology according to the present disclosure can be applied to, for example, the endoscope 11100, (the imaging unit 11402 of) the camera head 11102, (the image processing unit 11412 of) the CCU 11201 in the above-described configuration. Specifically, the imaging element 7 can be applied to the imaging unit 10402. By applying the technology according to the present disclosure to the endoscope 11100, (the imaging unit 11402 of) the camera head 11102, and (the image processing unit 11412 of) the CCU 11201, a clearer surgical portion image can be obtained, so that the operator can reliably confirm the surgical portion.

Note that, the endoscopic surgical system has been described as an example here; however, the technology according to the present disclosure may be applied to others, for example, a microscopic surgical system, and the like.

<Application Example to Mobile Body>

Furthermore, the technology according to the present disclosure (the present technology) may be implemented as a device mounted on any type of mobile body, for example, a car, an electric car, a hybrid electric car, a motorcycle, a bicycle, a personal mobility, an airplane, a drone, a ship, a robot, or the like.

Figure 57:
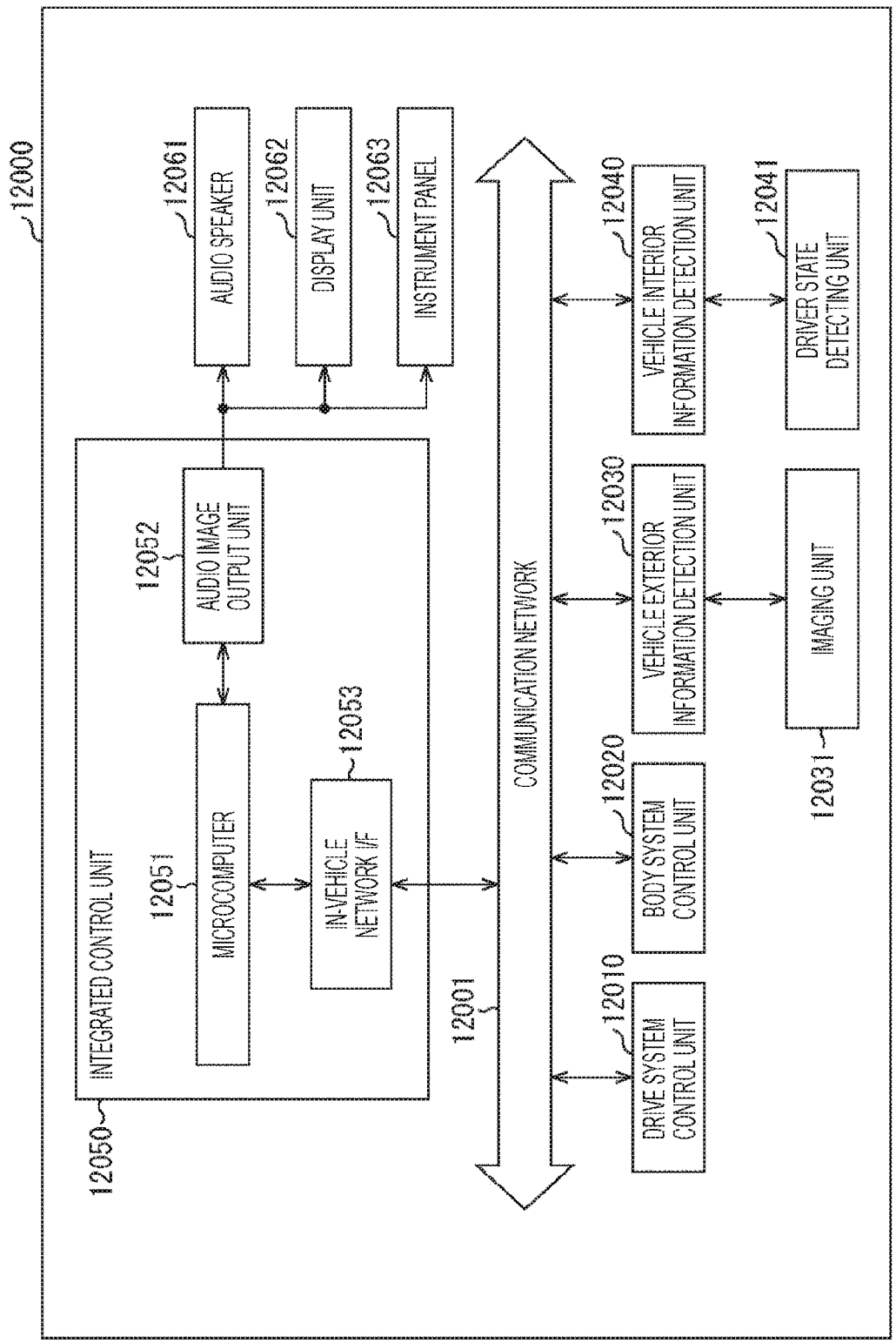
FIG. 57 is a block diagram illustrating an example of a schematic configuration of a vehicle control system.

FIG. 57 is a block diagram illustrating a schematic configuration example of a vehicle control system that is an example of a mobile body control system to which the technology according to the present disclosure can be applied.

The vehicle control system 12000 includes a plurality of electronic control units connected to each other via a communication network 12001. In the example illustrated in FIG. 57, the vehicle control system 12000 includes a drive system control unit 12010, a body system control unit 12020, a vehicle exterior information detection unit 12030, a vehicle interior information detection unit 12040, and an integrated control unit 12050. Furthermore, as functional configurations of the integrated control unit 12050, a microcomputer 12051, an audio image output unit 12052, and an in-vehicle network interface (I/F) 12053 are illustrated.

The drive system control unit 12010 controls operation of devices related to a drive system of a vehicle in accordance with various programs. For example, the drive system control unit 12010 functions as a control device of a driving force generating device for generating driving force of the vehicle, such as an internal combustion engine or a driving motor, a driving force transmitting mechanism for transmitting driving force to wheels, a steering mechanism for adjusting a steering angle of the vehicle, a braking device for generating braking force of the vehicle, and the like.

The body system control unit 12020 controls operation of various devices equipped on the vehicle body in accordance with various programs. For example, the body system control unit 12020 functions as a control device of a keyless entry system, a smart key system, a power window device, or various lamps such as a head lamp, a back lamp, a brake lamp, a turn signal lamp, and a fog lamp. In this case, to the body system control unit 12020, a radio wave transmitted from a portable device that substitutes for a key, or signals of various switches can be input. The body system control unit 12020 accepts input of these radio waves or signals and controls a door lock device, power window device, lamp, and the like of the vehicle.

The vehicle exterior information detection unit 12030 detects information regarding the outside of the vehicle on which the vehicle control system 12000 is mounted. For example, an imaging unit 12031 is connected to the vehicle exterior information detection unit 12030. The vehicle exterior information detection unit 12030 causes the imaging unit 12031 to capture an image outside the vehicle and receives the image captured. The vehicle exterior information detection unit 12030 may perform object detection processing or distance detection processing on a person, a car, an obstacle, a sign, a character on a road surface, or the like, on the basis of the received image.

The imaging unit 12031 is an optical sensor that receives light and outputs an electric signal corresponding to an amount of light received. The imaging unit 12031 can output the electric signal as an image, or as distance measurement information. Furthermore, the light received by the imaging unit 12031 may be visible light, or invisible light such as infrared rays.

The vehicle interior information detection unit 12040 detects information regarding the inside of the vehicle. The vehicle interior information detection unit 12040 is connected to, for example, a driver state detecting unit 12041 that detects a state of a driver. The driver state detecting unit 12041 includes, for example, a camera that captures an image of the driver, and the vehicle interior information detection unit 12040 may calculate a degree of fatigue or a degree of concentration of the driver, or determine whether or not the driver is dozing, on the basis of the detection information input from the driver state detecting unit 12041.

The microcomputer 12051 can calculate a control target value of the driving force generating device, the steering mechanism, or the braking device on the basis of the information regarding the inside and outside of the vehicle acquired by the vehicle exterior information detection unit 12030 or the vehicle interior information detection unit 12040, and output a control command to the drive system control unit 12010. For example, the microcomputer 12051 can perform cooperative control aiming for implementing functions of advanced driver assistance system (ADAS) including collision avoidance or shock mitigation of the vehicle, follow-up traveling based on an inter-vehicle distance, vehicle speed maintaining traveling, vehicle collision warning, vehicle lane departure warning, or the like.

Furthermore, the microcomputer 12051 can perform cooperative control aiming for automatic driving that autonomously travels without depending on operation of the driver, or the like, by controlling the driving force generating device, the steering mechanism, the braking device, or the like on the basis of information regarding the periphery of the vehicle acquired by the vehicle exterior information detection unit 12030 or the vehicle interior information detection unit 12040.

Furthermore, the microcomputer 12051 can output a control command to the body system control unit 12030 on the basis of information regarding outside of the vehicle acquired by the vehicle exterior information detection unit 12030. For example, the microcomputer 12051 can perform cooperative control aiming for preventing dazzling such as switching from the high beam to the low beam, by controlling the head lamp depending on a position of a preceding vehicle or an oncoming vehicle detected by the vehicle exterior information detection unit 12030.

The audio image output unit 12052 transmits at least one of audio and image output signals to an output device capable of visually or aurally notifying an occupant in the vehicle or the outside of the vehicle of information. In the example of FIG. 57, as the output device, an audio speaker 12061, a display unit 12062, and an instrument panel 12063 are illustrated. The display unit 12062 may include, for example, at least one of an on-board display or a head-up display.

Figure 58:
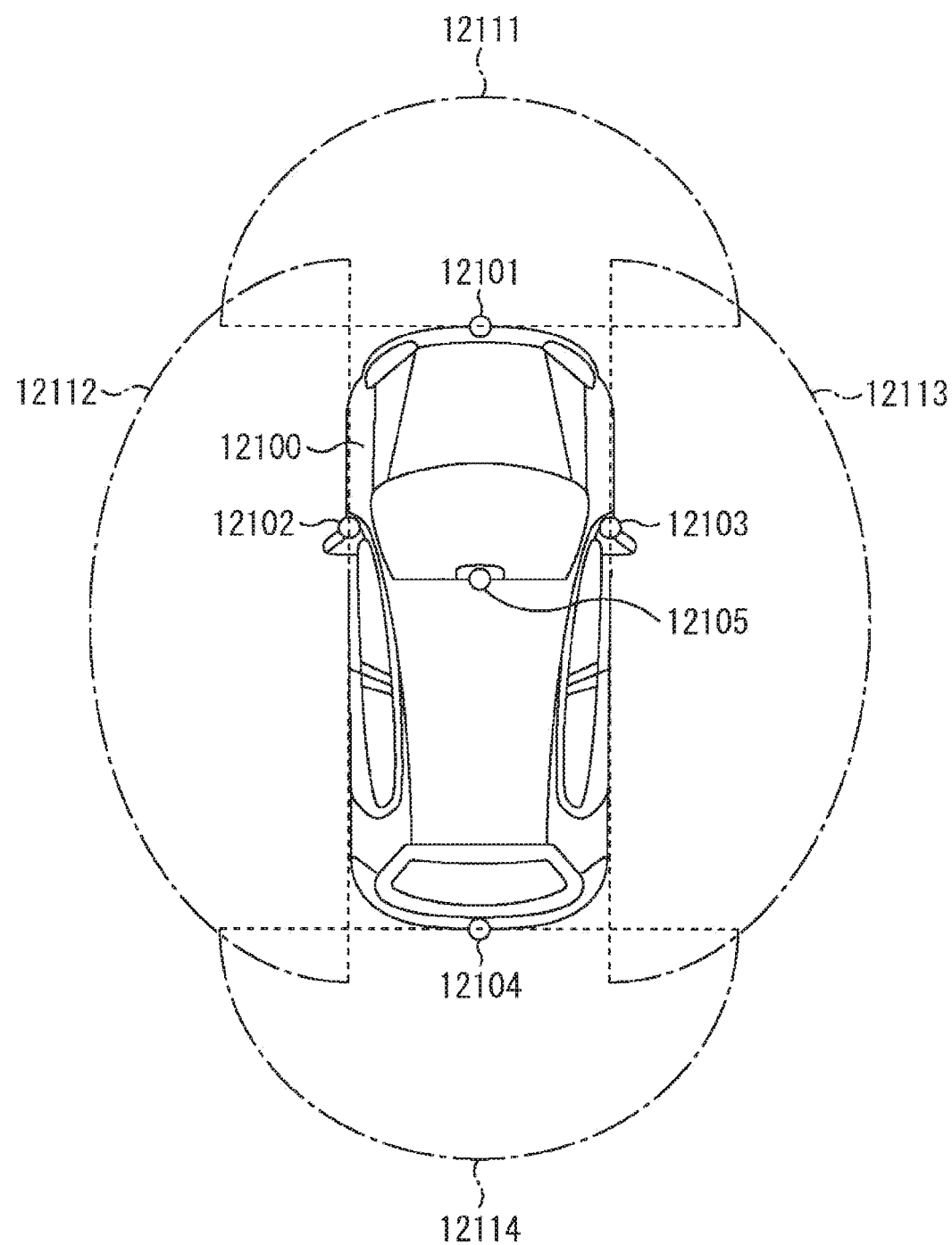
FIG. 58 is an explanatory diagram illustrating an example of installation positions of a vehicle exterior information detecting unit and an imaging unit.

FIG. 58 is a diagram illustrating an example of installation positions of the imaging unit 12031.

In FIG. 58, as the imaging unit 12031, imaging units 12101, 12102, 12103, 12104, and 12105 are included.

The imaging units 12101, 12102, 12103, 12104, and 12105 are provided at, for example, at a position of the front nose, the side mirror, the rear bumper, the back door, the upper part of the windshield in the vehicle interior, or the like, of a vehicle 12100. The imaging unit 12101 provided at the front nose and the imaging unit 12105 provided at the upper part of the windshield in the vehicle interior mainly acquire images ahead of the vehicle 12100. The imaging units 12102 and 12103 provided at the side mirrors mainly acquire images on the sides of the vehicle 12100. The imaging unit 12104 provided at the rear bumper or the back door mainly acquires an image behind the vehicle 12100. The imaging unit 12105 provided on the upper part of the windshield in the vehicle interior is mainly used for detecting a preceding vehicle, a pedestrian, an obstacle, a traffic signal, a traffic sign, a lane, or the like.

Note that, FIG. 58 illustrates an example of imaging ranges of the imaging units 12101 to 12104. An imaging range 12111 indicates an imaging range of the imaging unit 12101 provided at the front nose, imaging ranges 12112 and 12113 respectively indicate imaging ranges of the imaging units 12102 and 12103 provided at the side mirrors, an imaging range 12114 indicates an imaging range of the imaging unit 12104 provided at the rear bumper or the back door. For example, image data captured by the imaging units 12101 to 12104 are superimposed on each other, whereby an overhead image of the vehicle 12100 viewed from above is obtained.

At least one of the imaging units 12101 to 12104 may have a function of acquiring distance information. For example, at least one of the imaging units 12101 to 12104 may be a stereo camera including a plurality of imaging elements, or may be an imaging element including pixels for phase difference detection.

For example, on the basis of the distance information obtained from the imaging units 12101 to 12104, the microcomputer 12051 obtains a distance to each three-dimensional object within the imaging ranges 12111 to 12114, and a temporal change of the distance (relative speed to the vehicle 12100), thereby being able to extract, as a preceding vehicle, a three-dimensional object that is in particular a closest three-dimensional object on a traveling path of the vehicle 12100 and traveling at a predetermined speed (for example, greater than or equal to 0 km/h) in substantially the same direction as that of the vehicle 12100. Moreover, the microcomputer 12051 can set an inter-vehicle distance to be secured in advance in front of the preceding vehicle, and can perform automatic brake control (including follow-up stop control), automatic acceleration control (including follow-up start control), and the like. As described above, it is possible to perform cooperative control aiming for automatic driving that autonomously travels without depending on operation of the driver, or the like.

For example, on the basis of the distance information obtained from the imaging units 12101 to 12104, the microcomputer 12051 can extract three-dimensional object data regarding the three-dimensional object by classifying the objects into a two-wheeled vehicle, a regular vehicle, a large vehicle, a pedestrian, and other three-dimensional objects such as a utility pole, and use the data for automatic avoidance of obstacles. For example, the microcomputer 12051 identifies obstacles in the periphery of the vehicle 12100 into an obstacle visually recognizable to the driver of the vehicle 12100 and an obstacle difficult to visually recognize. Then, the microcomputer 12051 determines a collision risk indicating a risk of collision with each obstacle, and when the collision risk is greater than or equal to a set value and there is a possibility of collision, the microcomputer 12051 outputs an alarm to the driver via the audio speaker 12061 and the display unit 12062, or performs forced deceleration or avoidance steering via the drive system control unit 12010, thereby being able to perform driving assistance for collision avoidance.

At least one of the imaging units 12101 to 12104 may be an infrared camera that detects infrared rays. For example, the microcomputer 12051 can recognize a pedestrian by determining whether or not a pedestrian exists in the captured images of the imaging units 12101 to 12104. Such pedestrian recognition is performed by, for example, a procedure of extracting feature points in the captured images of the imaging units 12101 to 12104 as infrared cameras, and a procedure of performing pattern matching processing on a series of feature points indicating a contour of an object to determine whether or not the object is a pedestrian. When the microcomputer 12051 determines that a pedestrian exists in the captured images of the imaging units 12101 to 12104 and recognizes the pedestrian, the audio image output unit 12052 controls the display unit 12062 so that a rectangular contour line for emphasis is superimposed and displayed on the recognized pedestrian. Furthermore, the audio image output unit 12052 may control the display unit 12062 so that an icon or the like indicating the pedestrian is displayed at a desired position.

In the above, an example has been described of the vehicle control system to which the technology according to the present disclosure can be applied. The technology according to the present disclosure can be applied to the imaging unit 12031 in the above-described configuration. Specifically, the imaging element 7 can be applied to the imaging unit 12031. By applying the technology according to the present disclosure to the imaging unit 12031, a more easily viewable captured image can be obtained, so that driver's fatigue can be reduced.

<Present Technology>

The present technology can be configured as follows.

(1)

A blur correction device including:

a first movable body that is movable in a first movement direction with respect to a base body;

a second movable body that is positioned on an opposite side of the first movable body from the base body and movable in a second movement direction different from the first movement direction with respect to the first movable body; and a first drive body and a second drive body that each apply driving force to the second movable body, in which the first movable body and the second movable body are integrally moved in the first movement direction with respect to the base body by driving force of at least one of the first drive body or the second drive body, and the second movable body is moved in the second movement direction with respect to the first movable body by driving force of at least one of the first drive body or the second drive body.

(2)

The blur correction device according to (1), in which the first movable body and the second movable body are positioned side by side in an optical axis direction, the first movement direction is made to be orthogonal to the optical axis direction, and the second movement direction is made to be orthogonal to both the optical axis direction and the first movement direction.

(3)

The blur correction device according to (1) or (2), in which driving force is applied in a first driving direction from the first drive body to the second movable body, driving force is applied in a second driving direction from the second drive body to the second movable body, and the first driving direction and the second driving direction are both made to be orthogonal to the optical axis direction and are orthogonal to each other.

(4)

The blur correction device according to any of (1) to (3), in which a first driving force transmission portion is provided to the first drive body, a second driving force transmission portion is provided to the second drive body, a first operated surface and a second operated surface are formed on the second movable body, the first operated surface is pressed against the first driving force transmission portion in a slidable state, the second operated surface is pressed against the second driving force transmission portion in a slidable state, and at least one of a position of the first driving force transmission portion with respect to the first operated surface or a position of the second driving force transmission portion with respect to the second operated surface is changed and the second movable body is moved with respect to the base body.

(5)

The blur correction device according to (4), in which a biasing unit is provided, the biasing unit performing biasing in a direction in which the first operated surface is pressed against the first driving force transmission portion and the second operated surface is pressed against the second driving force transmission portion.

(6)

The blur correction device according to (5), in which the first movable body and the second movable body are biased in a direction toward the base body by the biasing unit.

(7)

The blur correction device according to any of (4) to (6), in which the first operated surface and the second operated surface are both inclined with respect to the first movement direction and the second movement direction.

(8)

The blur correction device according to (7), in which inclination angles of the first operated surface and the second operated surface with respect to the first movement direction and the second movement direction are made equal to each other.

(9)

The blur correction device according to any of (4) to (8), in which a plurality of the first driving force transmission portions and a plurality of the second driving force transmission portions are each provided.

(10)

The blur correction device according to (3), in which the first movement direction is made to be different from the first driving direction, and the second movement direction is made to be different from the second driving direction.

(11)

The blur correction device according to any of (1) to (10), in which the first drive body includes a first actuator and a first slider operated by the first actuator, the second drive body includes a second actuator and a second slider operated by the second actuator, and the second movable body is made to be slidable by the first slider and the second slider.

(12)

The camera blur correction device according to (11), in which the first movement direction and the second movement direction are made to be directions orthogonal to each other, and the first slider and the second slider are operated in a direction orthogonal to both the first movement direction and the second movement direction.

(13)

The camera blur correction device according to (11) or (12), in which the first actuator and the second actuator are attached to the base body.

(14)

The blur correction device according to (13), in which the base body is provided with an arrangement unit of a substantially rectangular shape in which the first movable body and the second movable body are arranged, and the first drive body and the second drive body are respectively attached to corners of the arrangement unit outside the first movable body and the second movable body.

(15)

The blur correction device according to any of (1) to (14), in which an outer shape of the first movable body is made smaller than an outer shape of the second movable body.

(16)

The blur correction device according to any of (1) to (15), in which the base body is formed with an arrangement space in which the first movable body, the second movable body, the first drive body, and the second drive body are arranged.

(17)

The blur correction device according to any of (1) to (16), in which a first guide that guides the first movable body in the first movement direction, and a second guide that guides the second movable body in the second movement direction are provided.

(18)

The blur correction device according to (17), in which the first guide is integrally formed with the base body, and the second guide is integrally formed with the first movable body.

(19)

The blur correction device according to any of (1) to (18), in which a first rolling member is arranged between the base body and the first movable body, the first rolling member being rolled when the first movable body is moved in the first movement direction, and a second rolling member is arranged between the first movable body and the second movable body, the second rolling member being rolled when the second movable body is moved in the second movement direction.

(20)

An imaging device including:

a lens unit including at least one lens; an imaging element that performs photoelectric conversion on an optical image captured through the lens; and a blur correction device that corrects an image blur of the optical image, the blur correction device including a first movable body that is movable in a first movement direction with respect to a base body, a second movable body that is positioned on an opposite side of the first movable body from the base body and movable in a second movement direction different from the first movement direction with respect to the first movable body, and a first drive body and a second drive body that each apply driving force to the second movable body, in which the first movable body and the second movable body are integrally moved in the first movement direction with respect to the base body by driving force of at least one of the first drive body or the second drive body, and the second movable body is moved in the second movement direction with respect to the first movable body by driving force of at least one of the first drive body or the second drive body.

REFERENCE SIGNS LIST

1 Imaging device
9 Blur correction device
10 Base body
11 First movable body
12 Second movable body
13 Arrangement unit
13a Arrangement space
21 First guide
22 First rolling member
25 Second guide
26 Second rolling member
27 Second rolling member
33a First operated surface
34a Second operated surface
35 Pressing spring (biasing unit)
36 First drive body
37 First actuator
38 First slider
41a First driving force transmission portion
42 Second drive body
43 Second actuator
44 Second slider
47a Second driving force transmission portion
21A First guide
25A Second guide
9A Blur correction device
10A Base body
11A First movable body
12A Second movable body
13A Arrangement unit
55 Biasing unit
36B First drive body
42B Second drive body

The invention claimed is:

1. A blur correction device, comprising:
a base body;
a first movable body that is movable in a first movement direction with respect to the base body;
a second movable body that is on an opposite side of the first movable body from the base body and movable in a second movement direction with respect to the first movable body, wherein the second movement direction is different from the first movement direction, an outer shape of the first movable body is smaller than an outer shape of the second movable body; and a first drive body and a second drive body, wherein each of the first drive body and the second drive body is configured to apply driving force to the second movable body, wherein the first movable body and the second movable body are integrally movable in the first movement direction with respect to the base body by the driving force of at least one of the first drive body or the second drive body, and the second movable body is movable in the second movement direction with respect to the first movable body by the driving force of at least one of the first drive body or the second drive body.

2. The blur correction device according to claim 1, wherein the first movable body and the second movable body are side by side in an optical axis direction, the first movement direction is orthogonal to the optical axis direction, and the second movement direction is orthogonal to both the optical axis direction and the first movement direction.

3. The blur correction device according to claim 1, wherein the first drive body is configured to apply the driving force to the second movable body in a first driving direction, the second drive body is configured to apply the driving force to the second movable body in a second driving direction, each of the first driving direction and the second driving direction is orthogonal to an optical axis direction, and the first driving direction is orthogonal to the second driving direction.

4. The blur correction device according to claim 1, wherein the first drive body includes a first driving force transmission portion, the second drive body includes a second driving force transmission portion, the second movable body has a first operated surface and a second operated surface, the first operated surface is pressable against the first driving force transmission portion in a first slidable state, the second operated surface is pressable against the second driving force transmission portion in a second slidable state, and the second movable body is movable with respect to the base body based on a change of at least one of a position of the first driving force transmission portion with respect to the first operated surface or a position of the second driving force transmission portion with respect to the second operated surface.

5. The blur correction device according to claim 4, further comprises a biasing unit, wherein the biasing unit is configured to perform a biasing process in a direction in which the first operated surface is pressable against the first driving force transmission portion and the second operated surface is pressable against the second driving force transmission portion.

6. The blur correction device according to claim 5, wherein the biasing unit is further configured to bias the first movable body and the second movable body in the direction toward the base body.

7. The blur correction device according to claim 4, wherein each of the first operated surface and the second operated surface is inclined with respect to the first movement direction and the second movement direction.

8. The blur correction device according to claim 7, wherein a first inclination angle of the first operated surface with respect to the first movement direction and the second movement direction is equal to a second inclination angle of the second operated surface with respect to the first movement direction and the second movement direction.

9. The blur correction device according to claim 4, wherein the first drive body includes a plurality of first driving force transmission portions, and the second drive body includes a plurality of second driving force transmission portions.

10. The blur correction device according to claim 3, wherein the first movement direction is different from the first driving direction, and the second movement direction is different from the second driving direction.

11. The blur correction device according to claim 1, wherein the first drive body includes:
a first slider, and
a first actuator configured to operate the first slider, the second drive body includes:
a second slider, and
a second actuator configured to operate the second slider, and the second movable body is slidable by the first slider and the second slider.

12. The blur correction device according to claim 11, wherein the first movement direction is orthogonal to the second movement direction, and the first slider and the second slider are operated in a direction orthogonal to both the first movement direction and the second movement direction.

13. The blur correction device according to claim 11, wherein the first actuator and the second actuator are attached to the base body.

14. The blur correction device according to claim 13, wherein the base body includes an arrangement unit of a substantially rectangular shape;

the arrangement unit includes the first movable body and the second movable body, and the first drive body and the second drive body are respectively attached to corners of the arrangement unit outside the first movable body and the second movable body.

15. The blur correction device according to claim 1, wherein the base body includes an arrangement space, and the arrangement space includes the first movable body, the second movable body, the first drive body, and the second drive body.

16. The blur correction device according to claim 1, further comprising a first guide that is configured to guide the first movable body in the first movement direction, and a second guide that is configured to guide the second movable body in the second movement direction.

17. The blur correction device according to claim 16, wherein
the base body includes the first guide, and
the first movable body includes the second guide.

18. The blur correction device according to claim 1, further comprising
a first rolling member between the base body and the first movable body, wherein the first rolling member is configured to roll when the first movable body is moved in the first movement direction, and
a second rolling member is arranged between the first movable body and the second movable body, wherein the second rolling member is configured to roll when the second movable body is moved in the second movement direction.

19. An imaging device, comprising:
a lens unit including at least one lens configured to capture an optical image;
an imaging element configured to perform photoelectric conversion on the optical image; and
a blur correction device configured to correct an image blur of the optical image, the blur correction device including:
a base body;
a first movable body that is movable in a first movement direction with respect to the base body;
a second movable body on an opposite side of the first movable body from the base body and movable in a second movement direction with respect to the first movable body, wherein
the second movement direction is different from the first movement direction,
an outer shape of the first movable body is smaller than an outer shape of the second movable body; and
a first drive body and a second drive body, wherein each of the first drive body and the second drive body is configured to apply driving force to the second movable body, wherein
the first movable body and the second movable body are integrally movable in the first movement direction with respect to the base body by the driving force of at least one of the first drive body or the second drive body, and
the second movable body is movable in the second movement direction with respect to the first movable body by the driving force of at least one of the first drive body or the second drive body.

* * * * *